United States Patent
Xu et al.

(10) Patent No.: US 12,509,490 B2
(45) Date of Patent: Dec. 30, 2025

(54) AAV CAPSIDS FOR TARGETING NERVOUS SYSTEM AND USES THEREOF

(71) Applicant: SHANGHAI VITALGEN BIOPHARMA CO., LTD., Shanghai (CN)

(72) Inventors: Kai Xu, Beijing (CN); Yezheng Tao, Shanghai (CN); Wei Li, Beijing (CN); Shin-Shay Tian, Shanghai (CN); Xiaoping Zhao, Shanghai (CN)

(73) Assignee: SHANGHAI VITALGEN BIOPHARMA CO., LTD., Shanghai (CN)

( * ) Notice: Subject to any disclaimer, the term of this patent is extended or adjusted under 35 U.S.C. 154(b) by 0 days.

(21) Appl. No.: 19/026,966

(22) Filed: Jan. 17, 2025

(65) Prior Publication Data
US 2025/0197456 A1    Jun. 19, 2025

Related U.S. Application Data

(63) Continuation of application No. PCT/CN2023/108861, filed on Jul. 24, 2023.

(30) Foreign Application Priority Data

Jul. 22, 2022    (WO) ................ PCT/CN2022/107543

(51) Int. Cl.
  *C07K 14/005* (2006.01)
  *C12N 15/10* (2006.01)
  *C12N 15/86* (2006.01)

(52) U.S. Cl.
  CPC ........ *C07K 14/005* (2013.01); *C12N 15/1093* (2013.01); *C12N 15/86* (2013.01); *C12N 2750/14122* (2013.01); *C12N 2750/14143* (2013.01)

(58) Field of Classification Search
  None
  See application file for complete search history.

(56) References Cited

U.S. PATENT DOCUMENTS

2019/0255192 A1*  8/2019  Kirn ....................... C12N 15/86

FOREIGN PATENT DOCUMENTS

| CN | 105247044 A | 1/2016 |
|---|---|---|
| CN | 111349148 A | 6/2020 |
| CN | 114057840 A | 2/2022 |
| WO | 2016-134375 A1 | 8/2016 |
| WO | 2019-046069 A1 | 3/2019 |
| WO | 2021-102234 A1 | 5/2021 |
| WO | 2022-076750 A2 | 4/2022 |

OTHER PUBLICATIONS

Tabebordbar et al., Cell (2021) 184(19): 4919-4938 (Year: 2021).*
International Search Report issued Nov. 20, 2023, in Chinese Patent Application No. PCT/CN2023/108861.
Kilian Hanlon, et al., "Selection of an Efficient AAV Vector for Robust CNS Transgene Expression", Molecular Therapy: Methods & Clinical Development, vol. 15, Dec. 31, 2019 (Dec. 31, 2019), pp. 320-332.
H. Buning, et al. "Capsid Modifications for Targeting and Improving the Efficacy of AAV Vectors", Molecular Therapy: Methods & Clinical Development, vol. 12, Mar. 31, 2019, pp. 248-265.
Benjamin E. Deverman, et al., "Cre-dependent Selection Yields AAV Variants for Wiedespread Gene Transfer to the Adult Brain," Nat. Biotechnol, 34 (2): 204-209, Feb. 2016.
Office Action issued Oct. 27, 2025, in Chinese Patent Application No. 2023800548051 (with attached English Translation).
Search Report issued Oct. 24, 2025, in Chinese Patent Application No. 2023800548051 (with attached English Translation).

* cited by examiner

*Primary Examiner* — Evelyn Y Pyla
*Assistant Examiner* — Katherine R Small
(74) *Attorney, Agent, or Firm* — Merchant & Gould P.C.; Daniel J. Pereira

(57) ABSTRACT

The present invention provides new adeno-associated viral (AAV) capsids, and recombinant AAV (rAAV) virion comprising the said capsid and a vector genome comprising a transgene. The rAAV virion comprising the novel capsid shows improved CNS-targeting infection efficiencies and/or increased expression levels of the transgene. Also provided are a method for treating a disease, including administration of the rAAV virion comprising the said AAV capsid to a subject in need thereof.

10 Claims, 18 Drawing Sheets
Specification includes a Sequence Listing.

Figure 19

| Region | \multicolumn{2}{c|}{AAV9} | \multicolumn{2}{c|}{N022} | \multicolumn{2}{c|}{N033} |

| Region | AAV9 | | N022 | | N033 | |
|---|---|---|---|---|---|---|
| Frontal | 1.63 | 0.37 | 0.24 | 1.11 | 47.84 | 3.20 |
| Hippocampus | 1.43 | 0.57 | 1.13 | 0.38 | 0.76 | 0.32 |
| Occipital | 1.95 | 0.05 | 1.05 | 1.62 | 7.66 | 1.82 |
| Parietal | 1.42 | 0.58 | 0.40 | 0.06 | 1.95 | 0.01 |
| Temporal | 0.29 | 1.71 | 2.50 | 1.51 | 3.33 | 1.56 |
| Insula | 1.41 | 0.59 | 0.05 | 0.07 | 0.51 | 0.01 |
| Medulla | 1.41 | 0.59 | 1.46 | 1.34 | 19.30 | 0.95 |
| Striatum | 1.91 | 0.09 | 0.49 | 165.36 | 0.62 | 0.66 |
| Midbrain | 1.91 | 0.09 | 0.11 | 21.42 | 1.91 | 1.21 |
| Cerebellum | 1.95 | 0.05 | 0.58 | 0.41 | 0.02 | 0.04 |
| Pons | 1.64 | 0.36 | 1.27 | 3.75 | 76.03 | 0.38 |
| Thalamus | 2.00 | 0.00 | 0.01 | 0.01 | 0.00 | 0.00 |
| Hypothalamus | 1.05 | 0.95 | 0.53 | 0.72 | 7.27 | 3.17 |
| Corpus callosum | 0.87 | 1.13 | 0.09 | 0.04 | 0.41 | 0.03 |
| Spinal-C | 1.73 | 0.27 | 0.20 | 0.45 | 2.31 | 0.08 |
| Spinal-T | 1.19 | 0.82 | 0.52 | 7.42 | 7.29 | 7.12 |
| Spinal-L | 1.15 | 0.85 | 0.22 | 2.51 | 11.38 | 0.09 |
| DRG-C | 1.55 | 0.45 | 0.68 | 0.21 | 0.19 | 0.23 |
| DRG-T | 1.25 | 0.75 | 0.01 | 2.62 | 0.60 | 0.80 |
| DRG-L | 0.02 | 1.98 | 0.06 | 0.11 | 1.95 | 0.03 |
| Olfactory bulb | 1.89 | 0.11 | 1.39 | 3.84 | 0.39 | 6.55 |
| Optic nerve | 0.22 | 1.78 | 4.68 | 2.85 | 98.26 | 0.36 |
| Heart | 1.00 | 1.00 | 0.10 | 0.52 | 0.92 | 0.16 |
| Lung | 0.03 | 1.97 | 0.07 | 0.26 | 0.32 | 0.53 |
| Liver | 1.43 | 0.57 | 0.09 | 0.22 | 0.47 | 0.84 |
| Spleen | 0.74 | 1.26 | 0.98 | 0.34 | 0.28 | 1.12 |
| Kidney | 1.29 | 0.71 | 0.04 | 0.27 | 0.11 | 0.16 |
| Small intestine | 1.01 | 0.99 | N.D. | 0.06 | 0.23 | 0.11 |
| Pancreas | 1.96 | 0.04 | N.D. | N.D. | N.D. | 0.29 |
| Saliva Gland | 0.55 | 1.45 | N.D. | N.D. | 0.04 | 3.86 |
| Gonad | 1.82 | 0.18 | N.D. | 0.02 | 0.12 | 0.23 |
| Muscle | 0.50 | 1.50 | N.D. | N.D. | 0.48 | 0.80 |

Relative Fold Change

Figure 26

AAV CAPSIDS FOR TARGETING NERVOUS SYSTEM AND USES THEREOF

RELATED APPLICATION

The application claims priority to, and the benefit of PCT Application No. PCT/CN2022/107543, filed on Jul. 22, 2022, the contents of which are incorporated herein by reference in their entirety.

FIELD OF THE INVENTION

The present disclosure relates to the field of gene therapy. Specifically, the present invention relates to new adeno-associated viral (AAV) capsids, and recombinant AAV particles comprising said capsid. The rAAV particles comprising the novel capsid show improved central nervous system (CNS)-targeting transduction efficiencies and/or increased expression levels of the transgene.

SEQUENCE LISTING

In accordance with 37 CFR § 1.52 (e) (5) and with 37 CFR § 1.831, the specification makes reference to a Sequence Listing submitted electronically as a .xml file named 0342-PA-010US_amended sql.xml. Said .XML copy is 119,000 bytes in size. The entire contents of the Sequence Listing are hereby incorporated by reference.

BACKGROUND

The statements in this section merely provide background information related to the present disclosure and do not necessarily constitute prior art.

Adeno-associated virus (AAV) is a non-enveloped virus with a diameter of about 20 nm which infects mammals such as humans and primates. To date, a large number of AAV serotypes have been identified, and it is known that numerous serotypes of AAV show variable tropism when infecting different animal species or cell types (Hastie, E. and R. J. Samulski, *Adeno-associated virus at 50: a golden anniversary of discovery, research, and gene therapy success—a personal perspective*. Hum Gene Ther, 2015. 26 (5): p. 257-65).

The AAV genome is a single-stranded DNA (ssDNA) of approximately 4.7 kb, with inverted terminal repeat (ITR) sequences of about 145 bases at both ends. The ITR sequences form Watson-Crick base pairs to form a T-type hairpin structure comprising cis elements necessary for replication and packaging of the AAV genome. The AAV genome comprises two open reading frames (ORFs) in a region flanked by the ITR sequences. One ORF (also called "rep gene") encodes four Rep proteins (Rep78, Rep68, Rep52 and Rep40). The other ORF (also called "cap gene") encodes three capsid proteins (VP1, VP2 and VP3) and an assembly-activating protein (AAP). The Rep proteins have helicase activity, and are required not only for the induction of capsid formation but also for the integration of the AAV genome into the host cell chromosome. The AAV capsid is formed by 60 molecules of VP1, VP2 and VP3 assembled at a ratio of 1:1:10 to form an icosahedral AAV outer shell. VP1, VP2 and VP3 are mainly different in the N-terminal region, with the N-terminus of VP1 containing a unique phospholipase A2 (PLA2) domain. Since the PLA2 domain is present only in VP1, the N-terminal region of VP1 is also called a VP1 unique region (VP1u). The PLA2 domain is known to be exposed to the outside environment of the AAV particle under acidic conditions, though it is normally present inside the AAV particle. Thus, it is believed that the PLA2 domain is necessary for AAV to escape from endosome and translocate into the nucleus after AAV enters a cell. Assembly-activating protein (AAP) is a protein necessary for the formation of AAV capsid. Replication of AAV in nature depends on the presence of a helper virus such as adenovirus and herpes virus. In the presence of a helper virus, the AAV genome is replicated in the host cells to form a complete AAV particle containing the AAV genome. Then, the AAV particle is released from the host cells. In the absence of a helper virus, the AAV genome can be episomally maintained, or less frequently, integrated into a host chromosome and become latent (Li, C. and R. J. Samulski, *Engineering adeno-associated virus vectors for gene therapy*. Nat Rev Genet, 2020. 21 (4): p. 255-272.).

AAV can infect a wide variety of cells, both dividing cells and post mitotic non-dividing cells, such as blood cells, muscle cells, and nerve cells. Since AAV is not pathogenic to human, it has a low risk of adverse effects. Moreover, the AAV virus particle is physico-chemically stable. As such, AAV has recently attracted attention for its value as a delivery vector to transfer exogenous genes into the human tissues for treating congenital genetic diseases (Deverman, B. E., et al., Gene therapy for neurological disorders: progress and prospects. Nat Rev Drug Discov, 2018. 17 (10): p. 767.). For example, AAV9 carrying a functional SMN gene has been developed to treat spinal muscular atrophy (Novartis, Zolgensma). Based on the capsid contained, AAV serotypes differ in their tropism, and thus can be used to target different tissues and cell types for gene delivery. However, gene delivery by naturally occurring AAV serotypes is limited by dose-limiting safety constrains and their mostly broad tissue tropisms, restricting the development of effective AAV-based gene therapies, especially for the nervous system disorders.

To expand the AAV toolbox for the nervous system delivery, AAV capsid engineering has been conducted either by rational design (Lee, E. J., C. M. Guenther, and J. Suh, *Adeno-Associated Virus (AAV) Vectors: Rational Design Strategies for Capsid Engineering*. Curr Opin Biomed Eng, 2018. 7: p. 58-63) or directed evolution (Pekrun, K., et al., *Using a barcoded AAV capsid library to select for clinically relevant gene therapy vectors*. JCI Insight, 2019. 4 (22)). For example, to improve neural tropism, a peptide insertion strategy was applied to identify AAV-PHP.B and AAV-PHP.eb derived from AAV9, a natural serotype which can cross blood-brain barrier to infect neural cells (Ravindra Kumar, S., et al., *Multiplexed Cre-dependent selection yields systemic AAVs for targeting distinct brain cell types*. Nat Methods, 2020. 17 (5): p. 541-550).

Furthermore, for treating different neural disorders, AAV serotypes with disease-relevant neuronal specific tissue tropism would be more desirable for safety and efficacy considerations. For example, an AAV which has frontal and temporal cortex tropism would be a preferred delivery tool for treating frontotemporal dementia. Other potential strategies may involve the use of AAV targeting dopaminergic system in striatum and midbrain for treating Parkinson's disease, the use of AAV targeting motor neurons for treating spinal muscular atrophy (SMA) or amyotrophic lateral sclerosis (ALS), and the use of AAV targeting dorsal root ganglion for pain relieving.

Therefore, it remains an unmet need for new AAV serotypes with more differentiating tissue tropism, such as improved CNS tropism.

SUMMARY OF THE INVENTION

The present inventors designed and generated an AAV capsid library, from which a series of new capsids with improved CNS tropism have been identified. Each Cap gene in this library encodes a variant CAP polypeptide having an insertion of a random stretch of 7 amino acids (7-mer) at the site between the amino acid position 588 and the amino acid position 589 of AAV9 capsid polypeptide (see FIG. 1).

In a first aspect, the present invention relates to an engineered capsid polypeptide of AAV, wherein the engineered capsid polypeptide is characterized by:
  (1) capable of assembling into an AAV particle,
  (2) comprising an insertion of seven amino acids at a position corresponding to the position between the amino acid position Q588 and the amino acid position A589 of the wild-type AAV9 VP1 capsid protein, wherein the numbering of the amino acid is based on the amino acid sequence as shown in SEQ ID NO: 121, and
  (3) showing an improved CNS tropism as compared to the wild-type capsid polypeptide of AAV9.

In a second aspect, the present invention relates to a rAAV particle comprising (a) the AAV capsid polypeptide of the first aspect, and (2) a vector genome comprising a transgene.

In a third aspect, the present invention relates to a nucleic acid encoding the AAV capsid polypeptide of the first aspect, an AAV particle containing the AAV capsid.

In a fourth aspect, the present application relates to a recombinant vector comprising the nucleic acid of the third aspect.

In a fifth aspect, the present application relates to a host cell comprising the nucleic acid of the third aspect or the recombinant vector of the fourth aspect.

In a sixth aspect, the present invention relates to a pharmaceutical composition, which comprises (1) the AAV capsid of the first aspect and a vector genome; or the rAAV particle of the second aspect, and (2) a pharmaceutically acceptable carrier.

In a seventh aspect, the present invention relates to the use of the AAV capsid polypeptide, the nucleic acid, the rAAV particle, or the pharmaceutical composition in the manufacture of a drug for delivering a transgene to a subject. In a more specific embodiment, the drug is delivered to cells in the central nervous system, such as cortical neurons, motor neurons, dopaminergic neurons, astrocytes, or oligodendrocytes.

In an eighth aspect, the present invention relates to a method for treating a disease, including administering a therapeutically effective amount of the rAAV particle of the second aspect or the pharmaceutical composition of the sixth aspect, to a subject in need thereof.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 5-18 show the relative enrichment scores of the engineered capsid polypeptides in different CNS tissues.

FIG. 19 shows the expression levels of the GFP transgene delivered by rAAV of each engineered capsid polypeptide.

FIG. 26 shows the biodistribution of ViVec-N022 and ViVec-N033 in different brain regions and peripheral organs of the cynomolgus monkey 21 days after receiving i.e.v. injection. The relative DNA levels of luciferase in each region are shown as fold changes (normalized to the AAV9 treatment group), N=2.

DETAILED DESCRIPTION OF THE INVENTION

Definition

Figure 1:
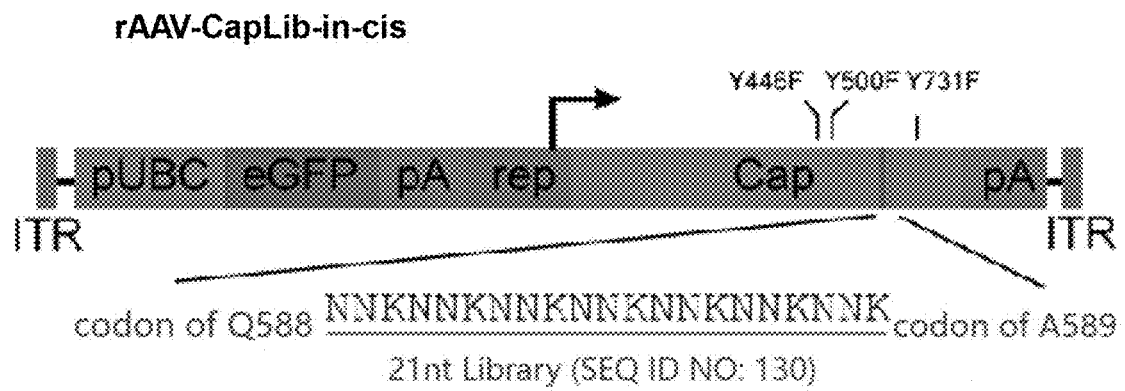
FIG. 1 illustrates the structure of the plasmid constructs comprised in the library (rAAV-CapLib-in-cis), in which the Cap gene is engineered to comprise a 21nt-insertion (SEQ ID NO: 130), leading to an insertion of 7 amino acids at the position between Q588 and A589 in the encoded capsid polypeptide.

"AAV" refers to adeno-associated virus. "rAAV" refers to recombinant adeno-associated virus. In the context of the present application, unless otherwise indicated, "rAAV vector", "rAAV virion" and "rAAV viral particle" have the same meaning and refer to a viral particle comprising a vector genome encapsulated in an rAAV capsid. The vector genome of rAAV lacks rep and cap gene in the wild-type AAV genome, so that rAAV is a replication-deficient entity.

The "capsid" is formed by assembling three isoforms of "capsid protein" and "capsid polypeptide", which are VP1, VP2 and VP3. By "capsid protein" or "capsid polypeptide" in general, without indicating the type of the isoform and it should be understood as comprising all of the three isoforms.

The term "engineered capsid polypeptide" refers to artificially modified capsid polypeptide, which comprises at least one amino acid difference as compared to a wild-type capsid polypeptide of AAV. In a specific embodiment, the engineered capsid polypeptide of the present application has a 7-mer insertion at the position corresponding to the position between Q588 and A589 of the wild-type AAV9 capsid protein (VP1) as shown in SEQ ID NO: 121. In a preferred embodiment, the engineered capsid polypeptide of the present application shows higher tissue tropism in one or more of CNS tissues, as compared to the wild-type AAV9 capsid polypeptide. The numbering of amino acids and the location of insertion is based on VP1 of the wild-type AAV9, as VP1 is the longest isoform of the three capsid proteins. Both VP2 and VP3 are N-terminal truncated versions of VP1, while still contain the region corresponding to the location of insertion between Q588 and A589 of the AAV9 VP1 protein. It should be understood that in the case of VP2 (SEQ ID NO: 123; whose nucleotide sequence is shown in SEQ ID NO: 128) and VP3 (SEQ ID NO: 124; whose nucleotide sequence is shown in SEQ ID NO: 129), the numbering of the location of insertion should be adjusted accordingly (between Q451 and A452 in VP2, and between Q386 and A387 in VP3).

The term "gene" refers to a nucleic acid (e.g., DNA, such as genomic DNA and cDNA) and its corresponding nucleotide sequence that is involved in encoding an RNA transcript. The phrase "Gene of interest" or its abbreviation "GOI" as used herein refers to the gene to be delivered by rAAVs. In some embodiments, the GOI comprises only coding sequences of a polypeptide. In other embodiments, the GOI comprises non-coding regions, regulatory regions in addition to the coding sequence. In some embodiments, the GOI does not encode a polypeptide.

The term "nucleotide" as used herein refers to the base-sugar-phosphate unit consisting a nucleic acid sequence, e.g., a deoxyribonucleic acid (DNA) sequence or a ribonucleic acid (RNA) sequence.

The terms "peptide", "polypeptide" and "protein" are used interchangeably herein to refer to a polymer of at least two amino acid residues linked by one or more peptide bonds.

"Variant" when used herein with reference to a polypeptide, specifically capsid polypeptide, refers to a polypeptide that is different from the wild-type polypeptide by one or more amino acid variations, while related to the wild-type polypeptide by structure, activity and/or function. Said amino acid variation can be selected from one or more of insertion, deletion, substitution, truncation, and modification.

The term "AAV9" refers to the wild-type AAV serotype 9.

The "two-plasmid system" refers to a virus packaging system of AAV using co-transfection of two plasmids, one encoding for the transgene, and the other encoding for the Rep gene, Cap gene and Ad helper genes.

The term "subject" as used herein refers to an individual, preferably a vertebrate, more preferably a non-human mammal or human. The non-human mammal can be rodents such as murines, or non-human primates such as simians. The term "subject" may also encompass cells, tissues and progenies of a biological entity obtained in vivo or culture in vitro.

The phrase "effective amount" or "therapeutically effective amount" refers to the quantity of a composition, e.g., a composition comprising the rAAV virions that is sufficient to result in a desired activity when being delivered to a subject in need thereof. Said desired activity may encompass delaying the manifestation of a disorder, arresting or delaying the progression of a disorder, or alleviating at least one symptom of a disorder.

Method of Engineering Capsid Polypeptides

Figure 2:
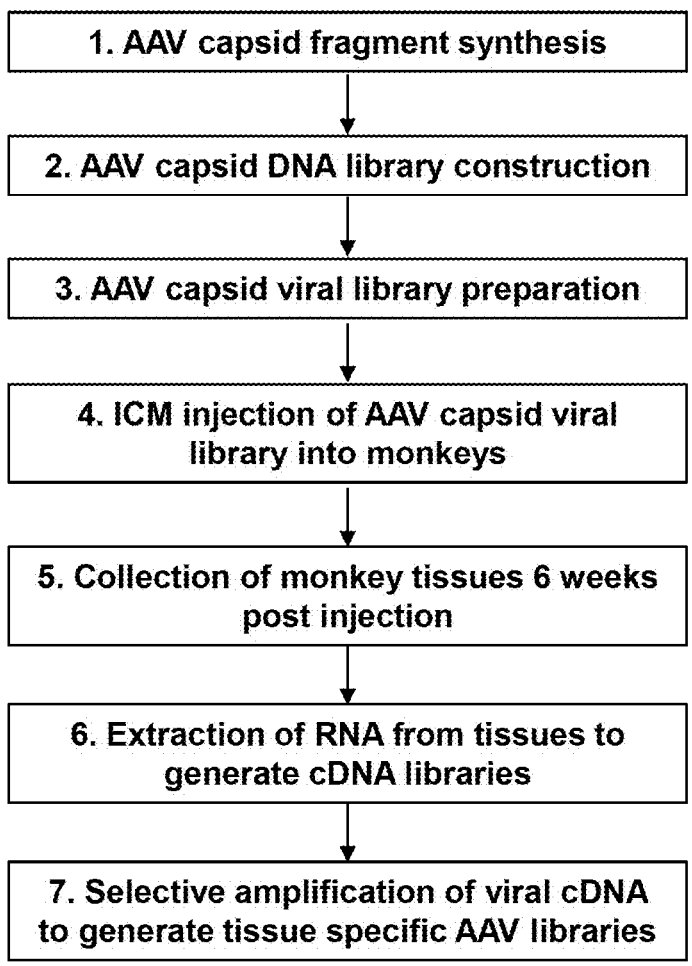
FIG. 2 shows the scheme of the in vivo screening in the cynomolgus monkeys to identify AAVs with better CNS tropism.

The method of preparing the engineered capsid polypeptide of the present application is briefly illustrated in FIG. 2. Briefly, it was performed by building a DNA library containing polynucleotide sequences encoding for individual variant capsid polypeptide each with a unique 7-mer insertion at a desired location of AAV9 capsid polypeptide. The type of the 7-mer insertions included in the library should theoretically cover all the possible combinations of amino acids, which is at a number of approximately $20^7$. Furthermore, a plasmid library can be established based on the DNA library of capsid coding sequences and used to express the variant capsid polypeptides in host cells to form a library of AAV virions. The AAV virion library generated can be delivered to animals, e.g., monkeys, to screen for tissue tropism.

"DNA library" refers to the library of the variant polynucleotide sequences that encode for variant capsid polypeptides. Specifically, the variant polynucleotide sequences comprise the wild-type AAV9 capsid polypeptide sequences with seven NNK codon insertions which correspond to the 7-mer amino acid insertion. The NNK codon can code for one of the 20 amino acids at the insertion site. This method is known as "site saturation mutagenesis (SSM)", which is a powerful tool in protein engineering. "NNK saturation mutagenesis strategy" is one of the most popular SSM strategies which takes advantage of the NNK degenerate codon. NNK codon can encode one of the 20 amino acids, with a small chance to encode a stop codon.

"Plasmid library" refers to a collection of plasmid DNA library of the present application.

"AAV library" or "AAV virion library" refers to a collection of AAV virions formed with capsid expressed by the plasmid library of the present application in a host cell line. For example, the host cell line can be HEK293T cells.

"Tissue library" refers to a collection of AAV virions comprising AAV sequences derived from RNAs collected from a certain tissue of the test animals which were injected with the AAV library. Specifically, a reverse transcription was performed to generate total cDNAs from the RNAs extracted from the tissue, and the viral DNA was amplified from the total DNA to generate tissue specific AAV library.

"Tropism" of a rAAV for a specific tissue or cell type refers to the ability of a given rAAV to preferentially infect a given type of tissue or cell. Improved tropism indicates increased targeting ability for the desired tissue, with a corresponding increased infection of the target tissue.

"CNS tropism" as used herein includes tropism of a rAAV for one or more of CNS cells, CNS tissues or brain regions. CNS tropism may be indicated by a high transduction efficiency in one or more of the following tissues: parietal lobe, frontal lobe, insula, occipital lobe, temporal lobe, hippocampus, striatum, pons, medulla oblongata, midbrain, cerebellum, thalamus, hypothalamus, corpus callosum, pituitary gland, optic nerve, and the olfactory bulb.

Engineered Capsid Polypeptides and Polynucleotide Encoding the Same

In one aspect, the present application provides a series of variant AAV capsid polypeptides. The rAAV particles formed by the variant AAV capsid polypeptides of the present application show increased tropism to one or more tissues or cells of the central nervous system, as compared to the rAAV particles formed by a capsid of the wild-type AAV9.

As compared to the wild-type AAV9, the variant AAV capsid polypeptide of the present application with improved CNS tissue tropism has a 7-amino acid insertion between the amino acid position Q588 and the amino acid position A589 of the wild-type AAV9 VP1 capsid protein as shown in SEQ ID NO: 121. In some embodiments, the variant AAV capsid polypeptide of the present application having a 7-amino acid insertion selected from a group consisting of the amino acid sequences as shown in SEQ ID NOs: 1-60, between the amino acid position Q588 and the amino acid position A589 of the wild-type AAV9 VP1 capsid protein as shown in SEQ ID NO: 121.

In another aspect, the present application provides a nucleic acid molecule comprising a nucleotide sequence encoding for the variant AAV capsid polypeptide with CNS tropism of the present application. In some embodiments, the nucleic acid molecule comprising a 21-nucleotide fragment as shown in any one of SEQ ID NOs: 61-120, inserted at a position between the codon of Q588 and the codon of A589 of the wild-type AAV9 VP1 capsid protein as shown in SEQ ID NO: 121.

AAV Libraries

In another aspect, the present application provides an AAV library, comprising a plurality of variant AAV capsid polypeptides, each of the AAV capsid polypeptide having a 7-amino acid insertion between the amino acid position Q588 and the amino acid position A589 of the wild-type AAV9 VP1 capsid protein as shown in SEQ ID NO: 121, in which each of the 7 amino acids of the insertion can be randomly selected from any of the 20 amino acids. The AAVs of the AAV library have at least $1\times10^4$, at least $1\times10^5$, at least $1\times10^6$, at least $1\times10^7$, at least $1\times10^8$, or at least $1\times10^9$ types of variant capsid polypeptides.

In another aspect, the present application provides a DNA or plasmid library, comprising a plurality of nucleotide sequences encoding variant AAV capsid polypeptides, each of the AAV capsid polypeptide having a 7-amino acid insertion between the amino acid position Q588 and the amino acid position A589 of the wild-type AAV9 VP1 capsid protein as shown in SEQ ID NO: 121. The DNA or plasmid library can express at least $1\times10^4$, at least $1\times10^5$, at least $1\times10^6$, at least $1\times10^7$, at least $1\times10^8$, or at least $1\times10^9$ types of variant capsid polypeptides. In a specific embodiment, the nucleotide sequences in the DNA or plasmid library were generated by NNK saturation mutagenesis strategy, by inserting 7 NNK codons into the coding sequence of the wild-type AAV9 VP1 capsid protein between the codon of Q588 and the codon of A589.

The DNA library, the plasmid library and the AAV library as described above can be used for screening new variant AAV capsid polypeptides or coding sequences with desired properties, such as expression efficiency, tissue tropism or the like.

rAAV Virions

In one aspect, the present application provides an rAAV virion comprising a capsid and a vector genome, wherein the capsid comprises the engineered capsid polypeptide of the present application. The rAAV virion shows tropism in one or more CNS tissues. More preferably, the rAAV virion shows higher tropism for and/or higher transduction efficiency in one or more CNS tissues, as compared to an rAAV virion with the wild-type AAV9 capsid.

For example, the rAAV virions comprising the engineered capsid polypeptide of the present application shows a transduction efficiency at least 5%, 10%, 15%, 20%, 25%, 30%, 35%, 40%, 45%, 50%, 60%, 70%, 80%, 90%, 100%, 200%, 300%, 400%, 500%, or 1000% higher than rAAV virions with the rAAV virion comprising a wild-type AAV9 capsid in one or more CNS tissues. For example, the transduction efficiency of rAAVs in the tissues of interest can be measured and calculated based on the expression level of GOI delivered by the AAVs. The expression levels of the GOI can be detected by any conventional means in the art.

For example, the variant AAV capsid polypeptide of the present application shows tissue tropism in one or more of the brain regions or CNS tissues selected from a group consisting of the parietal lobe, frontal lobe, temporal lobe, occipital lobe, insular lobe, striatum, hippocampus, midbrain, thalamus, hypothalamus, cerebellum, medulla oblongata, pons, spinal cord, optic nerve, dorsal root ganglion cervical, and dorsal root ganglion thoracic. Preferably, the rAAV having the variant AAV capsid of the present application may show improved tropism in one or more of the said brain regions or CNS tissues as compared to a rAAV having a wild-type capsid of AAV9. The rAAV having the variant AAV capsid of the present application may lead to a desirable distribution and/or expression of GOI in one or more of the brain regions or CNS tissues selected from a group consisting of the parietal lobe, frontal lobe, temporal lobe, occipital lobe, insular lobe, striatum, hippocampus, midbrain, thalamus, hypothalamus, cerebellum, medulla oblongata, pons, spinal cord, optic nerve, dorsal root ganglion cervical, and dorsal root ganglion thoracic. Preferably, the rAAV having the variant AAV capsid of the present application may lead to an increased expression of GOI in one or more of said brain regions or CNS tissues as compared to a rAAV having a wild-type capsid of AAV9.

In specific embodiments, the rAAV virion of the present application comprises a variant AAV capsid having an amino acid sequence obtained by introducing a 7-amino acid insertion as shown in any one of SEQ ID NOs: 1-60 to a position between the amino acid position Q588 and the amino acid position A589 of the wild-type AAV9 VP1 capsid protein as shown in SEQ ID NO: 121. In preferred embodiments, the 7-amino acid insertion is selected from any one of SEQ ID NOs: 1, 2, 4, 22 and 33. In more preferred embodiments, the 7-amino acid insertion is selected from any one of SEQ ID NOs: 2, 22 and 33. In the context of the present application, the rAAVs with a capsid comprising the 7-amino acid insertions of SEQ ID NOs: 1-60 are designated as ViVec-N001 to ViVec-N060, respectively.

In one embodiment, the present application provides a rAAV comprising a variant AAV capsid polypeptide and showing tropism for the parietal lobe. Preferably, the rAAV showing tropism for the parietal lobe comprising the variant AAV capsid polypeptide which comprises a 7-amino acid insertion as shown in any one of SEQ ID NO: 30, SEQ ID NO: 5, SEQ ID NO: 22, SEQ ID NO: 29, SEQ ID NO: 2, SEQ ID NO: 33, SEQ ID NO: 26, SEQ ID NO: 43, SEQ ID NO: 7, SEQ ID NO: 24, SEQ ID NO: 8, SEQ ID NO: 15, SEQ ID NO: 38, SEQ ID NO: 04, SEQ ID NO: 3, SEQ ID NO: 23, SEQ ID NO: 9, SEQ ID NO: 40, SEQ ID NO: 55, SEQ ID NO: 27, SEQ ID NO: 54, SEQ ID NO: 49, SEQ ID NO: 10, SEQ ID NO: 44, SEQ ID NO: 58, SEQ ID NO: 1, SEQ ID NO: 39, SEQ ID NO: 47, SEQ ID NO: 21, SEQ ID NO: 16, SEQ ID NO: 28, SEQ ID NO: 20, and SEQ ID NO: 45 between the amino acid position Q588 and the amino acid position A589 of the wild-type AAV9 VP1 capsid protein as shown in SEQ ID NO: 121. Specifically, the rAAVs show improved tropism for the parietal lobe as compared to a rAAV having a wild-type capsid of AAV9 or AAV-PHP.eB. More preferably, for the rAAV comprising a variant AAV capsid polypeptide and showing tropism for the parietal lobe, the variant AAV capsid polypeptide comprises a 7-amino acid insertion as shown in any one of SEQ ID NO: 30, SEQ ID NO: 5, SEQ ID NO: 22, SEQ ID NO: 29, SEQ ID NO: 2, SEQ ID NO: 33, SEQ ID NO: 26, SEQ ID NO: 43, SEQ ID NO: 7, and SEQ ID NO: 24. The present application also relates to the use of the rAAVs as described in this paragraph for the delivery of GOIs to the parietal lobe.

In one embodiment, the present application provides a rAAV comprising a variant AAV capsid polypeptide and showing tropism for the frontal lobe. Preferably, the rAAV showing tropism for the frontal lobe comprising the variant AAV capsid polypeptide which comprises a 7-amino acid insertion as shown in any one of SEQ ID NO: 30, SEQ ID NO: 29, SEQ ID NO: 5, SEQ ID NO: 33, SEQ ID NO: 23, SEQ ID NO: 4, SEQ ID NO: 2, SEQ ID NO: 22, SEQ ID NO: 7, SEQ ID NO: 8, SEQ ID NO: 24, SEQ ID NO: 26, SEQ ID NO: 15, SEQ ID NO: 40, SEQ ID NO: 38, SEQ ID NO: 10, SEQ ID NO: 54, SEQ ID NO: 25, SEQ ID NO: 47, SEQ ID NO: 9, SEQ ID NO: 49, SEQ ID NO: 55, SEQ ID NO: 20, SEQ ID NO: 28, SEQ ID NO: 27, SEQ ID NO: 1, SEQ ID NO: 44, and SEQ ID NO: 39 between the amino acid position Q588 and the amino acid position A589 of the wild-type AAV9 VP1 capsid protein as shown in SEQ ID NO: 121. Specifically, the rAAVs show improved tropism for the frontal lobe as compared to a rAAV having a wild-type capsid of AAV9 or AAV-PHP.eB. More preferably, for the rAAV comprising a variant AAV capsid polypeptide and showing tropism for the frontal lobe, the variant AAV capsid polypeptide comprises a 7-amino acid insertion as shown in any one of SEQ ID NO: 30, SEQ ID NO: 29, SEQ ID NO: 5, SEQ ID NO: 33, SEQ ID NO: 23, SEQ ID NO: 4, SEQ ID NO: 2, SEQ ID NO: 22, SEQ ID NO: 7, and SEQ ID NO: 8. The present application also relates to the use of the rAAVs as described in this paragraph for the delivery of GOIs to the frontal lobe.

In one embodiment, the present application provides a rAAV comprising a variant AAV capsid polypeptide and showing tropism for the temporal lobe. Preferably, the rAAV showing tropism for the temporal lobe comprising the variant AAV capsid polypeptide which comprises a 7-amino acid insertion as shown in any one of SEQ ID NO: 29, SEQ ID NO: 30, SEQ ID NO: 5, SEQ ID NO: 33, SEQ ID NO: 23, SEQ ID NO: 4, SEQ ID NO: 2, SEQ ID NO: 22, SEQ ID NO: 40, SEQ ID NO: 7, SEQ ID NO: 8, SEQ ID NO: 24, SEQ ID NO: 15, SEQ ID NO: 26, SEQ ID NO: 51, SEQ ID NO: 38, SEQ ID NO: 3, SEQ ID NO: 25, SEQ ID NO: 35, SEQ ID NO: 54, SEQ ID NO: 10, SEQ ID NO: 47, SEQ ID NO: 9, SEQ ID NO: 49, SEQ ID NO: 28, SEQ ID NO: 55, SEQ ID NO: 20, SEQ ID NO: 27, SEQ ID NO: 50, SEQ ID NO: 58, SEQ ID NO: 1, SEQ ID NO: 39, SEQ ID NO: 44, and SEQ ID NO: 11 between the amino acid position Q588 and the amino acid position A589 of the wild-type AAV9 VP1 capsid protein as shown in SEQ ID NO: 121. Specifically, the rAAVs show improved tropism for the temporal lobe as compared to a rAAV having a wild-type capsid of AAV9 or AAV-PHP.eB. More preferably, for the rAAV comprising a variant AAV capsid polypeptide and showing tropism for the temporal lobe, the variant AAV capsid polypeptide comprises a 7-amino acid insertion as shown in any one of SEQ ID NO: 29, SEQ ID NO: 30, SEQ ID NO: 5, SEQ ID NO: 33, SEQ ID NO: 23, SEQ ID NO: 4, SEQ ID NO: 2, SEQ ID NO: 22, SEQ ID NO: 40, and SEQ ID NO: 7. The present application also relates to the use of the rAAVs as described in this paragraph for the delivery of GOIs to the temporal lobe.

In one embodiment, the present application provides a rAAV comprising a variant AAV capsid polypeptide and showing tropism for the occipital lobe. Preferably, the rAAV showing tropism for the occipital lobe comprising the variant AAV capsid polypeptide which comprises a 7-amino acid insertion as shown in any one of SEQ ID NO: 22, SEQ ID NO: 2, SEQ ID NO: 5, SEQ ID NO: 33, SEQ ID NO: 29, SEQ ID NO: 7, SEQ ID NO: 26, SEQ ID NO: 30, SEQ ID NO: 8, SEQ ID NO: 24, SEQ ID NO: 4, SEQ ID NO: 15, SEQ ID NO: 20, SEQ ID NO: 40, SEQ ID NO: 9, SEQ ID NO: 38, SEQ ID NO: 54, SEQ ID NO: 23, SEQ ID NO: 49, SEQ ID NO: 10, SEQ ID NO: 55, SEQ ID NO: 47, SEQ ID NO: 1, SEQ ID NO: 27, SEQ ID NO: 44, SEQ ID NO: 58, SEQ ID NO: 25, SEQ ID NO: 28, and SEQ ID NO: 39 between the amino acid position Q588 and the amino acid position A589 of the wild-type AAV9 VP1 capsid protein as shown in SEQ ID NO: 121. Specifically, the rAAVs show improved tropism for the occipital lobe as compared to a rAAV having a wild-type capsid of AAV9 or AAV-PHP.eB. More preferably, for the rAAV comprising a variant AAV capsid polypeptide and showing tropism for the occipital lobe, the variant AAV capsid polypeptide comprises a 7-amino acid insertion as shown in any one of SEQ ID NO: 22, SEQ ID NO: 2, SEQ ID NO: 5, SEQ ID NO: 33, SEQ ID NO: 29, SEQ ID NO: 7, SEQ ID NO: 26, SEQ ID NO: 30, SEQ ID NO: 8, and SEQ ID NO: 24. The present application also relates to the use of the rAAVs as described in this paragraph for the delivery of GOIs to the occipital lobe.

In one embodiment, the present application provides a rAAV comprising a variant AAV capsid polypeptide and showing tropism for the insular lobe. Preferably, the rAAV showing tropism for the insular lobe comprising the variant AAV capsid polypeptide which comprises a 7-amino acid insertion as shown in any one of SEQ ID NO: 30, SEQ ID NO: 29, SEQ ID NO: 40, SEQ ID NO: 5, SEQ ID NO: 23 SEQ ID NO: 33, SEQ ID NO: 4, SEQ ID NO: 2, SEQ ID NO: 21, SEQ ID NO: 22, SEQ ID NO: 15, SEQ ID NO: 7, SEQ ID NO: 24, SEQ ID NO: 8, SEQ ID NO: 26, SEQ ID NO: 38, SEQ ID NO: 25, SEQ ID NO: 51, SEQ ID NO: 20, SEQ ID NO: 35, SEQ ID NO: 54, SEQ ID NO: 10, SEQ ID NO: 47, SEQ ID NO: 9, SEQ ID NO: 28, SEQ ID NO: 41, SEQ ID NO: 49, SEQ ID NO: 43, SEQ ID NO: 27, SEQ ID NO: 55, SEQ ID NO: 1 SEQ ID NO: 50 SEQ ID NO: 17, SEQ ID NO: 39, SEQ ID NO: 44, and SEQ ID NO: 11 between the amino acid position Q588 and the amino acid position A589 of the wild-type AAV9 VP1 capsid protein as shown in SEQ ID NO: 121. Specifically, the rAAVs show improved tropism for the insular lobe as compared to a rAAV having a wild-type capsid of AAV9 or AAV-PHP.eB. More preferably, for the rAAV comprising a variant AAV capsid polypeptide and showing tropism for the insular lobe, the variant AAV capsid polypeptide comprises a 7-amino acid insertion as shown in any one of SEQ ID NO: 30, SEQ ID NO: 29, SEQ ID NO: 40, SEQ ID NO: 5, SEQ ID NO: 23 SEQ ID NO: 33, SEQ ID NO: 4, SEQ ID NO: 2, SEQ ID NO: 21, and SEQ ID NO: 22. The present application also relates to the use of the rAAVs as described in this paragraph for the delivery of GOIs to the insular lobe.

In one embodiment, the present application provides a rAAV comprising a variant AAV capsid polypeptide and showing tropism for the striatum. Preferably, the rAAV showing tropism for the striatum comprising the variant AAV capsid polypeptide which comprises a 7-amino acid insertion as shown in any one of SEQ ID NO: 30, SEQ ID NO: 29, SEQ ID NO: 5, SEQ ID NO: 21, SEQ ID NO: 43, SEQ ID NO: 33, SEQ ID NO: 4, SEQ ID NO: 3, SEQ ID NO: 23, SEQ ID NO: 22, SEQ ID NO: 2, SEQ ID NO: 7, SEQ ID NO: 24, SEQ ID NO: 8, SEQ ID NO: 15, SEQ ID NO: 26, SEQ ID NO: 40, SEQ ID NO: 9, SEQ ID NO: 38, SEQ ID NO: 47, SEQ ID NO: 20, SEQ ID NO: 54, SEQ ID NO: 10, SEQ ID NO: 16, SEQ ID NO: 28, SEQ ID NO: 49, SEQ ID NO: 41, SEQ ID NO: 55 and SEQ ID NO: 1 between the amino acid position Q588 and the amino acid position A589 of the wild-type AAV9 VP1 capsid protein as shown in SEQ ID NO: 121. Specifically, the rAAVs midbrain show improved tropism for the striatum as compared to a rAAV having a wild-type capsid of AAV9 or AAV-PHP.eB. More preferably, for the rAAV comprising a variant AAV capsid polypeptide and showing tropism for the striatum, the variant AAV capsid polypeptide comprises a 7-amino acid insertion as shown in any one of SEQ ID NO: 30, SEQ ID NO: 29, SEQ ID NO: 5, SEQ ID NO: 21, SEQ ID NO: 43, SEQ ID NO: 33, SEQ ID NO: 4, SEQ ID NO: 3, SEQ ID NO: 23, SEQ ID NO: 22, and SEQ ID NO: 1. The present application also relates to the use of the rAAVs as described in this paragraph for the delivery of GOIs to the striatum.

In one embodiment, the present application provides a rAAV comprising a variant AAV capsid polypeptide and showing tropism for the hippocampus. Preferably, the rAAV showing tropism for the hippocampus comprising the variant AAV capsid polypeptide which comprises a 7-amino acid insertion as shown in any one of SEQ ID NO: 5, SEQ ID NO: 30, SEQ ID NO: 23, SEQ ID NO: 33, SEQ ID NO: 22, SEQ ID NO: 2, SEQ ID NO: 4, SEQ ID NO: 7, SEQ ID NO: 8, SEQ ID NO: 24, SEQ ID NO: 26, SEQ ID NO: 29, SEQ ID NO: 21, SEQ ID NO: 15, SEQ ID NO: 38, SEQ ID NO: 10, SEQ ID NO: 9, SEQ ID NO: 54, SEQ ID NO: 44, SEQ ID NO: 55, SEQ ID NO: 47, SEQ ID NO: 49, SEQ ID NO: 40, SEQ ID NO: 25, SEQ ID NO: 28, SEQ ID NO: 27, SEQ ID NO: 39, SEQ ID NO: 1, SEQ ID NO: 58, SEQ ID NO: 20, SEQ ID NO: 3, and SEQ ID NO: 36 between the amino acid position Q588 and the amino acid position A589 of the wild-type AAV9 VP1 capsid protein as shown in SEQ ID NO: 121. Specifically, the rAAVs show improved tropism for the hippocampus as compared to a rAAV having a wild-type capsid of AAV9 or AAV-PHP.eB. More preferably, for the rAAV comprising a variant AAV capsid polypeptide and showing tropism for the hippocampus, the variant AAV capsid polypeptide comprises a 7-amino acid insertion as shown in any one of SEQ ID NO: 5, SEQ ID NO: 30, SEQ ID NO: 23, SEQ ID NO: 33, SEQ ID NO: 22, SEQ ID NO: 2, SEQ ID NO: 4, SEQ ID NO: 7, SEQ ID NO: 8, SEQ ID NO: 24 and SEQ ID NO: 1. The present application also relates to the use of the rAAVs as described in this paragraph for the delivery of GOIs to the hippocampus.

In one embodiment, the present application provides a rAAV comprising a variant AAV capsid polypeptide and showing tropism for the midbrain. Preferably, the rAAV showing tropism for the midbrain comprising the variant AAV capsid polypeptide which comprises a 7-amino acid insertion as shown in any one of SEQ ID NO: 30, SEQ ID NO: 5, SEQ ID NO: 29, SEQ ID NO: 23, SEQ ID NO: 4, SEQ ID NO: 33, SEQ ID NO: 2, SEQ ID NO: 22, SEQ ID NO: 7, SEQ ID NO: 8, SEQ ID NO: 24, SEQ ID NO: 15, SEQ ID NO: 26, SEQ ID NO: 37, SEQ ID NO: 47, and SEQ ID NO: 40 between the amino acid position Q588 and the amino acid position A589 of the wild-type AAV9 VP1 capsid protein as shown in SEQ ID NO: 121. Specifically, the rAAVs show improved tropism for the midbrain as compared to a rAAV having a wild-type capsid of AAV9 or AAV-PHP.eB. More preferably, for the rAAV comprising a variant AAV capsid polypeptide and showing tropism for the midbrain, the variant AAV capsid polypeptide comprises a 7-amino acid insertion as shown in any one of SEQ ID NO: 30, SEQ ID NO: 5, SEQ ID NO: 29, SEQ ID NO: 23, SEQ ID NO: 4, SEQ ID NO: 33, SEQ ID NO: 2, SEQ ID NO: 22, SEQ ID NO: 7, SEQ ID NO: 8, and SEQ ID NO: 24. The present application also relates to the use of the rAAVs as described in this paragraph for the delivery of GOIs to the midbrain.

In one embodiment, the present application provides a rAAV comprising a variant AAV capsid polypeptide and showing tropism to the thalamus. Preferably, the rAAV showing tropism for the thalamus comprising the variant AAV capsid polypeptide which comprises a 7-amino acid insertion as shown in any one of SEQ ID NO: 30, SEQ ID NO: 29, SEQ ID NO: 40, SEQ ID NO: 5, SEQ ID NO: 33, SEQ ID NO: 4, SEQ ID NO: 22, SEQ ID NO: 2, SEQ ID NO: 23, SEQ ID NO: 7, SEQ ID NO: 26, SEQ ID NO: 24, SEQ ID NO: 15, SEQ ID NO: 8, SEQ ID NO: 3, SEQ ID NO: 25, SEQ ID NO: 54, SEQ ID NO: 47, SEQ ID NO: 9, SEQ ID NO: 21, SEQ ID NO: 38, SEQ ID NO: 10, SEQ ID NO: 20, SEQ ID NO: 28, SEQ ID NO: 49, SEQ ID NO: 37, and SEQ ID NO: 51 between the amino acid position Q588 and the amino acid position A589 of the wild-type AAV9 VP1 capsid protein as shown in SEQ ID NO: 121. Specifically, the rAAVs show improved tropism for the thalamus as compared to a rAAV having a wild-type capsid of AAV9 or AAV-PHP.eB. More preferably, for the rAAV comprising a variant AAV capsid polypeptide and showing tropism for the thalamus, the variant AAV capsid polypeptide comprises a 7-amino acid insertion as shown in any one of SEQ ID NO: 30, SEQ ID NO: 29, SEQ ID NO: 40, SEQ ID NO: 5, SEQ ID NO: 33, SEQ ID NO: 4, SEQ ID NO: 22, SEQ ID NO: 2, SEQ ID NO: 23, and SEQ ID NO: 7. The present application also relates to the use of the rAAVs as described in this paragraph for the delivery of GOIs to the thalamus.

In one embodiment, the present application provides a rAAV comprising a variant AAV capsid polypeptide and showing tropism for the hypothalamus. Preferably, the rAAV showing tropism for the hypothalamus comprising the variant AAV capsid polypeptide which comprises a 7-amino acid insertion as shown in any one of SEQ ID NO: 30, SEQ ID NO: 3, SEQ ID NO: 21, SEQ ID NO: 29, SEQ ID NO: 5, SEQ ID NO: 4, SEQ ID NO: 23, SEQ ID NO: 33, SEQ ID NO: 2, SEQ ID NO: 22, SEQ ID NO: 7, SEQ ID NO: 24, SEQ ID NO: 40, SEQ ID NO: 8, SEQ ID NO: 26, SEQ ID NO: 38, SEQ ID NO: 15, SEQ ID NO: 10, SEQ ID NO: 25, SEQ ID NO: 36, SEQ ID NO: 47, SEQ ID NO: 54, SEQ ID NO: 53, SEQ ID NO: 20, SEQ ID NO: 17, SEQ ID NO: 35, SEQ ID NO: 6, SEQ ID NO: 9, SEQ ID NO: 28, SEQ ID NO: 51, SEQ ID NO: 12, SEQ ID NO: 44, and SEQ ID NO:

49 between the amino acid position Q588 and the amino acid position A589 of the wild-type AAV9 VP1 capsid protein as shown in SEQ ID NO: 121. Specifically, the rAAVs show improved tropism for the hypothalamus as compared to a rAAV having a wild-type capsid of AAV9 or AAV-PHP.eB. More preferably, for the rAAV comprising a variant AAV capsid polypeptide and showing tropism for the hypothalamus, the variant AAV capsid polypeptide comprises a 7-amino acid insertion as shown in any one of SEQ ID NO: 30, SEQ ID NO: 3, SEQ ID NO: 21, SEQ ID NO: 29, SEQ ID NO: 5, SEQ ID NO: 4, SEQ ID NO: 23, SEQ ID NO: 33, SEQ ID NO: 2, and SEQ ID NO: 22. The present application also relates to the use of the rAAVs as described in this paragraph for the delivery of GOIs to the hypothalamus.

In one embodiment, the present application provides a rAAV comprising a variant AAV capsid polypeptide and showing tropism for the cerebellum. Preferably, the rAAV showing tropism for the cerebellum comprising the variant AAV capsid polypeptide which comprises a 7-amino acid insertion as shown in any one of SEQ ID NO: 30, SEQ ID NO: 5, SEQ ID NO: 4, SEQ ID NO: 23, SEQ ID NO: 2, SEQ ID NO: 33, SEQ ID NO: 22, SEQ ID NO: 29, SEQ ID NO: 7, SEQ ID NO: 26, SEQ ID NO: 8, SEQ ID NO: 15, SEQ ID NO: 24, SEQ ID NO: 21, SEQ ID NO: 40, SEQ ID NO: 3, SEQ ID NO: 54, SEQ ID NO: 10, SEQ ID NO: 38, SEQ ID NO: 25, SEQ ID NO: 20, SEQ ID NO: 47, SEQ ID NO: 9, SEQ ID NO: 49, SEQ ID NO: 28, SEQ ID NO: 55, SEQ ID NO: 1, and SEQ ID NO: 44 between the amino acid position Q588 and the amino acid position A589 of the wild-type AAV9 VP1 capsid protein as shown in SEQ ID NO: 121. Specifically, the rAAVs show improved tropism for the cerebellum as compared to a rAAV having a wild-type capsid of AAV9 or AAV-PHP.eB. More preferably, for the rAAV comprising a variant AAV capsid polypeptide and showing tropism for the cerebellum, the variant AAV capsid polypeptide comprises a 7-amino acid insertion as shown in any one of SEQ ID NO: 30, SEQ ID NO: 5, SEQ ID NO: 4, SEQ ID NO: 23, SEQ ID NO: 2, SEQ ID NO: 33, SEQ ID NO: 22, SEQ ID NO: 29, SEQ ID NO: 7, and SEQ ID NO: 26. The present application also relates to the use of the rAAVs as described in this paragraph for the delivery of GOIs to the cerebellum.

In one embodiment, the present application provides a rAAV comprising a variant AAV capsid polypeptide and showing tropism for the medulla. Preferably, the rAAV showing tropism for the medulla comprising the variant AAV capsid polypeptide which comprises a 7-amino acid insertion as shown in any one of SEQ ID NO: 29, SEQ ID NO: 5, SEQ ID NO: 30, SEQ ID NO: 23, SEQ ID NO: 40, SEQ ID NO: 33, SEQ ID NO: 22, SEQ ID NO: 4, SEQ ID NO: 7, SEQ ID NO: 6, SEQ ID NO: 2, SEQ ID NO: 24, SEQ ID NO: 8, SEQ ID NO: 53, SEQ ID NO: 15, SEQ ID NO: 26, SEQ ID NO: 3, SEQ ID NO: 38, SEQ ID NO: 28, SEQ ID NO: 21, SEQ ID NO: 47, SEQ ID NO: 9, SEQ ID NO: 10, SEQ ID NO: 25, SEQ ID NO: 54, SEQ ID NO: 49, SEQ ID NO: 37 and SEQ ID NO: 1 between the amino acid position Q588 and the amino acid position A589 of the wild-type AAV9 VP1 capsid protein as shown in SEQ ID NO: 121. Specifically, the rAAVs show improved tropism for the medulla as compared to a rAAV having a wild-type capsid of AAV9 or AAV-PHP.eB. More preferably, for the rAAV comprising a variant AAV capsid polypeptide and showing tropism for the medulla, the variant AAV capsid polypeptide comprises a 7-amino acid insertion as shown in any one of SEQ ID NO: 29, SEQ ID NO: 5, SEQ ID NO: 30, SEQ ID NO: 23, SEQ ID NO: 40, SEQ ID NO: 33, SEQ ID NO: 22, SEQ ID NO: 4, SEQ ID NO: 7, SEQ ID NO: 6, SEQ ID NO: 2, SEQ ID NO: 24, SEQ ID NO: 8, SEQ ID NO: 53, SEQ ID NO: 15, SEQ ID NO: 26, SEQ ID NO: 3 and SEQ ID NO: 1. The present application also relates to the use of the rAAVs as described in this paragraph for the delivery of GOIs to the medulla.

In one embodiment, the present application provides a rAAV comprising a variant AAV capsid polypeptide and showing tropism for the pons. Preferably, the rAAV showing tropism for the pons comprising the variant AAV capsid polypeptide which comprises a 7-amino acid insertion as shown in any one of SEQ ID NO: 30, SEQ ID NO: 5, SEQ ID NO: 23, SEQ ID NO: 22, SEQ ID NO: 33, SEQ ID NO: 2, SEQ ID NO: 4, SEQ ID NO: 29, SEQ ID NO: 7, SEQ ID NO: 26, SEQ ID NO: 3, SEQ ID NO: 24, SEQ ID NO: 15, SEQ ID NO: 8, SEQ ID NO: 40, SEQ ID NO: 21, SEQ ID NO: 38, SEQ ID NO: 54, SEQ ID NO: 20, SEQ ID NO: 47, SEQ ID NO: 10, SEQ ID NO: 9, SEQ ID NO: 28, SEQ ID NO: 25, SEQ ID NO: 6, SEQ ID NO: 49, SEQ ID NO: 41, and SEQ ID NO: 37 between the amino acid position Q588 and the amino acid position A589 of the wild-type AAV9 VP1 capsid protein as shown in SEQ ID NO: 121. Specifically, the rAAVs show improved tropism for the pons as compared to a rAAV having a wild-type capsid of AAV9 or AAV-PHP.eB. More preferably, for the rAAV comprising a variant AAV capsid polypeptide and showing tropism for the pons, the variant AAV capsid polypeptide comprises a 7-amino acid insertion as shown in any one of SEQ ID NO: 30, SEQ ID NO: 5, SEQ ID NO: 23, SEQ ID NO: 22, SEQ ID NO: 33, SEQ ID NO: 2, SEQ ID NO: 4, SEQ ID NO: 29, SEQ ID NO: 7, and SEQ ID NO: 26. The present application also relates to the use of the rAAVs as described in this paragraph for the delivery of GOIs to the pons.

In one embodiment, the present application provides a rAAV comprising a variant AAV capsid polypeptide and showing tropism for the spinal cord. Preferably, the rAAV showing tropism for the spinal cord comprising the variant AAV capsid polypeptide which comprises a 7-amino acid insertion as shown in any one of SEQ ID NO: 29, SEQ ID NO: 33, SEQ ID NO: 40, SEQ ID NO: 5, SEQ ID NO: 30, SEQ ID NO: 22, SEQ ID NO: 23, SEQ ID NO: 2, SEQ ID NO: 4, SEQ ID NO: 7, SEQ ID NO: 15, SEQ ID NO: 24, SEQ ID NO: 8, SEQ ID NO: 26, SEQ ID NO: 38, SEQ ID NO: 25, SEQ ID NO: 21, SEQ ID NO: 3, SEQ ID NO: 6, SEQ ID NO: 10, SEQ ID NO: 9, SEQ ID NO: 28, SEQ ID NO: 49, SEQ ID NO: 47, SEQ ID NO: 54, SEQ ID NO: 51, SEQ ID NO: 20, SEQ ID NO: 35, SEQ ID NO: 43, SEQ ID NO: 46, SEQ ID NO: 53, and SEQ ID NO: 37 between the amino acid position Q588 and the amino acid position A589 of the wild-type AAV9 VP1 capsid protein as shown in SEQ ID NO: 121. Specifically, the rAAVs show improved tropism for the spinal cord as compared to a rAAV having a wild-type capsid of AAV9 or AAV-PHP.eB. More preferably, for the rAAV comprising a variant AAV capsid polypeptide and showing tropism for the spinal cord, the variant AAV capsid polypeptide comprises a 7-amino acid insertion as shown in any one of SEQ ID NO: 29, SEQ ID NO: 33, SEQ ID NO: 40, SEQ ID NO: 5, SEQ ID NO: 30, SEQ ID NO: 22, SEQ ID NO: 23, SEQ ID NO: 2, SEQ ID NO: 4, and SEQ ID NO: 7. The present application also relates to the use of the rAAVs as described in this paragraph for the delivery of GOIs to the spinal cord. The spinal cord can be spinal cord cervical part and/or spinal cord thoracic part.

In one embodiment, the present application provides a rAAV comprising a variant AAV capsid polypeptide and showing tropism for the dopaminergic (DA) neurons. Preferably, the rAAV showing tropism for the DA neurons comprising the variant AAV capsid polypeptide which comprises a 7-amino acid insertion as shown in any one of SEQ ID NO: 5, SEQ ID NO: 10, SEQ ID NO: 46, SEQ ID NO: 2, SEQ ID NO: 28, SEQ ID NO: 4, SEQ ID NO: 22, SEQ ID NO: 25, SEQ ID NO: 33, SEQ ID NO: 49, SEQ ID NO: 7, SEQ ID NO: 23, SEQ ID NO: 24, SEQ ID NO: 8, SEQ ID NO: 26, SEQ ID NO: 15, SEQ ID NO: 40, SEQ ID NO: 38, SEQ ID NO: 30, SEQ ID NO: 29, SEQ ID NO: 54, SEQ ID NO: 3, SEQ ID NO: 20, SEQ ID NO: 47, SEQ ID NO: 59, SEQ ID NO: 43, SEQ ID NO: 9, SEQ ID NO: 57, SEQ ID NO: 53, SEQ ID NO: 1, SEQ ID NO: 16, SEQ ID NO: 58, SEQ ID NO: 12, SEQ ID NO: 14, SEQ ID NO: 35, SEQ ID NO: 55 and SEQ ID NO: 17. Preferably, the variant AAV capsid polypeptide comprises a 7-amino acid insertion as shown in any one of SEQ ID NOs: 1, SEQ ID NO: 2, SEQ ID NO: 4 and SEQ ID NO: 23, and the rAAVs having said variant AAV capsid polypeptides show improved tropism for the DA neurons as compared to rAAVs having a wild-type capsid of AAV9. More preferably, the variant AAV capsid polypeptide comprises a 7-amino acid insertion as shown in any one of SEQ ID NO: 2 and SEQ ID NO: 4, and the rAAVs having said variant AAV capsid polypeptides show improved tropism for the DA neurons as compared to a rAAV having a wild-type capsid of AAV-PHP.eB. The present application also relates to the use of the rAAVs as described in this paragraph for the delivery of GOIs to the DA neurons.

In one embodiment, the present application provides a rAAV comprising a variant AAV capsid polypeptide and showing tropism for the cortical neurons. Preferably, the rAAV showing tropism for the cortical neurons comprising the variant AAV capsid polypeptide which comprises a 7-amino acid insertion as shown in any one of SEQ ID NOs: 1-60. Preferably, the variant AAV capsid polypeptide comprises a 7-amino acid insertion as shown in any one of SEQ ID NOs: 1 and SEQ ID NO: 2, and the rAAVs having said variant AAV capsid polypeptide show improved tropism for the cortical neurons as compared to a rAAV having a wild-type capsid of AAV9. The present application also relates to the use of the rAAVs as described in this paragraph for the delivery of GOIs to the cortical neurons.

In one embodiment, the present application provides a rAAV comprising a variant AAV capsid polypeptide and showing tropism for the motor neurons, e.g., immature or mature motor neurons, e.g., motor neurons derived from iPSCs. Preferably, the rAAV showing tropism for the motor neurons comprising the variant AAV capsid polypeptide which comprises a 7-amino acid insertion as shown in any one of SEQ ID NOs: 1-60. Preferably, the variant AAV capsid polypeptide comprises a 7-amino acid insertion as shown in any one of SEQ ID NOs: 1 and SEQ ID NO: 2, and the rAAVs having said variant AAV capsid polypeptide show improved tropism for the motor neurons as compared to a rAAV having a wild-type capsid of AAV9. The present application also relates to the use of the rAAVs as described in this paragraph for the delivery of GOIs to the motor neurons.

Uses

The rAAVs of the present application are particularly suitable for the delivery of GOIs to the CNS system due to their improved CNS tropism. Accordingly, it can be used for various applications, including the therapeutic uses for the treatment of CNS diseases, or uses for detection purposes. For a specific type of target tissue or cell in the CNS, the variant AAV capsid polypeptide can be selected based on the ranking and tissue preference provided by the present disclosure.

In an embodiment for therapeutic use, a therapeutically effective amount of rAAV virions is administered to a subject. The therapeutically effective amount can be from 1E+9 vg to 1E+16 vg, such as 1E+9 vg, 1E+10 vg, 1E+11 vg, 1E+12 vg, 1E+13 vg, 1E+14 vg, 1E+15 vg, or 1E+16.

The rAAVs of the present application can be administered via different routes. For example, the rAAVs of the present application can be administered to a subject systematically or locally. For example, the administration route includes but not limited to intravenous route, intramuscular route, intra cisterna magna injection, intrathecal injection, intravitreal injection, intraparenchymal injection or intracerebroventricular injection.

EXAMPLES

Example 1. Preparation of the AAV Capsid Library

By using an NNK saturation mutagenesis strategy adapted from prior art (Ravindra Kumar, S., et al., supra), a mutagenesis AAV library comprising mutated Cap gene (VP1 gene, the coding sequence of the wild-type AAV9 capsid protein VP1 is shown in SEQ ID NO: 122) was generated for the first round of screening (1$^{st}$ round library, or "R1 library"). The mutated capsid coding sequences comprised in the 1$^{st}$ round library have a randomized 21-base stretch consisting of 7-NNK codons, encoding a mutated capsid protein with a heptamer (7-amino acids or 7-mer) inserted at a position between the amino acid position 588 (Q) and the amino acid position 589 (A) of the wild-type AAV9 VP1 protein having an amino acid sequence as shown in SEQ ID NO: 121. As commonly understood in the art, N can be any one of A, C, G and T, and K can be either G or T. Therefore, the whole library could cover all of the possible combinations of the 7-amino acids (see FIG. 1). The construction of the 1st round library is described in details as follows. A scheme briefly describing the work flow is shown in FIG. 2.

Synthesis of the Randomized Fragments

First, short randomized nucleotide fragments were generated for insertion into the coding sequence of the AAV9 VP1 capsid protein. Each of the fragment comprised a coding sequence of a random heptamer. The randomized nucleotide fragments were synthesized by PCR using a degenerate primer set embedded with the randomized 21-base encoding the heptamer.

Digestion of the Backbone

KpnI and AgeI (NEB) were used to linearize the vector (rAAV-Cap-in-cis) and remove a region encoding the amino acids from position 546 (inclusive) to position 599 (inclusive) of the AAV9 VP1 protein. The enzyme digestion mixture is shown below.

| Reagents | Amount |
| --- | --- |
| vector | 12 ug |
| KpnI | 10 uL |
| AgeI | 10 uL |
| Cutsmart | 10 uL |
| ddH$_2$O | to 100 uL |

The digestion was performed overnight at 37° C., and the digested vector backbone was purified by Zymoclean Gel DNA Recovery Kit (ZYMO RESEARCH, D4008).

Ligation

The randomized library fragment was ligated into the linearized backbone in the NEBuilder® HiFi DNA Assembly Master Mix (NEB, E2621) at 50° C. for 1 h to give riase to the R1 library plasmids (rAAV-CapLib-in-cis).

Transformation of Plasmids

After the ligation, the mixture was diluted 4 folds, and 10 µL of the diluted ligation mixture was added into 100 µL of the TransStbl3 Chemically Competent Cell (TransGen Biotech, CD521-02) and incubated on ice for 30 min, then heated at 42° C. for 30 s, and placed on ice for 3 min. After that, 1 mL SOC medium was added to the cells and incubated at 37° C. for 2 h in a shaker. Then the cells were transferred to 20 mL LB medium containing 50 µg/mL ampicillin and incubated for 4 h at 37° C., and then transferred to 300 mL LB medium containing 100 µg/mL ampicillin to continue grow for 12 h before plasmid extraction.

Plasmid Extraction

The plasmids for the rAAV production were extracted using the Purelink hipure filter maxi kit (Thermo, K210018) following the manufacturer's instructions. Briefly, 300 mL overnight culture was centrifuged at 8,000 rpm to collect the bacteria, and resuspended with 15 mL R3, followed by adding 15 mL L7 to lyse for 5 min. Then 15 mL N3 was added for 10 min and centrifuged at 12,000 rpm, the supernatant was then poured into a column treated with EQ1. Then 40 mL W8 was added to wash the column twice, Followed by adding 15 mL E4 to elute the plasmid DNAs into a new centrifuge tube. 10.5 mL isopropyl alcohol was added to the tube and centrifuged at 9,000 rpm at 4° C. for 1 h to collect the plasmid DNAs. The supernatant was removed, and the precipitated plasmid DNAs were transferred into a 1.5 mL centrifuge tube, resuspended and washed twice with 70% ethanol. The tube was then placed at 65° C. to allow the ethanol to evaporate, and 200 uL sterile water was added to dissolve the plasmid DNAs.

rAAV Production and Purification

HEK293T cells were cultivated in Dulbecco's Modified Eagle Medium (DMEM, Gibco, C11995500BT) supplemented with 10% Fetal Bovine Serum (FBS, Gibco, 10099141) and 1% Penicillin Streptomycin (PS, Gibco, 15140-122).

For rAAV library production, the rAAV-CapLib-in-cis DNA library was co-transfected with the AAV helper plasmid into HEK293T cells in 15-cm culture dishes using lipofectamine LTX and plus reagents (Invitrogen, 94756). After 6-8 h of incubation, the culture medium was replaced with DMEM (5% FBS, 1% PS). The first collection was conducted 48 h after transfection by collecting rAAVs from the supernatant. Cells together with the medium were harvested for the second time at 72 h after transfection.

For iodixanol purification, the HEK293T cells from eight 15-cm plates were dissolved in 30 mL of lysis buffer. 60% iodixanol (Axis-Shield, AS1114542) was diluted to 15%, 25%, 40% and 60% in 10×PBS-MK (10×PBS, 10 mM $MgCl_2 \cdot 6H_2O$, 25 mM KCl). NaCl was added to the 15% phase at 1 M final concentration. To make it easier to distinguish the interface within the gradient, 2 µL phenol red was added to 1 mL of 25% and 60% iodixanol solutions, respectively. 15 mL processed cell lysate, 9 mL of 15%, 6 mL of 25%, 5 mL of 40%, and 5 mL of 60% iodixanol solution were added from top to bottom to the 39-mL Quick-Seal tubes (Beckman, 344326). After centrifugation in a 70 Ti rotor for 1.5 h at 60,000 rpm at 18° C., the rAAVs were collected from the 40% phase and ultrafiltered with PBS containing 0.001% Pluronic™ F-68 Non-ionic Surfactant (Gibco, 24040032) and concentrated using Amicon Ultra-4 centrifugal filters (Millipore, UFC810096). The purified rAAV was stored at −80° C. as the R1 rAAV library.

R1 Library Characterization

Deep sequencing was conducted on both the R1 DNA library rAAV-CapLib-in-cis and the final R1 rAAV library. In the R1 rAAV library prepared from the R1 DNA library, 376,441 types of unique inserted sequences were confirmed.

Example 2. First Round In Vivo Screening

This example describes the process of the first round AAV capsid library screening, which generated over 8,000 candidate variants of distinct capsid protein sequences.

Screening for AAV-Naïve Monkeys by In Vitro Neutralizing Antibody Assay

AAV neutralizing antibodies (NAbs) in the experimental animals were determined via an in vitro neutralizing antibody assay to identify and select AAV-naïve monkeys to use for the screening of the rAAV library. Serum from 1 year old cynomolgus macaque was collected 1 month before injection (n=3 technical replicates for each assay condition). Cells were seeded in a 96-well plate (Corning, 356690) at a density of 25,000 cells/well. Twenty-four h later, serum from the cynomolgus macaques was serially diluted at 1:4, 1:8, and 1:16, and then incubated with AAV9-CMV-lacZ @ 1E+4 vg/cell for 1 h at 37° C. The neutralized samples were then added in triplicates to the cells and returned to 37° C. for 24 h. Absorbance was measured with the β-galactosidase Assay Kit (Beyotime, RG0036) on the SpectraMax L microplate reader (Molecular Devices). Cynomolgus macaques showing less than 50% inhibition at the 1:4 dilution were selected for the in vivo study.

rAAV Administration

One-year-old cynomolgus monkeys were anesthetized by intramuscular injection of 1% sodium pentobarbital (80 mg/kg), and 2 mL rAAV library virus was injected into the medulla bulbar cisternae with a sterile syringe. The library was injected into four monkeys, two males and two females. Three weeks later, the cynomolgus monkeys were anesthetized with sodium pentobarbital by intraperitoneal injection for tissue collection.

Tissue Collection

Cardiac perfusion was performed with normal saline. The thoracic cavity was cut along the manubrium sternum, and pericardium was cut to expose the heart. The left ventricle was cut at an Angle of 30° to 45° from the apex of the heart. The needle was fixed, then the blood was quickly rinsed with normal saline, and the infusion was completed when the fluid from the right atrial appendage became colorless and transparent.

The monkey's skull was opened with an electric craniotomy saw, the brain was removed and dissected in normal saline. Tissue collection was done from the parietal lobe, frontal lobe, insula, occipital lobe, temporal lobe, hippocampus, striatum, pons, medulla oblongata, midbrain, cerebellum, thalamus, hypothalamus, corpus callosum, pituitary gland, optic nerve, and the olfactory bulb in both hemispheres separately. Each tissue sample was cut into two portions and frozen immediately on dry ice, then stored at −80° C. for further evaluations (DNA and RNA extraction).

RNA Extraction

One portion of each frozen tissue (0.2 g approx.) was cut into pieces and homogenized with beads using the BeadBug homogenizers (Homogenizers, Benchmark Scientific, D1032-15, D1032-30, D1033-28) in Trizol. RNA extraction was performed by PureLink® RNA Mini Kit (Invitrogen, 12183018A) according to the manual provided. Purified RNA was dissolved in RNAse-free water and stored at −80° C.

Construction of the cDNA Library

The resulting RNA products from each brain region were individually subjected to reverse transcription to generate corresponding viral cDNA library, using M-MLV Reverse Transcriptase (Promega, M170A) in a 20 μL reverse transcription reaction containing 1 μg RNA, 10 mM dNTP, 1 μL Rnasin, 0.5 μL Oligo DT, 0.5 μL random primer, 1 μL M-MLV and 4 μL buffer.

Generation of Tissue Specific Libraries

Tissue specific AAV libraries ("Tissue library") were generated for deep sequencing by PCR amplifying the region comprising the 21-nt insertion.

the Tissue Enrichment Score Analysis

The enrichment score of each variant capsid polypeptide was calculated to evaluate its biodistribution in different tissues. Specifically, each "enrichment score" was calculated using the following formula:

$$\text{Enrichment score} = \frac{\text{Rate of tissue library}}{\text{Rate of } AAV \text{ library}} \quad (I)$$

wherein the "rate of tissue library" is defined as the ratio of the reads of the AAV variant in the tissue library to the total reads of the tissue library; and the "rate of AAV library" is defined as the ratio of the reads of the AAV variant in the AAV library to the total reads of the AAV library.

After the 1$^{st}$ round of screening as described above, 8,162 variant capsid polypeptides with enrichment scores greater than 100 from the collected tissues were selected. Corresponding nucleotide sequences of the selected variants were synthesized to generate the 2$^{nd}$ round DNA library (R2 library) by repeating steps 3-5 of the flow chart as shown in FIG. 2 to further identify the best tissue-specific variants for each brain region.

Example 3. The Second Round In Vivo Screening

As described above, the nucleotide sequences of the 8,162 capsid variants selected from the first round library screening were synthesized and used for the construction of a new plasmid library (2$^{nd}$ round library; R2 library). The 2$^{nd}$ round library was constructed same as the 1$^{st}$ round library as described earlier and the library was injected into two cynomolgus monkeys, one female and one male.

In vivo screening and sequence analysis were performed with the 2$^{nd}$ round AAV library following the same procedure as the 1$^{st}$ round library as described in Example 2. As shown in Table 1, deep sequencing analysis identified the numbers of inserted sequences detected in each brain region. L represents left hemisphere; R represents right hemisphere.

TABLE 1

The numbers of inserted sequences identified in each tissue

| Library name | Expected numbers of inserted sequences in theR2 library | Numbers of inserted sequences in the R2 library | Ratio |
| --- | --- | --- | --- |
| Plasmid library | 8,162 | 7,707 | 94.43% |
| AAV library | 8,162 | 7,636 | 93.56% |
| Parietal-L | 7,636 | 289 | 3.78% |
| Frontal-L | 7,636 | 1,252 | 16.40% |
| Temporal-L | 7,636 | 389 | 5.09% |
| Occipital-L | 7,636 | 570 | 7.46% |
| Insula-L | 7,636 | 939 | 12.30% |
| Hippocampus-L | 7,636 | 678 | 8.88% |
| Striatum-L | 7,636 | 941 | 12.32% |
| Cerebellum-L | 7,636 | 588 | 7.70% |
| Parietal-R | 7,636 | 313 | 4.10% |
| Frontal-R | 7,636 | 623 | 8.16% |
| Temporal-R | 7,636 | 196 | 2.57% |
| Occipital-R | 7,636 | 641 | 8.39% |
| Insula-R | 7,636 | 624 | 8.17% |
| Hippocampus-R | 7,636 | 667 | 8.73% |
| Striatum-R | 7,636 | 577 | 7.56% |
| Cerebellum-R | 7,636 | 476 | 6.23% |

Among the variants identified from the 2$^{nd}$ round library screen, 60 capsid candidates were selected based on the following two criteria: (1) high enrichment score (cut-off≥1000) in at least one brain region; and (2) higher enrichment score as compared to both reference capsids, AAV9 and PHP.eB capsids. These 60 capsid candidates were named as ViVec-N001 to ViVec-N060. Some capsid candidates (ViVec-N001, ViVec-N002, ViVec-N003, and ViVec-N004) showed higher enrichment scores in most of the brain regions (see FIG. 3). Some candidates showed higher enrichment scores in multiple disease-relevant brain regions (e.g., frontal and temporal lobe for frontotemporal dementia, or hippocampus for Alzheimer's Disease), including ViVec-N020, ViVec-N021, ViVec-N023, and ViVec-N033. Some candidates like ViVec-N005 and ViVec-N006 were specifically enriched in one brain region. The 21 inserted nucleotide and 7 amino acid sequences of these selected 60 capsid variant candidates are shown in Table 2 and Table 3, respectively. The complete sequences of the Cap gene and protein can be accordingly determined by inserting the individual sequence into the position between amino acid position 588 and 589 of the wild-type AAV9 sequences as shown in SEQ ID NO: 121 (amino acid sequence) and SEQ ID NO: 122 (nucleotide sequence).

TABLE 2

The inserted 21-nucleotide sequences of the 60 selected AAV variants

| Name | Inserted sequences (Nucleotide sequence) | SEQ ID NO: |
| --- | --- | --- |
| AAV9 | — | |
| AAV-PHP.eB | — | |
| ViVec-N001 | GGGGTCTTTGTGCTTCCGAAT | 61 |
| ViVec-N002 | GGGAATTATAGGGGTAATCCG | 62 |
| ViVec-N003 | TGTTCTTCTCGTAGGTCTAAG | 63 |
| ViVec-N004 | TTTCGTCATGGGCCGCCGTCG | 64 |
| ViVec-N005 | CGTTTTAAGACTGGTTATCCG | 65 |
| ViVec-N006 | GGGAAGCATCCGGCGAAGCTG | 66 |
| ViVec-N007 | AATCGGGGCGTTCGGGTGAG | 67 |
| ViVec-N008 | AGGGAGCCGAGGGTTGGTCCG | 68 |

TABLE 2-continued

The inserted 21-nucleotide sequences of the 60 selected AAV variants

| Name | Inserted sequences (Nucleotide sequence) | SEQ ID NO: |
|---|---|---|
| ViVec-N009 | GTGACTTTTTCGCATGCGCAG | 69 |
| ViVec-N010 | GATTCGAGGCTTACTGGTAGG | 70 |
| ViVec-N011 | GAGCCGATTGCGCGTCCTCTG | 71 |
| ViVec-N012 | AGTAGTTCGTGGAGGCCGAAG | 72 |
| ViVec-N013 | GATCTGCGGGATGTGCTGGGG | 73 |
| ViVec-N014 | CCGTATAGGTCGGCGTTGTGG | 74 |
| ViVec-N015 | CTTAAGCCGTATCATTTGGAG | 75 |
| ViVec-N016 | GGGAATAAGCCGAATGTTGAT | 76 |
| ViVec-N017 | TGGACGGCGGTGCTGGTGCAG | 77 |
| ViVec-N018 | CATACGGAGAGTACGTATGGG | 78 |
| ViVec-N019 | CCAGATGAGAAGATGACTAAG | 79 |
| ViVec-N020 | CAGCCTTGGCAGCAGTGGCAG | 80 |
| ViVec-N021 | TTGATGTTGAGGCCGTATATG | 81 |
| ViVec-N022 | TGGCGTAATCAGCAGGTGGGT | 82 |
| ViVec-N023 | GTGGGAGGTTGGCTAGGGCG | 83 |
| ViVec-N024 | TTGAGGCGGTCGCGGATGTCT | 84 |
| ViVec-N025 | ATTCTGCATGCGGCTCGTGCT | 85 |
| ViVec-N026 | GCGGGTCATACGACGAAGGTT | 86 |
| ViVec-N027 | GCGGGGGATGAATGGAGGCCG | 87 |
| ViVec-N028 | GTAACGAAGAAGCAGGAGACT | 88 |
| ViVec-N029 | AGGCCAATGTCGACGTGTTCG | 89 |
| ViVec-N030 | CGGCAGCGGCGGGCTAATAAG | 90 |
| ViVec-N031 | CATCTGGAGACGGCGAGGCAG | 91 |
| ViVec-N032 | TTGTCGGATGCGAAGATGGGG | 92 |
| ViVec-N033 | ACTCGTATTACGTCTGTGTAT | 93 |
| ViVec-N034 | CTTTGGATTGAGAGTCGTCCG | 94 |
| ViVec-N035 | GCGAAGGGTGATATGTGTAAT | 95 |
| ViVec-N036 | GTTCCTGATCTAAAGGATTGT | 96 |
| ViVec-N037 | GTGCAGTCTGAGAGTCATGGT | 97 |
| ViVec-N038 | TTTTTTCTGGATAGGCCGCGT | 98 |
| ViVec-N039 | GTTCTGACTGCGACGATTGAT | 99 |
| ViVec-N040 | AAGGGGGGGCGATGTGTTGT | 10 |
| ViVec-N041 | ATTTGGCATGTTCGGTATGAG | 10 |
| ViVec-N042 | ACGGGTGAGCATGCGACTACT | 102 |
| ViVec-N043 | GATAAGAGTACGCAGCCGTGT | 103 |
| ViVec-N044 | CCTGCGGTGGTTATTGCTAAT | 104 |
| ViVec-N045 | GTTACGGGGATTATGGGATG | 105 |
| ViVec-N046 | GAGTGGTCGAGTAAGAAGACC | 106 |
| ViVec-N047 | AATAGGGGGGTTAGTATTGAG | 107 |
| ViVec-N048 | CCGACGGATCGTCAGTGGCCG | 108 |
| ViVec-N049 | ATTTCTGCGTCGTATGCGAGG | 109 |
| ViVec-N050 | GGGCCGTGTAGTCTGCCGGGG | 110 |
| ViVec-N051 | GATTATGCGGCTCCGTGTCAG | 111 |
| ViVec-N052 | GGTACTAGGGAGGTGGAGTGG | 112 |
| ViVec-N053 | AGGAATGTTTCTCCGGCGCGG | 113 |
| ViVec-N054 | ACGGGGCTTGGTTGGACTGGG | 114 |
| ViVec-N055 | AGTTTTGAGAGGACGGATAAG | 115 |
| ViVec-N056 | CAGTTGGATGGGGATCGTTCG | 116 |
| ViVec-N057 | TGGTGGGAGCCGACTACGACG | 117 |
| ViVec-N058 | GATATTTTGACTAATTATCGG | 118 |
| ViVec-N059 | CATTCTTATGATCGGACGTCG | 119 |
| ViVec-N060 | TTGCCGAGTGCTCAGCTGATG | 120 |

TABLE 3

The inserted 7-amino acid sequences of the 60 selected AAV variants

| Name | Inserted sequences (Amino acid sequence) | SEQ ID NO: |
|---|---|---|
| AAV9 | — | |
| AAV-PHP.eB | — | |
| ViVec-N001 | GVFVLPN | 1 |
| ViVec-N002 | GNYRGNP | 2 |
| ViVec-N003 | CSSRRSK | 3 |
| ViVec-N004 | FRHGPPS | 4 |
| ViVec-N005 | RFKTGYP | 5 |
| ViVec-N006 | GKHPAKL | 6 |
| ViVec-N007 | NRGRSGE | 7 |
| ViVec-N008 | REPRVGP | 8 |
| ViVec-N009 | VTFSHAQ | 9 |
| ViVec-N010 | DSRLTGR | 10 |
| ViVec-N011 | EPIARPL | 11 |
| ViVec-N012 | SSSWRPK | 12 |
| ViVec-N013 | DLRDVLG | 13 |
| ViVec-N014 | PYRSALW | 14 |

TABLE 3-continued

The inserted 7-amino acid sequences of the 60 selected AAV variants

| Name | Inserted sequences (Amino acid sequence) | SEQ ID NO: |
|---|---|---|
| ViVec-N015 | LKPYHLE | 15 |
| ViVec-N016 | GNKPNVD | 16 |
| ViVec-N017 | WTAVLVQ | 17 |
| ViVec-N018 | HTESTYG | 18 |
| ViVec-N019 | PDEKMTK | 19 |
| ViVec-N020 | QPWQQWQ | 20 |
| ViVec-N021 | LMLRPYM | 21 |
| ViVec-N022 | WRNQQVG | 22 |
| ViVec-N023 | VGRLARA | 23 |
| ViVec-N024 | LRRSRMS | 24 |
| ViVec-N025 | ILHAARA | 25 |
| ViVec-N026 | AGHTTKV | 26 |
| ViVec-N027 | AGDEWRP | 27 |
| ViVec-N028 | VTKKQET | 28 |
| ViVec-N029 | RPMSTCS | 29 |
| ViVec-N030 | RQRRANK | 30 |
| ViVec-N031 | HLETARQ | 31 |
| ViVec-N032 | LSDAKMG | 32 |
| ViVec-N033 | TRITSVY | 33 |
| ViVec-N034 | LWIESRP | 34 |
| ViVec-N035 | AKGDMCN | 35 |
| ViVec-N036 | VPDLKDC | 36 |
| ViVec-N037 | VQSESHG | 37 |
| ViVec-N038 | FFLDRPR | 38 |
| ViVec-N039 | VLTATID | 39 |
| ViVec-N040 | KGGAMCC | 40 |
| ViVec-N041 | IWHVRYE | 41 |
| ViVec-N042 | TGEHATT | 42 |
| ViVec-N043 | DKSTQPC | 43 |
| ViVec-N044 | PAVVIAN | 44 |
| ViVec-N045 | VTGDYGM | 45 |
| ViVec-N046 | EWSSKKT | 46 |
| ViVec-N047 | NRGVSIE | 47 |
| ViVec-N048 | PTDRQWP | 48 |
| ViVec-N049 | ISASYAR | 49 |
| ViVec-N050 | GPCSLPG | 50 |
| ViVec-N051 | DYAAPCQ | 51 |
| ViVec-N052 | GTREVEW | 52 |
| ViVec-N053 | RNVSPAR | 53 |
| ViVec-N054 | TGLGWTG | 54 |
| ViVec-N055 | SFERTDK | 55 |
| ViVec-N056 | QLDGDRS | 56 |
| ViVec-N057 | WWEPTTT | 57 |
| ViVec-N058 | DILTNYR | 58 |
| ViVec-N059 | HSYDRTS | 59 |
| ViVec-N060 | LPSAQLM | 60 |

Example 4. In Vivo Characterization of the Selected AAV Capsid Candidates

The 60 capsid candidates from the $2^{nd}$ round library screen were built into a two-plasmid system for AAV packaging, which included a main plasmid and a helper-RC plasmid.

Preparation of the AAV GFP Barcode Library

The selected 60 capsid variants from the $2^{nd}$ round of screening were used to construct corresponding helper plasmids. The AAVs were packaged by using a two-plasmid system consisting of the main plasmid pAAV-CMV-GFP-lib and a helper plasmid.

Figures 3, 4:
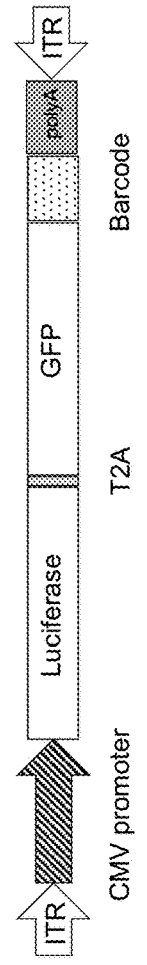
FIG. 3 shows the enrichment scores of AAV vectors having AAV9 capsid, PHP-eB capsid and 10 engineered capsids of the present application (candidates ViVec-N001, ViVec-N002, ViVec-N003, ViVec-N004, ViVec-N005, ViVec-N006, ViVec-N020, ViVec-N021, ViVec-N023, and ViVec-N033) in different brain regions. The first column indicates the sequences of the inserted amino acids.
FIG. 4 illustrates the structure of the construct pAAV-CMV-GFP-lib to be included in the main plasmid for the preparation of the rAAV GFP-Barcode library.

As shown in FIG. 4, the main plasmid was constructed to comprise a packed genome, and two ITR elements flanking a construct comprising a luciferase gene operatively linked to a GFP gene via a T2A peptide under the control of a CMV promoter. The construct also comprises a barcode downstream of the GFP gene.

The helper plasmid was constructed to comprise an ampicillin resistance gene, AAV2-REP78, Ad5 ψ and other elements that are involved in AAV capsid translation and assembly, as well as the Cap sequences encoding the AAV capsid proteins.

To construct helper plasmids of different AAV variants the Cap gene was cleaved by SwaI and PacI (NEB) in a reaction mixture as shown below:

| Reagents | Amount |
|---|---|
| helper plasmid | 12 ug |
| SwaI | 10 uL |
| PacI | 10 uL |
| buffer 3.1 | 10 uL |
| ddH$_2$O | to 100 uL |

The reaction was carried out overnight at 37° C., and the plasmid backbone was recovered after gel electrophoresis. Each of the candidate capsid coding sequences was connected to the backbone vector by infusion. After plasmid extraction, the AAV transgene main plasmid pAAV-CMV-GFP-lib (10 ng), and pUC19 (8 μg) were co-transfected with the AAV helper plasmid (30 μg) into HEK293T cells per 15-cm dish using lipofectamine LTX and plus reagents (Invitrogen, 94756).

The same AAV packaging process used to generate R1 and R2 AAV libraries was performed to produce an AAV variant library containing the 60 selected capsid variants. After purification and concentration, except for several low-yielded AAV variants, most of the 60 selected AAV variants were mixed equally to build the AAV GFP-Barcode library.

In Vivo Study in the Cynomolgus Monkeys

The AAV library was delivered via intra cisterna magna injection to the cynomolgus monkeys that met our AAV neutralizing antibody (NAbs) screening criteria as described above in Example 2.

The same tissue collection procedure was performed as for R1 and R2 library screening. The genomic DNAs (gDNA) were extracted from the collected tissues. One portion (30 mg) of the frozen tissue was used to extract gDNA by using the E.Z.N.A. MicroElute Genomic DNA Kit (Omega, D3096-02) according to the manufacturer's instructions. The concentration and quality of the gDNA were determined by Qubit 4 fluorometer (Invitrogen, Q33226).

The Tissue Enrichment Scores of the Various AAV Variants

The vector genome copy number of each variant was determined by deep sequencing of genomic samples processed from the tissues collected, including the parietal lobe, frontal lobe, insula, occipital lobe, temporal lobe, hippocampus, striatum, midbrain, cerebellum, thalamus, hypothalamus in both hemisphere, pons, medulla, and spinal cord. The results are shown in FIGS. 5-18.

As shown in FIGS. 5-18, the enrichment score of each capsid candidate was normalized to that of AAV9. ViVec-N001, ViVec-N002, ViVec-N003, ViVec-N004, ViVec-N005, ViVec-N007, ViVec-N008, ViVec-N009, ViVec-N010, ViVec-N011, ViVec-N012, ViVec-N015, ViVec-N016, ViVec-N017, ViVec-N020, ViVec-N021, ViVec-N022, ViVec-N023, ViVec-N024, ViVec-N025, ViVec-N026, ViVec-N027, ViVec-N028, ViVec-N029, ViVec-N030, ViVec-N033, ViVec-N035, ViVec-N036, ViVec-N037, ViVec-N038, ViVec-N039, ViVec-N040, ViVec-N041, ViVec-N043, ViVec-N044, ViVec-N045, ViVec-N046, ViVec-N047, ViVec-N049, ViVec-N050, ViVec-N051, ViVec-N053, ViVec-N054, ViVec-N055, and ViVec-N058 outperformed AAV9 (relative enrichment score >1) in at least one brain region.

Figure 5:
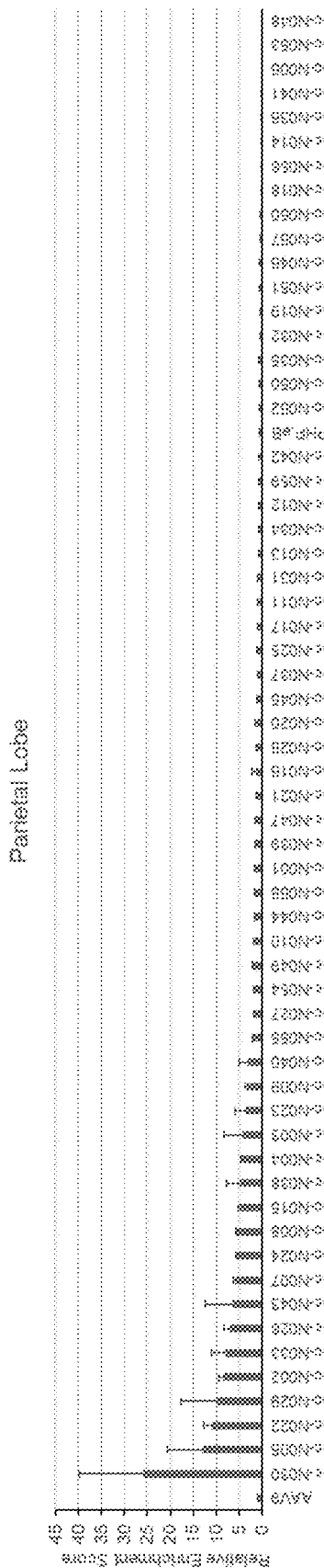

In the parietal lobe, ViVec-N030, ViVec-N005, ViVec-N022, ViVec-N029, ViVec-N002, ViVec-N033, ViVec-N026, ViVec-N043, ViVec-N007, ViVec-N024, ViVec-N008, ViVec-N015, ViVec-N038, ViVec-N004, ViVec-N003, ViVec-N023, ViVec-N009, ViVec-N040, ViVec-N055, ViVec-N027, ViVec-N054, ViVec-N049, ViVec-N010, ViVec-N044, ViVec-N058, ViVec-N001, ViVec-N039, ViVec-N047, ViVec-N021, ViVec-N016, ViVec-N028, ViVec-N020, and ViVec-N045 ranked from high to low, as shown in FIG. 5.

Figure 6:
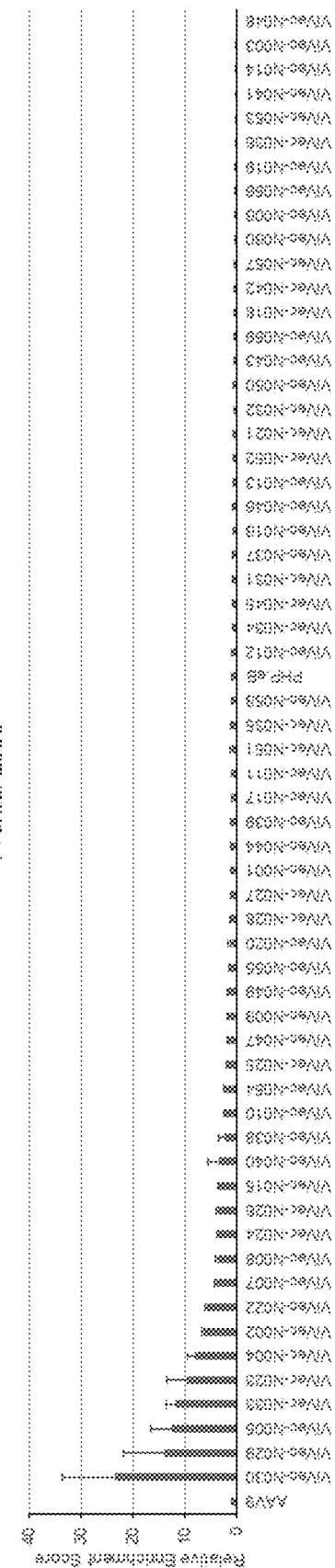

In the frontal lobe, ViVec-N030, ViVec-N029, ViVec-N005, ViVec-N033, ViVec-N023, ViVec-N004, ViVec-N002, ViVec-N022, ViVec-N007, ViVec-N008, ViVec-N024, ViVec-N026, ViVec-N015, ViVec-N040, ViVec-N038, ViVec-N010, ViVec-N054, ViVec-N025, ViVec-N047, ViVec-N009, ViVec-N049, ViVec-N055, ViVec-N020, ViVec-N028, ViVec-N027, ViVec-N001, ViVec-N044, and ViVec-N039 ranked from high to low, as shown in FIG. 6.

In the temporal lobe, ViVec-N029, ViVec-N030, ViVec-N005, ViVec-N033, ViVec-N023, ViVec-N004, ViVec-N002, ViVec-N022, ViVec-N040, ViVec-N007, ViVec-N008, ViVec-N024, ViVec-N015, ViVec-N026, ViVec-N051, ViVec-N038, ViVec-N003, ViVec-N025, ViVec-N035, ViVec-N054, ViVec-N010, ViVec-N047, ViVec-N009, ViVec-N049, ViVec-N028, ViVec-N055, ViVec-N020, ViVec-N027, ViVec-N050, ViVec-N058, ViVec-N001, ViVec-N039, ViVec-N044, and ViVec-N011 ranked from high to low, as shown in FIG. 7.

In the occipital lobe, ViVec-N022, ViVec-N002, ViVec-N005, ViVec-N033, ViVec-N029, ViVec-N007, ViVec-N026, ViVec-N030, ViVec-N008, ViVec-N024, ViVec-N004, ViVec-N015, ViVec-N020, ViVec-N040, ViVec-N009, ViVec-N038, ViVec-N054, ViVec-N023, ViVec-N049, ViVec-N010, ViVec-N055, ViVec-N047, ViVec-N001, ViVec-N027, ViVec-N044, ViVec-N058, ViVec-N025, ViVec-N028, and ViVec-N039 ranked from high to low, as shown in FIG. 8.

Figure 9:
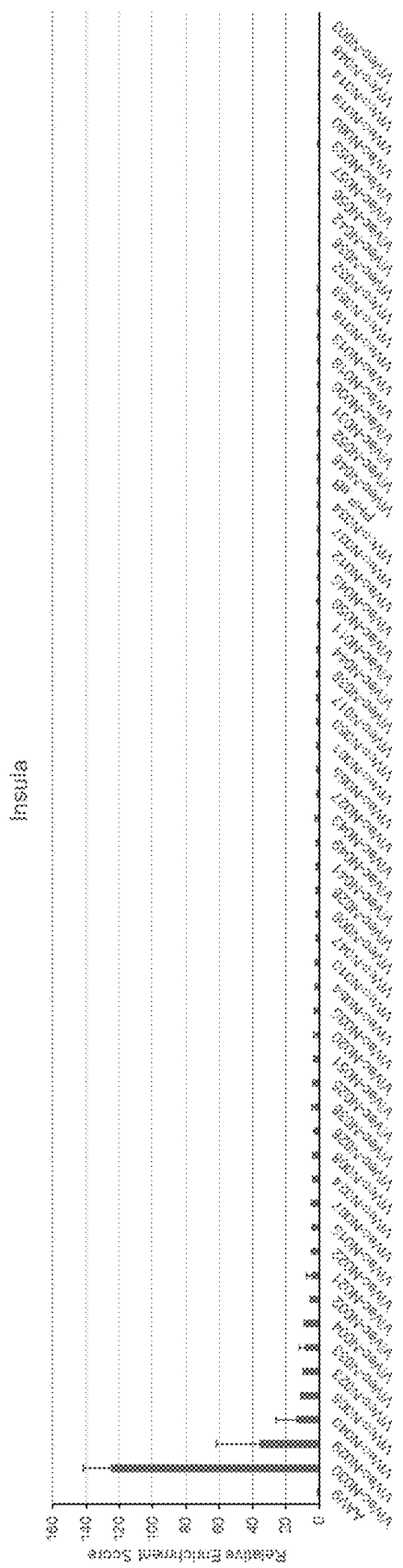

In the insular lobe, ViVec-N030, ViVec-N029, ViVec-N040, ViVec-N005, ViVec-N023 ViVec-N033, ViVec-N004, ViVec-N002, ViVec-N021, ViVec-N022, ViVec-N015, ViVec-N007, ViVec-N024, ViVec-N008, ViVec-N026, ViVec-N038, ViVec-N025, ViVec-N051, ViVec-N020, ViVec-N035, ViVec-N054, ViVec-N010, ViVec-N047, ViVec-N009, ViVec-N028, ViVec-N041, ViVec-N049, ViVec-N043, ViVec-N027, ViVec-N055, ViVec-N001, ViVec-N050, ViVec-N017, ViVec-N039, ViVec-N044, and ViVec-N011 ranked from high to low, as shown in FIG. 9.

Figure 10:
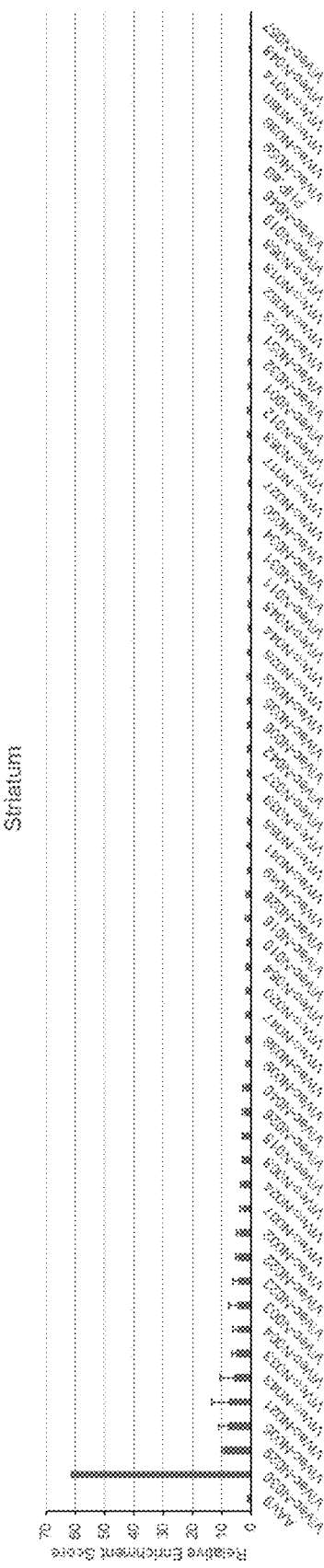

In the striatum, ViVec-N030, ViVec-N029, ViVec-N005, ViVec-N021, ViVec-N043, ViVec-N033, ViVec-N004, ViVec-N003, ViVec-N023, ViVec-N022, ViVec-N002, ViVec-N007, ViVec-N024, ViVec-N008, ViVec-N015, ViVec-N026, ViVec-N040, ViVec-N009, ViVec-N038, ViVec-N047, ViVec-N020, ViVec-N054, ViVec-N010, ViVec-N016, ViVec-N028, ViVec-N049, ViVec-N041, and ViVec-N055 ranked from high to low, as shown in FIG. 10.

Figure 11:
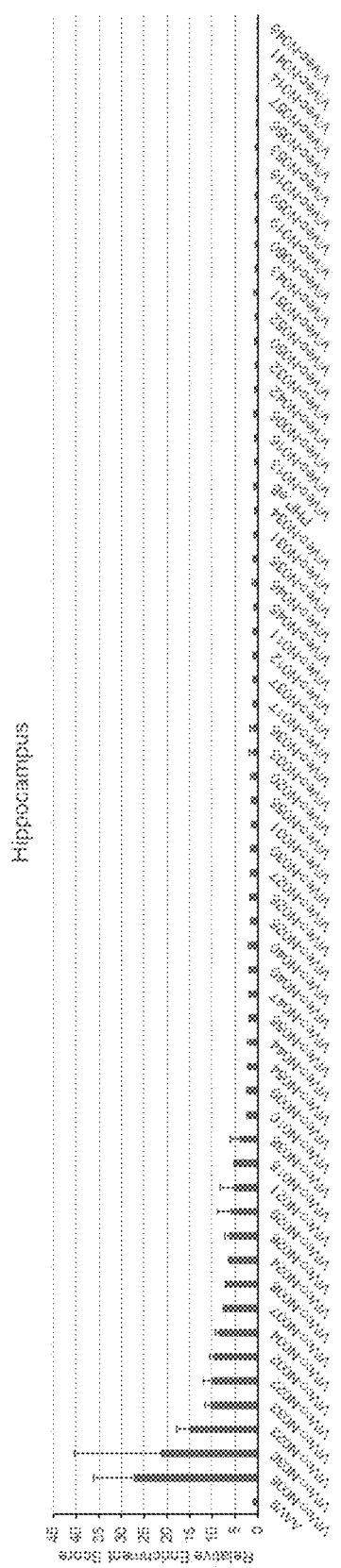

In the hippocampus, ViVec-N005, ViVec-N030, ViVec-N023, ViVec-N033, ViVec-N022, ViVec-N002, ViVec-N004, ViVec-N007, ViVec-N008, ViVec-N024, ViVec-N026, ViVec-N029, ViVec-N021, ViVec-N015, ViVec-N038, ViVec-N010, ViVec-N009, ViVec-N054, ViVec-N044, ViVec-N055, ViVec-N047, ViVec-N049, ViVec-N040, ViVec-N025, ViVec-N028, ViVec-N027, ViVec-N039, ViVec-N001, ViVec-N058, ViVec-N020, ViVec-N003, and ViVec-N036 ranked from high to low, as shown in FIG. 11.

Figure 12:
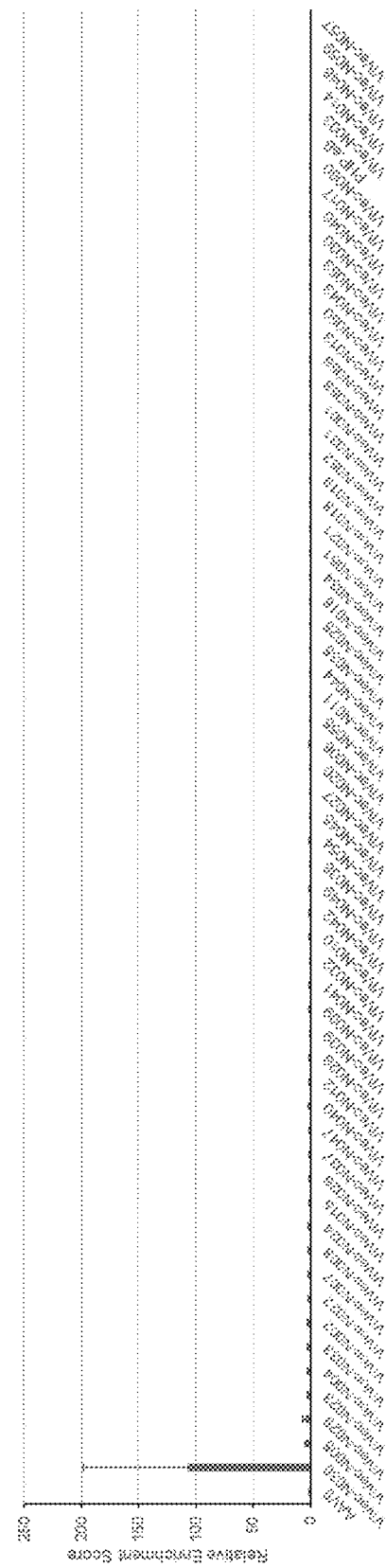

In the midbrain, ViVec-N030, ViVec-N005, ViVec-N029, ViVec-N023, ViVec-N004, ViVec-N033, ViVec-N002, ViVec-N022, ViVec-N007, ViVec-N008, ViVec-N024, ViVec-N015, ViVec-N026, ViVec-N037, ViVec-N047, and ViVec-N040 ranked from high to low, as shown in FIG. 12.

Figure 13:
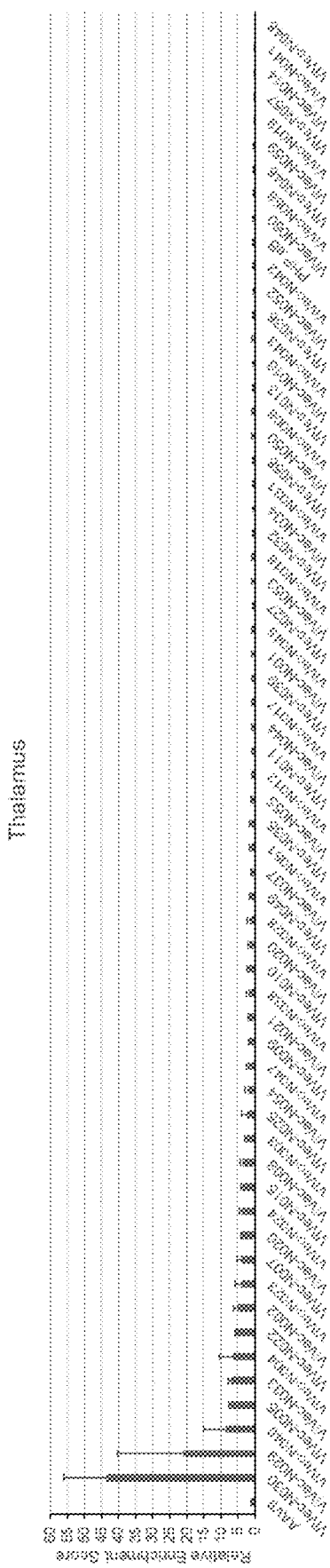

In the thalamus, ViVec-N030, ViVec-N029, ViVec-N040, ViVec-N005, ViVec-N033, ViVec-N004, ViVec-N022, ViVec-N002, ViVec-N023, ViVec-N007, ViVec-N026, ViVec-N024, ViVec-N015, ViVec-N008, ViVec-N003, ViVec-N025, ViVec-N054, ViVec-N047, ViVec-N009, ViVec-N021, ViVec-N038, ViVec-N010, ViVec-N020, ViVec-N028, ViVec-N049, ViVec-N037, and ViVec-N051 ranked from high to low, as shown in FIG. 13.

Figure 14:
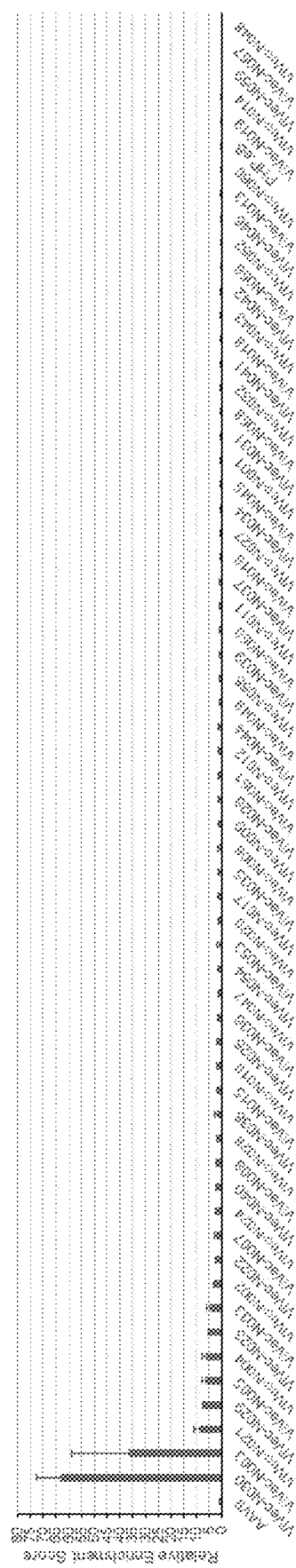

In the hypothalamus, ViVec-N030, ViVec-N003, ViVec-N021, ViVec-N029, ViVec-N005, ViVec-N004, ViVec-N023, ViVec-N033, ViVec-N002, ViVec-N022, ViVec-N007, ViVec-N024, ViVec-N040, ViVec-N008, ViVec-N026, ViVec-N038, ViVec-N015, ViVec-N010, ViVec-N025, ViVec-N036, ViVec-N047, ViVec-N054, ViVec-N053, ViVec-N020, ViVec-N017, ViVec-N035, ViVec-N006, ViVec-N009, ViVec-N028, ViVec-N051, ViVec-N012, ViVec-N044, and ViVec-N049 ranked from high to low, as shown in FIG. 14.

Figure 15:
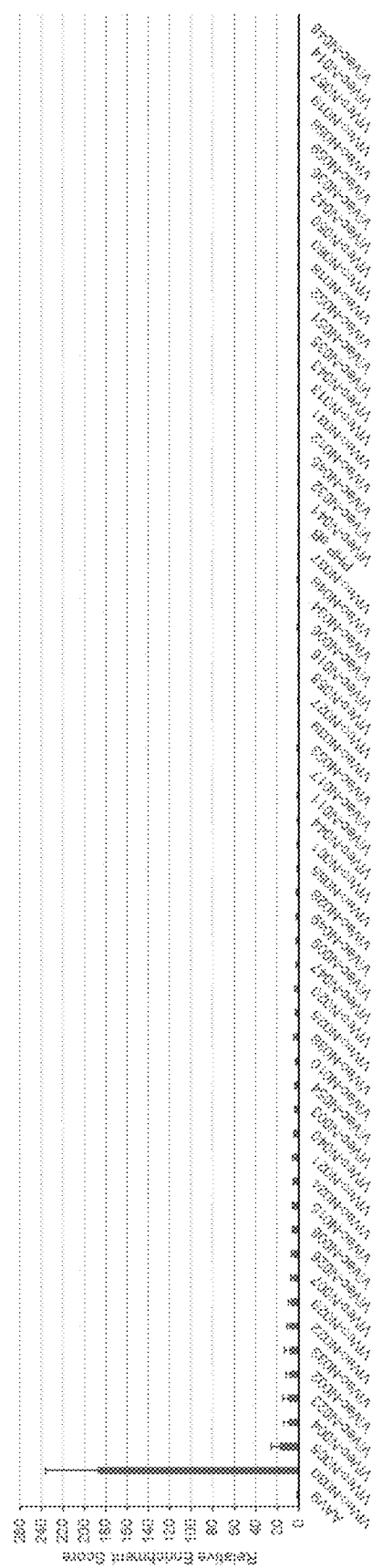

In the cerebellum, ViVec-N030, ViVec-N005, ViVec-N004, ViVec-N023, ViVec-N002, ViVec-N033, ViVec-N022, ViVec-N029, ViVec-N007, ViVec-N026, ViVec-N008, ViVec-N015, ViVec-N024, ViVec-N021, ViVec-N040, ViVec-N003, ViVec-N054, ViVec-N010, ViVec-N038, ViVec-N025, ViVec-N020, ViVec-N047, ViVec-N009, ViVec-N049, ViVec-N028, ViVec-N055, ViVec-N001, and ViVec-N044 ranked from high to low, as shown in FIG. 15.

Figure 16:
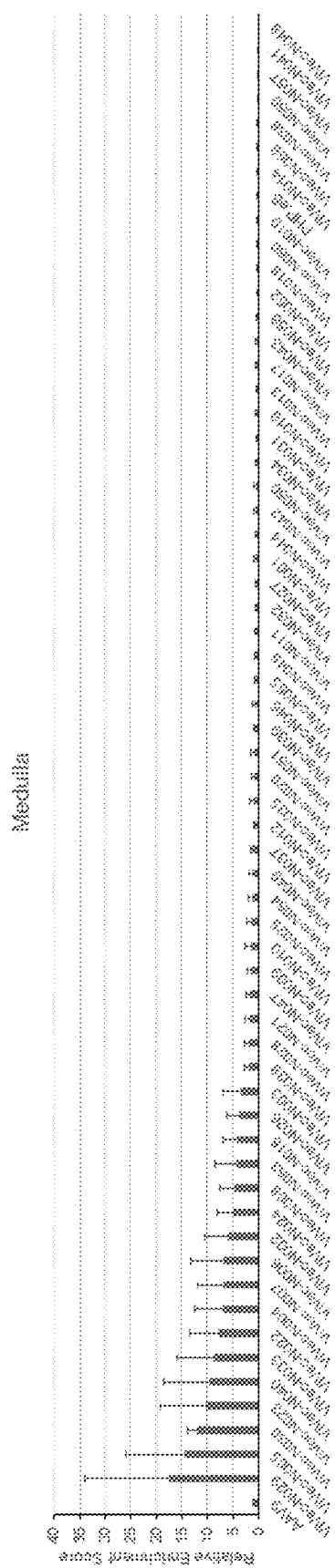

In the medulla, ViVec-N029, ViVec-N005, ViVec-N030, ViVec-N023, ViVec-N040, ViVec-N033, ViVec-N022, ViVec-N004, ViVec-N007, ViVec-N006, ViVec-N002, ViVec-N024, ViVec-N008, ViVec-N053, ViVec-N015, ViVec-N026, ViVec-N003, ViVec-N038, ViVec-N028, ViVec-N021, ViVec-N047, ViVec-N009, ViVec-N010, ViVec-N025, ViVec-N054, ViVec-N049, and ViVec-N037 ranked from high to low, as shown in FIG. 16.

Figure 17:
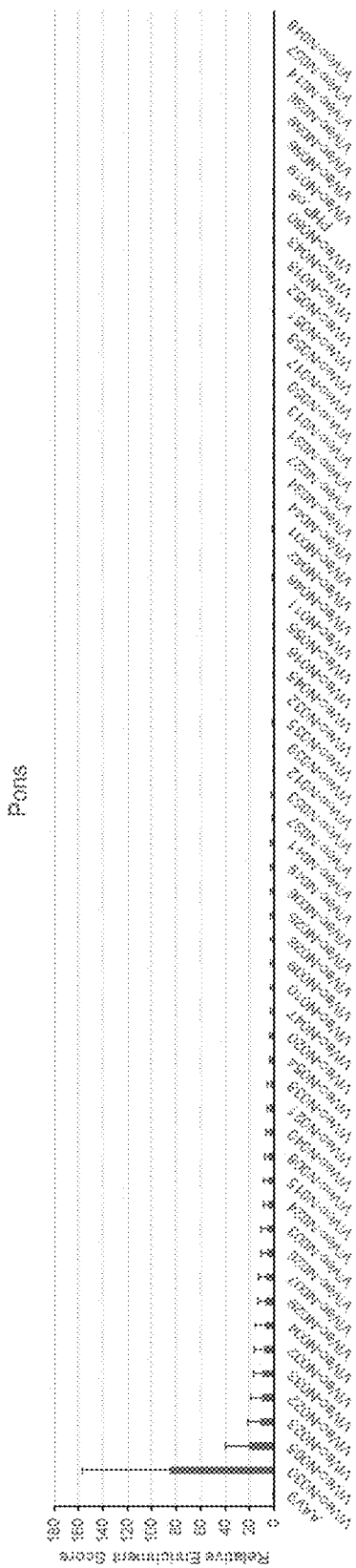

In the pons, ViVec-N030, ViVec-N005, ViVec-N023, ViVec-N022, ViVec-N033, ViVec-N002, ViVec-N004, ViVec-N029, ViVec-N007, ViVec-N026, ViVec-N003, ViVec-N024, ViVec-N015, ViVec-N008, ViVec-N040, ViVec-N021, ViVec-N038, ViVec-N054, ViVec-N020, ViVec-N047, ViVec-N010, ViVec-N009, ViVec-N028, ViVec-N025, ViVec-N006, ViVec-N049, ViVec-N041, and ViVec-N037 ranked from high to low, as shown in FIG. 17.

Figure 18:
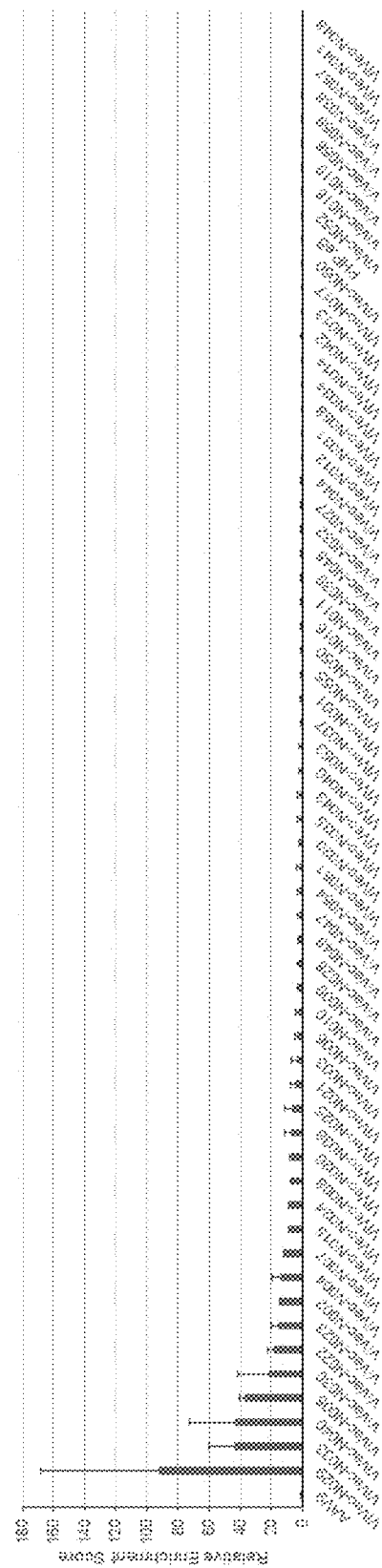

In the spinal cord, ViVec-N029, ViVec-N033, ViVec-N040, ViVec-N005, ViVec-N030, ViVec-N022, ViVec-N023, ViVec-N002, ViVec-N004, ViVec-N007, ViVec-N015, ViVec-N024, ViVec-N008, ViVec-N026, ViVec-N038, ViVec-N025, ViVec-N021, ViVec-N003, ViVec-N006, ViVec-N010, ViVec-N009, ViVec-N028, ViVec-N049, ViVec-N047, ViVec-N054, ViVec-N051, ViVec-N020, ViVec-N035, ViVec-N043, ViVec-N046, ViVec-N053, and ViVec-N037 ranked from high to low, as shown in FIG. 18.

AAV variants ViVec-N002, ViVec-N003, ViVec-N004, ViVec-N005, ViVec-N006, ViVec-N007, ViVec-N008, ViVec-N021, ViVec-N022, ViVec-N023, ViVec-N024, ViVec-N026, ViVec-N029, ViVec-N030, ViVec-N033, ViVec-N040, and ViVec-N043 ranked top 10 in multiple brain regions.

Example 5. In Vitro Evaluation in the Human Dopaminergic (DA) Neurons

Human dopaminergic neurons (DA neurons, derived from commercial human embryonic stem cells) were maintained in Neurobasal (Gibco, A1371201) containing 1% Glutmax (Gibco, A1286001), 2% B27 Supplement (Gibco, A3353501), 20 ng/ml BDNF (Peprotech, AF-450-02), 20 ng/ml GDNF (Peprotech, AF-450-10), 1ng/mL TGFβ3 (Peprotech, AF-100-36E), 200 µM Ascorbic acid (Sigma, A4403), 500 µM dibutyryl cAMP (Sigma, D0627-1g) and 10 µM DAPT (Tocris, 2634). DA neurons were seeded in 12-well plate (Corning, 3513) at a density of 1.5 E+6 cells/well and allowed to grow in the same medium. Next day, DA neurons were transduced with 1E+4 vg/cell or 1E+5 vg/cell MOI of (1) GFP-Barcoded AAV library as prepared in Example 4 containing the 60 selected candidate AAV variants, (2) AAV9 as a reference, or (3) AAV-PHP.eB as another reference. The culture was collected 72 h post transduction, from which RNA was extracted and reverse transcribed to cDNA. The AAV capsids in the DA neurons were amplified and the enrichment score of each AAV variant was determined by deep sequencing.

Figure 19:
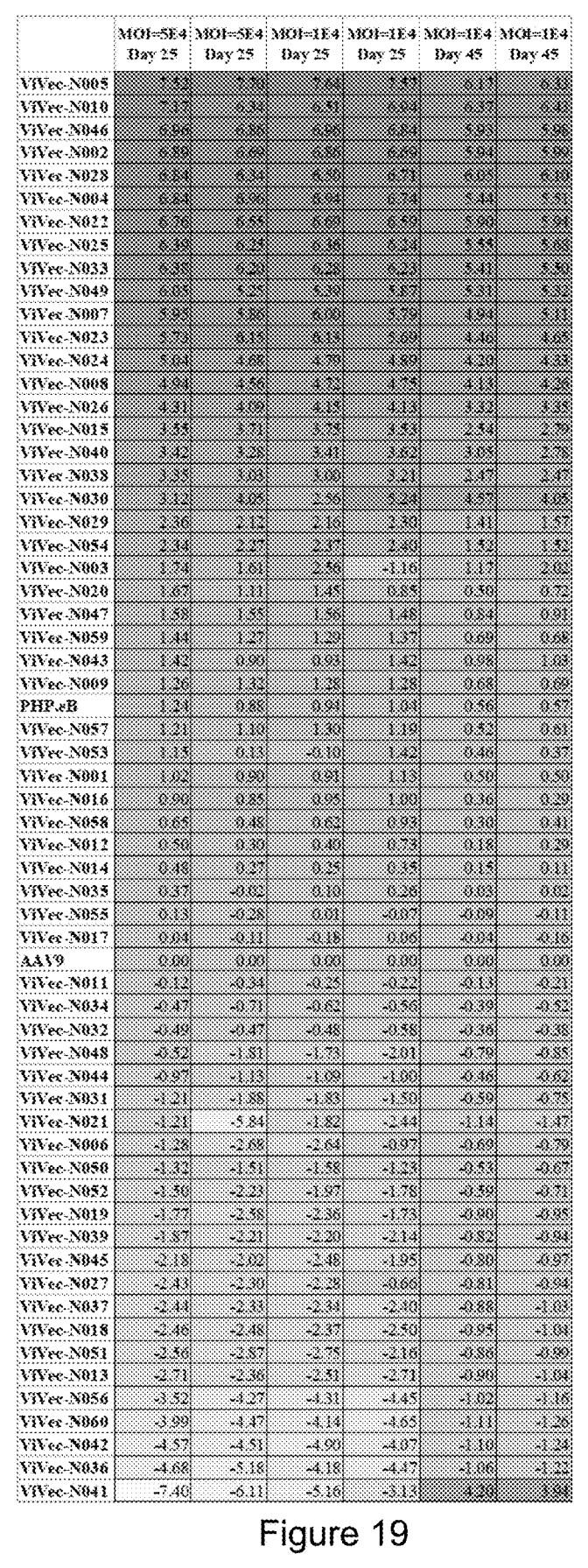

To identify the rAAVs that showed stronger expression of transgenes and in turn had improved transduction efficiency as compared to AAV9, fold change was calculated as the ratio of the enrichment score of a rAAV to that of AAV9. The table in FIG. 19 shows the value of log 2 (fold change) of each rAAV calculated based on the data obtained from duplicate experiments. A value log 2 (fold change) higher than 0 indicates a higher expression level. As shown in FIG. 19, it was found that compared to the wild-type AAV9, 37 variants showed stronger expression of the transgene GFP. The 37 variants are, with an enrichment score from high to low, ViVec-N005, ViVec-N010, ViVec-N046, ViVec-N002, ViVec-N028, ViVec-N004, ViVec-N022, ViVec-N025, ViVec-N033, ViVec-N049, ViVec-N007, ViVec-N023, ViVec-N024, ViVec-N008, ViVec-N026, ViVec-N015, ViVec-N040, ViVec-N038, ViVec-N030, ViVec-N029, ViVec-N054, ViVec-N003, ViVec-N020, ViVec-N047, ViVec-N059, ViVec-N043, ViVec-N009, ViVec-N057, ViVec-N053, ViVec-N001, ViVec-N016, ViVec-N058, ViVec-N012, ViVec-N014, ViVec-N035, ViVec-N055 and ViVec-N017. The top 27 variants even triumphed over AAV-PHP.eB, showing stronger expression of the transgene GFP.

Figure 20:
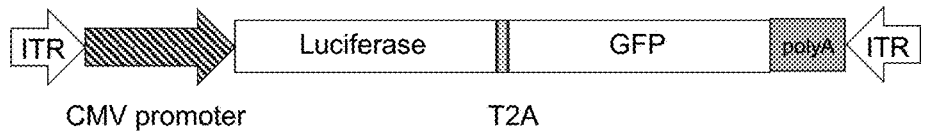
FIG. 20 shows the structure of the construct pAAV-CMV-luc-T2A-GFP to be included in the main plasmid for in vitro validation of the engineered capsid polypeptides.

Example 6. In Vitro Validation of the Selected AAV Capsid Candidates Individually Preparation of the Transgene Plasmid and Helper Plasmid The main plasmid pAAV-CMV-Luc-T2A-GFP was constructed by inserting the construct CMV-Luc-T2A-GFP comprising the gene-of-interest (GOI, in this case GFP and luciferase linked by a T2A peptide and under the control of a CMV promoter) to the plasmid px602 (Addgene). As shown in FIG. 20, the plasmid comprises from 5' to 3' the following elements: 5' ITR, the CMV promoter, the GOIs (GFP and Luciferase coding sequences linked by T2A), and a polyA.

The RC-helper plasmid contains AAV2-REP78, Ad5 w and other elements that help the translation and assembly of the AAV capsids, as well as the Cap sequences encoding the AAV capsid proteins with a heptamer inserted between amino acid residues 588 and 589.

Preparation of AAV Variants for Individual Validation

The individual variant capsid containing rAAV was prepared to evaluate its ability to transduce the human dopaminergic neurons. The main plasmid pAAV-CMV-Luc-T2A-GFP and an RC-helper plasmid containing the individual capsid variant sequence were co-transfected into HEK293T cells with lipofectamine LTX and plus reagents. The AAV particles were harvested after 72 hrs and purified by iodixanol gradient ultracentrifugation as described above. After determining the virus titers, the purified rAAVs were stored at −80° C.

AAV Quality Control

AAV genome titers were determined by qPCR. 20 µL of the purified rAAV vectors were treated with DNase I and proteinase K. The mixture was diluted at a ratio of 1:10, 1:100 and 1:1,000. All qPCRs were performed using 2× QuantiFast probe PCR master mix and a primer/probe set specifically binding to a sequence segment of the luciferase gene.

The plasmid pAAV-CMV-Luc-T2A-GFP was used to prepare a standard curve for PCR quantification by 10-fold serial dilutions (five concentrations, ranging from $10^{12}$-$10^{8}$ copies/mL). In a 20 µL reaction mixture, the final concentrations of reagents were 0.4 µM primers targeting GFP, 0.4 µM probe, 1×ROX reference dye, 2 µL template, and 1× Master Mix. PCR was run in the CFX96 Touch Real-Time PCR Detection System (Bio-Rad) under the following conditions: 37° C. for 2 min, 95° C. for 10 min, followed by 45 cycles at 95° C. 10 s and 62° C. 45 s. Raw data were exported and analyzed by the BioRad CFX manager software. The virus titers were given in vg/mL.

| Primers for GFP | Sequences | SEQ ID NO |
|---|---|---|
| GFP-F8 | TCCGCCACAACATCGAGGAC | 125 |
| GFP-R8 | GTAGTGGTTGTCGGGCAGCA | 126 |
| GFP-P8 | FAM-CAGCGTGCAGCTCGCC GACC-MGB | 127 |

For purity control, the purified virus ($2 \times 10^{10}$ particles) was mixed with protein loading dye and heated at 95° C. for 10 min.

The samples were then separated on SurePAGE 4-12% Bis-Tris gels (GenScript, M00653). After electrophoresis, the gel was stained by Pierce Silver Stain Kit (Thermo Scientific, 24612) according to the manufacturer's instructions. Briefly, the gel was washed for 5 min twice with distilled water on a shaker, then fixed in the fixing solution (the volume ratio of water:anhydrous ethanol:acetic acid=6:3:1) for 15 min and then for 2 h. The gel was washed with 10% ethanol and water twice for 5 min each. After incubation in 2% % Silver Stain Sensitizer for 1 min, the gel was quickly washed with water twice for 1 min each. After soaking the gel in Silver Stain for 30 min in the dark, Silver Stain Developer was added. As soon as the target band appeared, 5% acetic acid was added to stop the reaction and Bio-Rad gel imager was used to capture the images.

Example 7. In Vitro Primary Neuronal Cell Evaluation of Selected AAV Capsid Candidates Four of the top capsid candidates (ViVec-N001, ViVec-N002, ViVec-N004, and ViVec-N023) identified in the two-rounds of in vivo selection were used to construct helper plasmids of Rep and Cap (RC-helper plasmids), giving rise to RC-001, RC-002, RC-004 and RC-023. Each of the specific Cap-containing RC-helper plasmid was packaged with the pAAV-CMV-Luc-T2A-GFP plasmid to generate capsid specific AAV for further evaluation.

Human DA D25 and DA D45 were maintained in the medium as mentioned above in Example 5, and seeded in a 12-well plate (Corning, 3513) at a density of 1.5 E+6 cells/well. Next day, cells were transduced with 1E+4 vg/cell or 1E+5 vg/cell MOI of AAV particles containing ViVec-N001, ViVec-N002, ViVec-N004, or ViVec-N023. AAV9 and PHP.eB were used as controls. 72 hours after infection, the luciferase levels were measured using the Bright-Lite Luciferase Assay and the luminescence intensities analyzed with a microplate analyzer. By comparing the luminescence intensity with the wild-type AAV9, the transduction efficiency of the individual AAV variant was determined.

Figure 21A:
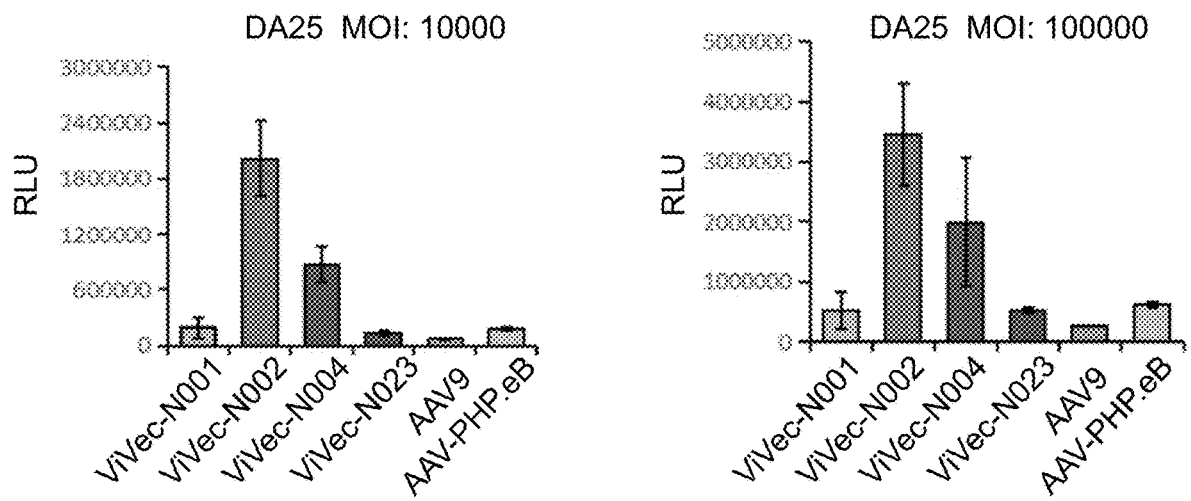
FIG. 21A-B show the results from the in vitro validation of four AAV capsid candidates in the cultured human dopaminergic neurons. (A-B) Day 25, MOI (multiplicity of infection)=1E+4 or 1E+5; (C-D) Day 45, MOI=1E+4 or 1E+5
Figure 21B:
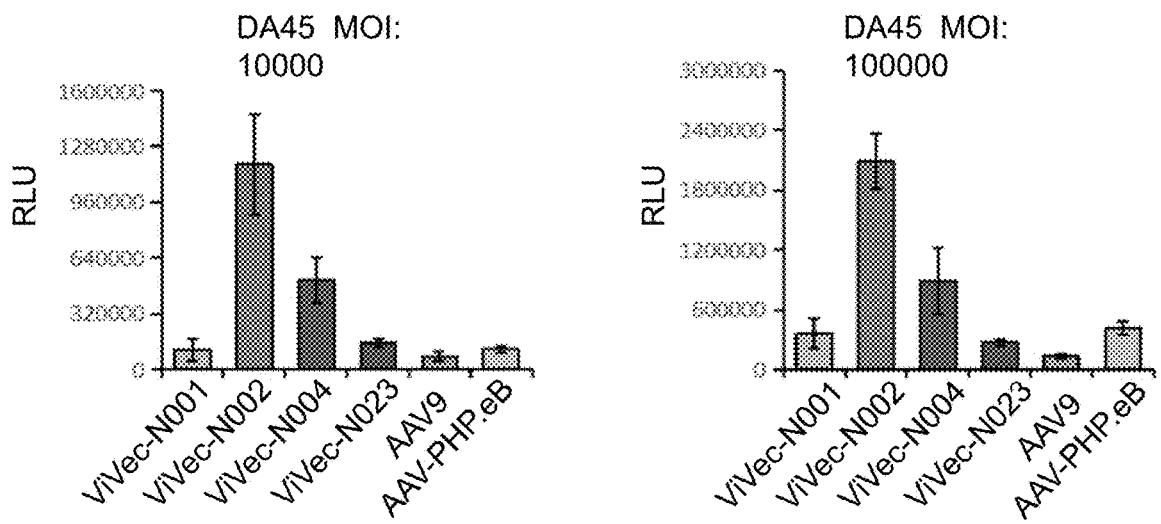

As shown in FIGS. 21A and 21B, compared to the wild-type AAV9, the variants ViVec-N001, ViVec-N002, ViVec-N004, and ViVec-N023 showed significantly increased luciferase gene expression. Furthermore, ViVec-N002 and ViVec-N004 outperformed AAV-PHP.eB.

Figure 22:
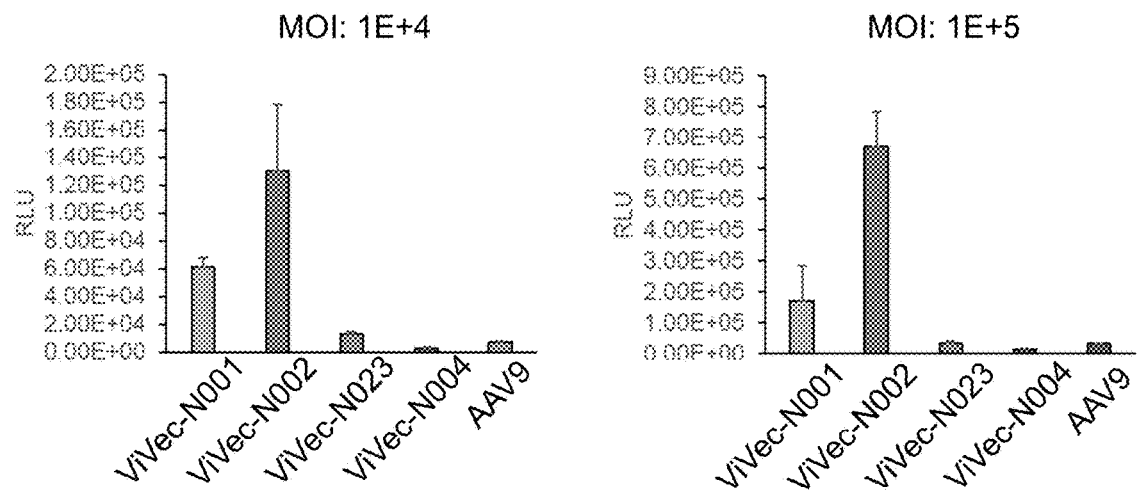
FIG. 22 shows the results from the in vitro validation of four AAV capsid candidates in the cultured human cortical neurons (45 days post differentiation), MOI=1E+4 or 1E+5.

Similarly, the four AAV variants were tested in iPSC-derived human cortical neurons (FIG. 22).

For testing in the cortical neurons, the AAV capsid variants were prepared by the three-plasmid system by co-transfecting of the AAV transgene main plasmid pAAV-CMV-Luc-T2A-GFP (8 µg), RC plasmid (30 µg) with an AAV helper plasmid (30 µg) into HEK293T cells per 15-cm dish with lipofectamine LTX and plus reagents. The transfected cells and medium were harvested 72 h later followed by centrifuge and purification as described above.

The iPSCs-derived cortical neural progenitors were purchased from Hopstem Biotechnology and prepared according to the product manual. These progenitors were cultured in Matrigel coated plates, differentiated and matured for 45 days to obtain cortical neurons. After maturation, AAV variant ViVec-N001, ViVec-N002, ViVec-N023, ViVec-N004, or AAV9 was added to the feeding medium at MOI=1E+4 and 1E+5. Five days post AAV transduction, cells were harvested and the infection efficiency of each variant was determined by luciferase assay as described above. The results showed that ViVec-N001 and ViVec-N002 outperformed AAV9 in the human cortical neurons.

Figure 23:
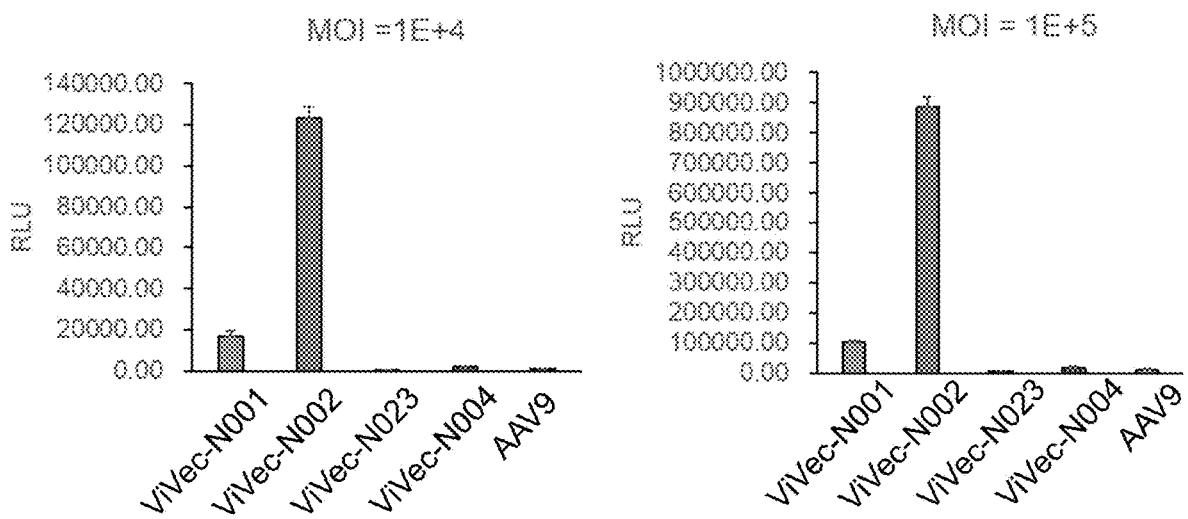
FIG. 23 shows the results of the in vitro validation of four AAV capsid candidates in the cultured human motor neurons (21 days post differentiation), MOI=1E+4 or 1E+5.

The transduction efficiencies of the AAV variants were also evaluated in the immature iPSC-derived human motor neurons at 21 days post differentiation (prepared from the human motor neural progenitor, HopStem #). As shown in FIGS. 23, both ViVec-N001 and ViVec-N002 performed better than AAV9.

Taken together, ViVec-N002 showed the best transduction efficiency in these neuronal subtypes other than the DA neurons, indicating its potential to efficiently deliver GOIs into different regions of the nervous system for treating various neuronal diseases.

The other AAV variants were also evaluated in the human DA neurons, cortical neurons, and motor neurons.

Example 8. In Vivo Validation of Selected AAV Capsid Candidates Individually

Several capsid candidates were selected for further evaluation of their in vivo biodistribution in the central nervous system.

ViVec-N001 or ViVec-N004 (5E+12 in 2 ml vehicle) which carried a GFP reporter gene was delivered into the cynomolgus monkey brain via intra cisterna magna (ICM) injection (2 subjects for each capsid). AAV9 was used as a reference. Four weeks after injection, tissues from different regions of the nervous system were collected and the relative levels of GFP expression were determined by immunostaining.

Figure 24A:
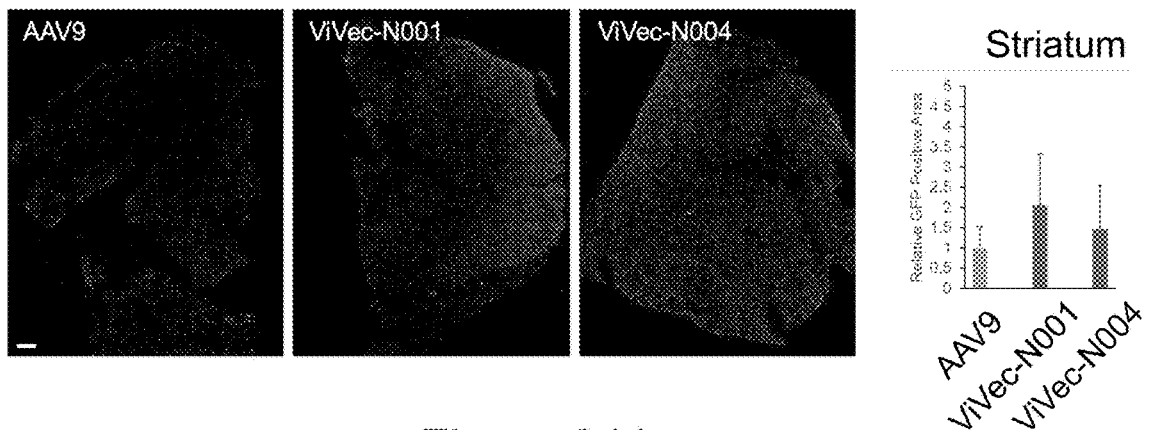
FIG. 24A-C show the results of the in vivo validation of two AAV capsid candidates (ViVec-N001 and ViVec-N004) in the cynomolgus monkeys. The intensity of GFP in different brain areas, including (A) striatum, (B) hippocampus, and (C) medulla from the monkeys treated with the AAV capsid candidates is shown.
Figure 24B:
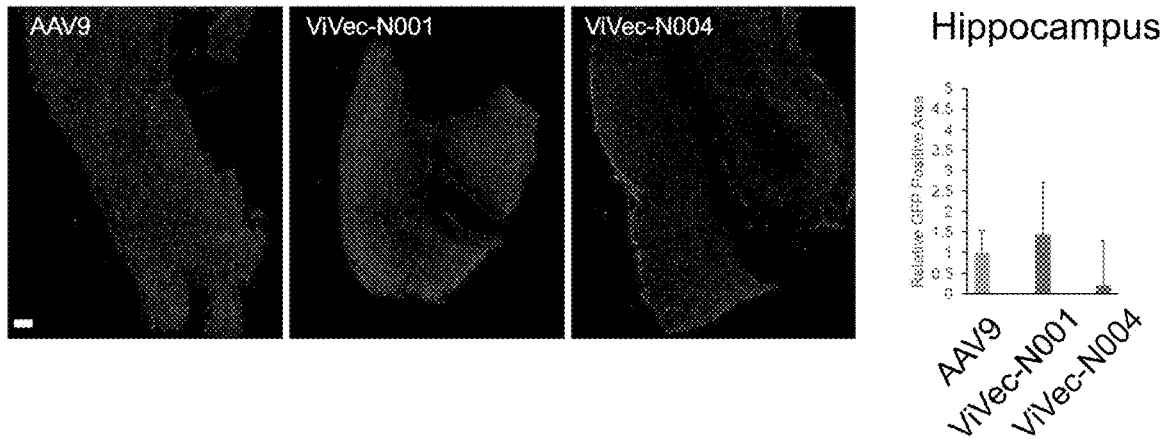
Figure 24C:
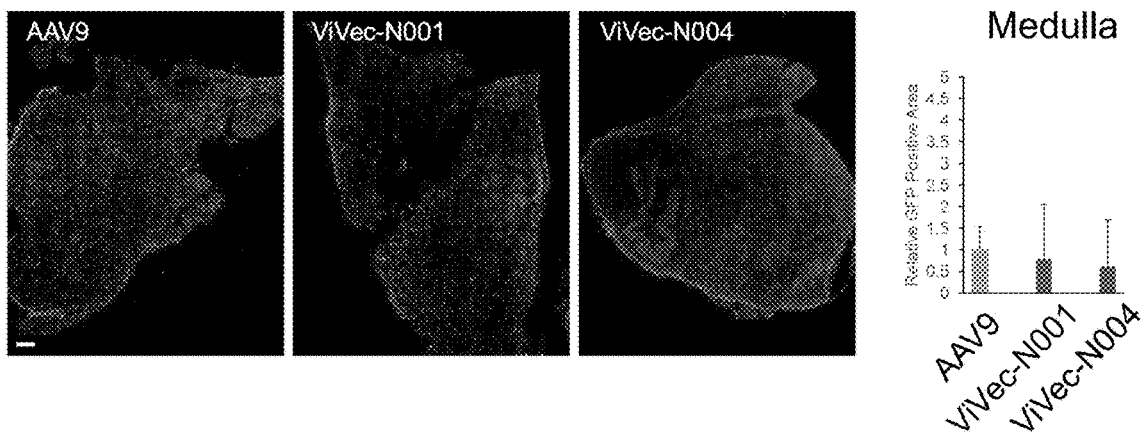

Both ViVec-N001 and ViVec-N004 showed stronger GFP expression in the striatum (FIG. 24A) as compared to AAV9. ViVec-N001 outperformed AAV9 in the hippocampus (FIG. 24B). ViVec-N001 and ViVec-N004 showed comparable GFP expression levels to AAV9 in the medulla (FIG. 24C). Given that the medulla is the closest region to the injection site, the above observations may indicate that the two variants, ViVec-N001 and ViVec-N004, especially ViVec-N001, could spread to more distant regions and likely to provide a broader distribution in the nervous system.

Figure 25:
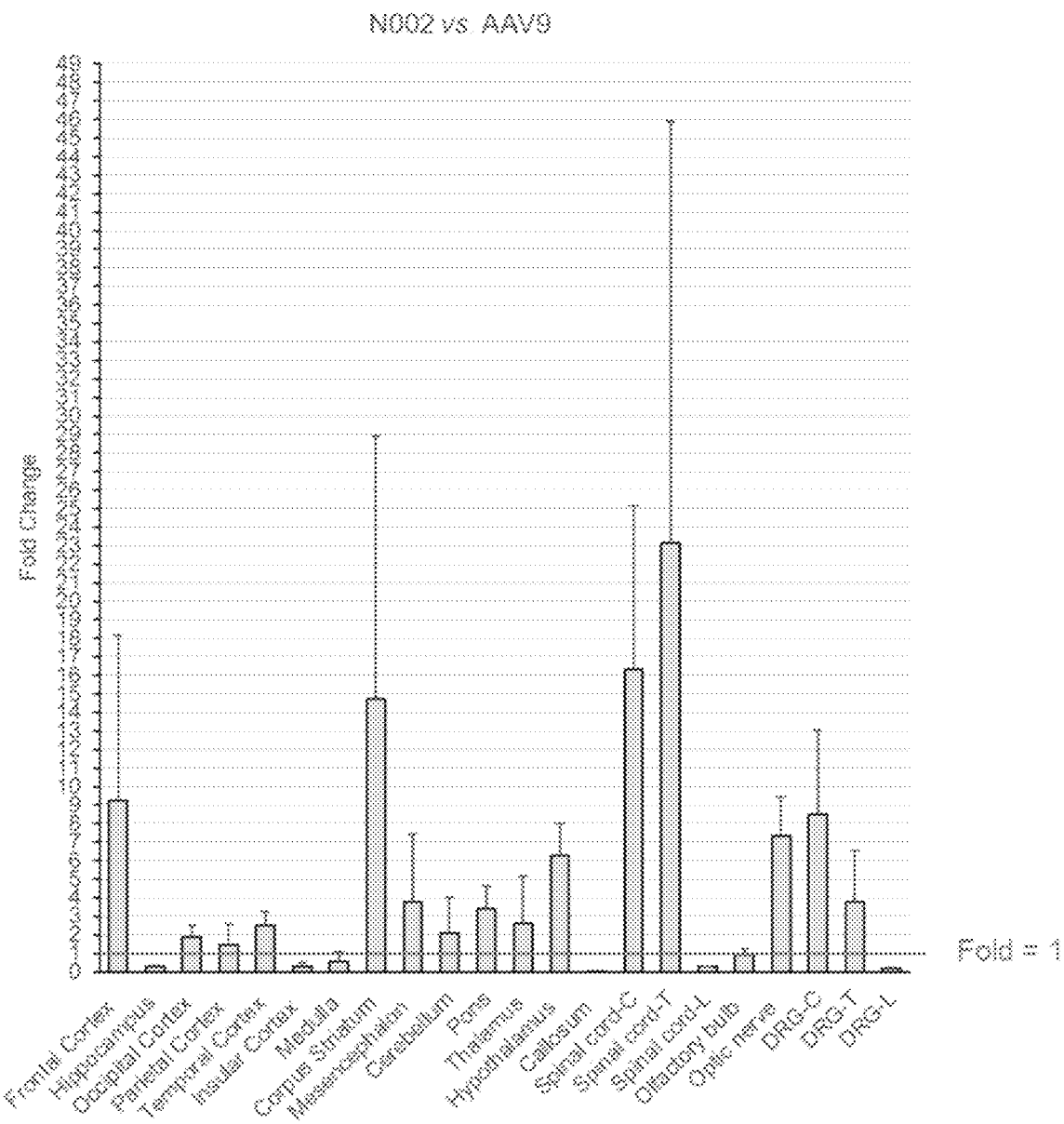
FIG. 25 shows the biodistribution of ViVec-N002 in the brain and spinal cord of the cynomolgus monkey 21 days after receiving intracerebroventricular (i.e.v.) injection. The relative DNA levels of luciferase in each region are shown as fold changes (normalized to the AAV9 treatment group).
Figure 27:
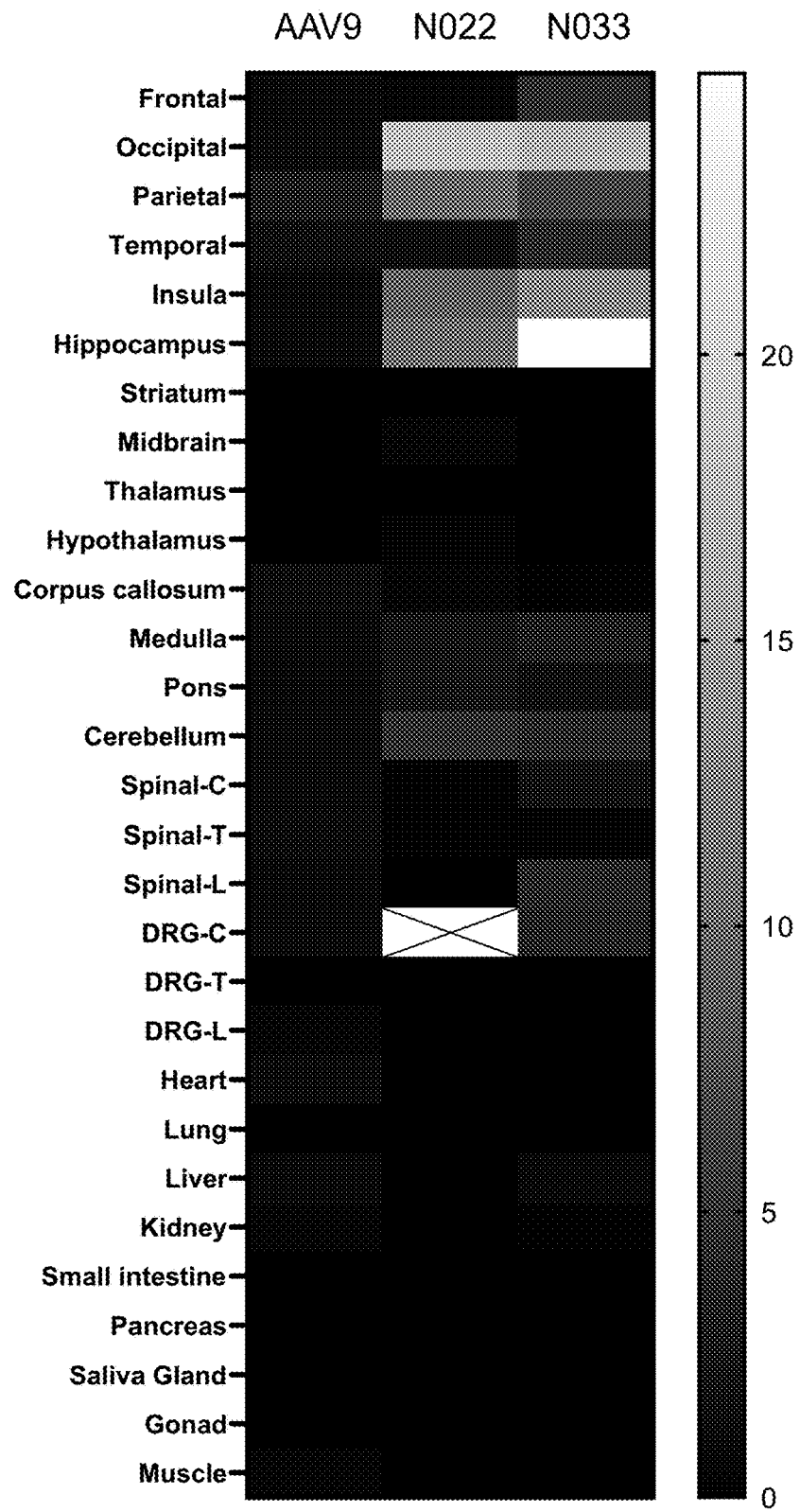
FIG. 27 shows the relative RNA levels of luciferase in different brain regions and the peripheral organs of the cynomolgus monkey 21 days after receiving i.e.v. injection of AAV9, ViVec-N022, and ViVec-N033. The relative RNA levels of luciferase in each region are shown as fold changes (normalized to the AAV9 treatment group), N=2.

The candidates were further evaluated by different administration routes. ViVec-N002, ViVec-N033, and ViVec-N022 (2.5e12 per animal) carrying luciferase and GFP reporter genes were delivered into the cynomolgus monkey brain via intracerebroventricular injection. AAV9 was used as a reference. Four weeks after injection, tissues from different regions of the nervous system were collected and the relative levels of luciferase expression were determined by qPCR (at the DNA and mRNA levels) and immunostaining (at the protein level). The results are shown in FIGS. 25-27.

In general, ViVec-N002, ViVec-N033, and ViVec-N022 showed broader and stronger biodistribution than AAV9. FIG. 25 shows that compared to AAV9, ViVec-N002 achieved higher transduction efficiency in the frontal cortex (lobe), occipital cortex (lobe), parietal cortex (lobe), temporal cortex (lobe), striatum, midbrain, cerebellum, pons, thalamus, hypothalamus, spinal cord cervical part, spinal cord thoracic part, optic nerve, dorsal root ganglion cervical, and dorsal root ganglion thoracic. Based on the earlier data, ViVec-N033 and ViVec-N022 were expected to perform similarly as ViVec-N002.

As shown in FIG. 26, ViVec-N022 showed higher levels of luciferase DNA (shown as the relative fold change to AAV9) in the occipital cortex (lobe), temporal cortex (lobe), medulla, striatum, midbrain, pons, spinal cord-thoracic part, spinal cord-lumbar part, olfactory bulb, and optic nerve, while much less in the peripheral organs and dorsal root ganglia (DRG). While ViVec-N033 showed a partially different distribution pattern, with relatively higher levels of luciferase DNA in the frontal cortex (lobe), occipital cortex (lobe), temporal cortex (lobe), medulla, midbrain, pons, hypothalamus, spinal cord cervical part, spinal cord thoracic part, olfactory bulb, optic nerve, and saliva gland. Similar to ViVec-N022, ViVec-N033 also had lower distribution in the peripheral organs and DRG.

At the luciferase RNA levels, ViVec-N022 outperformed AAV9 in multiple cortical regions, including the occipital cortex (lobe), parietal cortex (lobe), temporal cortex (lobe), and insula, while N033 outperformed AAV9 in all of the five cortical regions. In addition, both ViVec-N022 and ViVec-N033, especially ViVec-N033 expressed more luciferase RNA in the hippocampus, a brain region that plays important roles in the memory formation and is usually the first brain area damaged in the Alzheimer's disease patients (FIG. 27). Taken together the above data, the tested ViVec AAV capsids of the present application should be more effective vectors than the wild-type AAV9 for intracerebroventricular gene delivery, in particular, to deliver gene(s) of interest into the hippocampus to treat memory related disorders.

Figure 28:
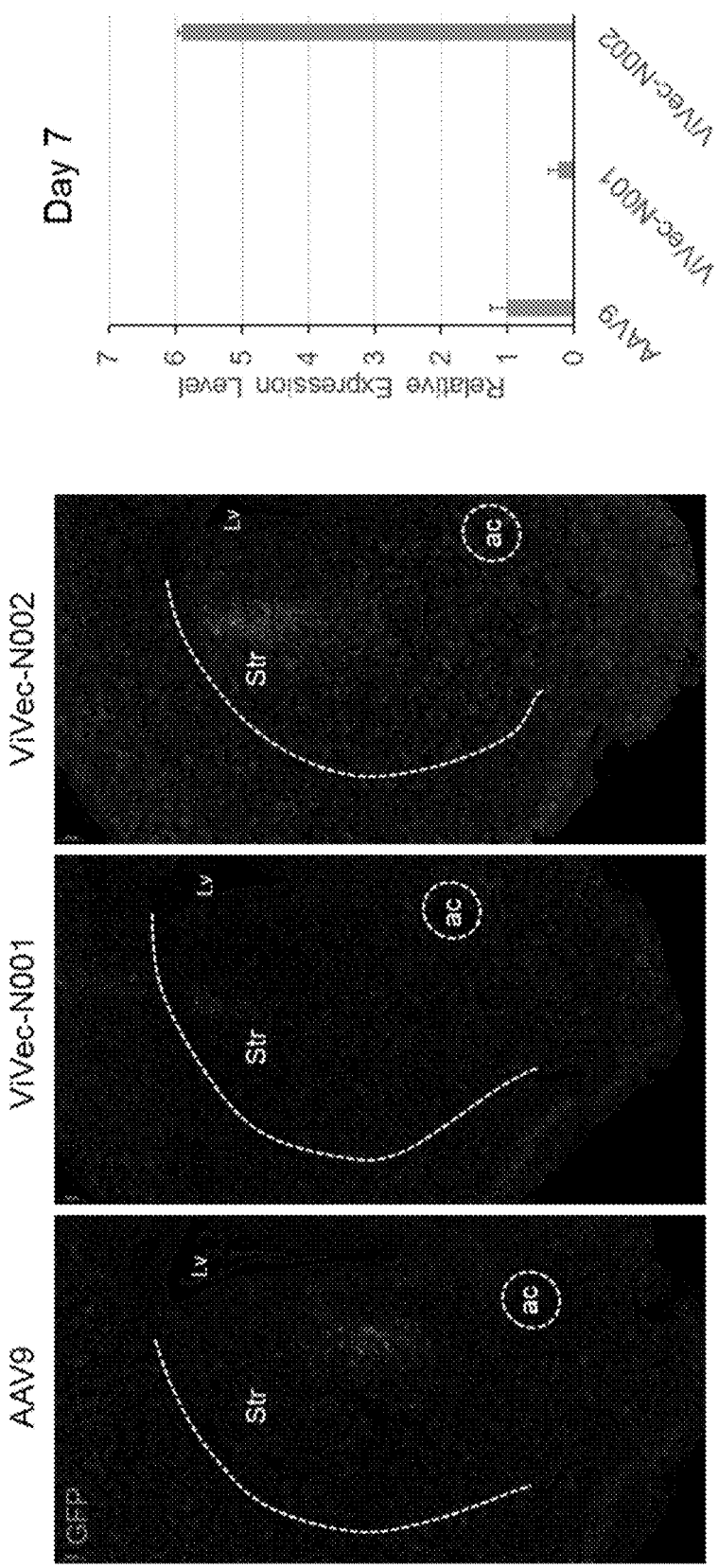
FIG. 28 shows the expression levels of GFP in the mouse striatum 7 days after intra-striatal injection of ViVec-N001, ViVec-N002, and AAV9, N=3.
Figure 29:
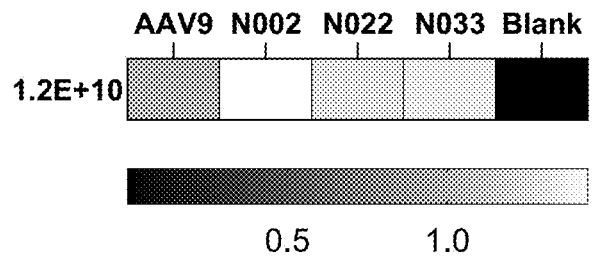
FIG. 29 shows the relative RNA levels of luciferase (normalized to the AAV9 treatment group) in the mouse striatum 21 days after intra-striatal injection of ViVec-N002, ViVec-N022, ViVec-N033, and AAV9, N=6.

The above candidates were further evaluated by the intra-striatum administration route. ViVec-N001 and ViVec-N002 carrying a GFP reporter gene were delivered into the mouse striatum by intra-striatum injection (2e12 vg per injection site in the striatum). As shown in FIG. 28, ViVec-N002 transduced a broader striatum area than AAV9 did. ViVec-N033 and ViVec-N022 were also tested by the intra-striatum administration route. 1.2E+10 vg of ViVec-N033 and ViVec-N022 were injected into the mouse striatum by intra-striatum injection respectively, the striatum tissues were collected 21 days post injection and RT-qPCR was used to determine the RNA levels of luciferase. We found that both ViVec-N033 and ViVec-N022 delivered more luciferase (GOI) as compared to AAV9, which was similar to ViVec-N002.

Figure 30:
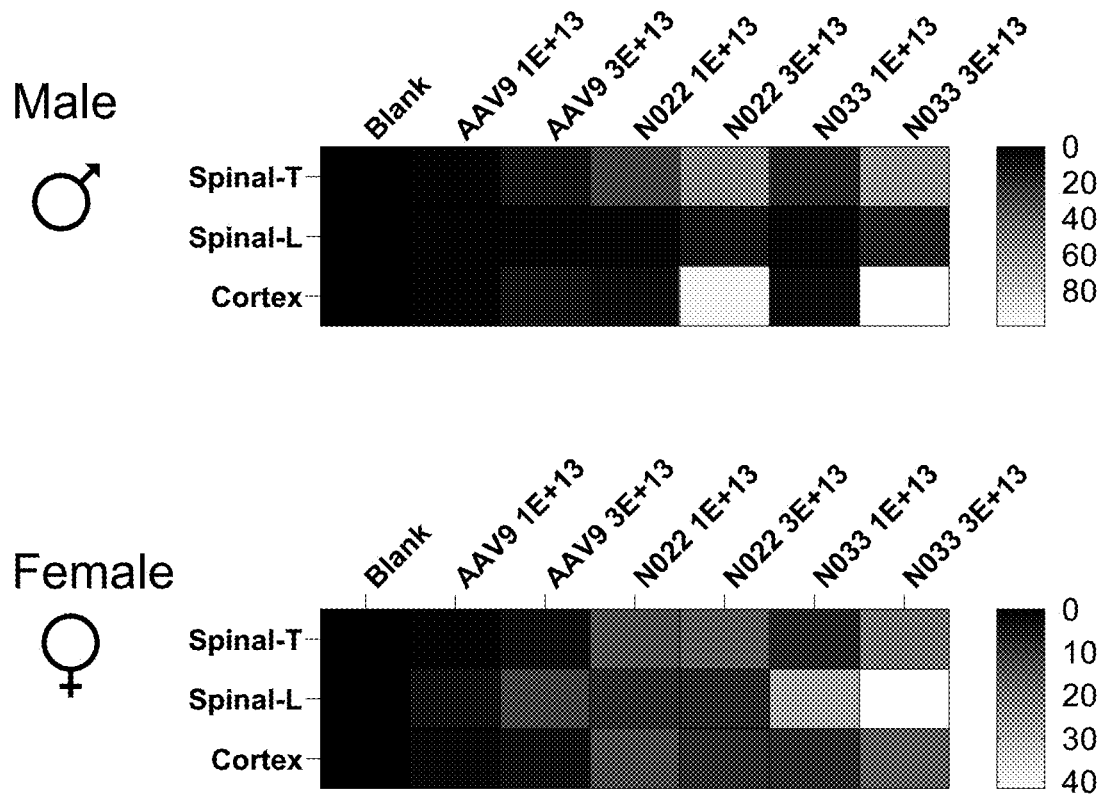
FIG. 30 shows the relative RNA levels of luciferase (normalized to the AAV9 treatment group) in the rat spinal cord and cortex (N=8, 4 males and 4 females), 21 days post intrathecal injection of ViVec-N022, ViVec-N033, and AAV9.

The ability of the individual candidates in delivering genes into the central nervous system via intrathecal administration was also evaluated. ViVec-N033 and ViVec-N022 which carried both luciferase and GFP reporter genes were injected into the SD rats via intrathecal injection respectively (at 2 doses, low: 1E+13 vg/kg and high: 3E+13 vg/kg). AAV9 was used as the reference. 21 days post injection, the RNA level of luciferase was determined by RT-qPCR in the spinal cord and cortex tissues. As shown in FIG. 30, both ViVec-N033 and ViVec-N022 outperformed AAV9 in transfection efficiency and expressed more luciferase RNA in the spinal cord thoracic part, spinal cord lumbar part (injection site), and the cortex.

The candidates were further evaluated by the intravenous administration route to test these novel capsids' ability to cross the blood-brain barrier. Each of ViVec-N002, ViVec-N033, and ViVec-N022 carrying both the luciferase and GFP reporter genes were delivered into two different strains of mice via intravenous injection. Three weeks post injection, tissues from different regions of the nervous system and peripheral organs were collected and the relative levels of luciferase and GFP expression were determined by qPCR (at the DNA and mRNA levels) and immunostaining (at the protein level).

```
Wild-type AAV9 VP1 polypeptide sequence
(SEQ ID NO: 121; Q588 and A589 are
underlined)
MAADGYLPDWLEDNLSEGIREWWALKPGAPQPKANQQHQDNARGL

VLPGYKYLGPGNGLDKGEPVNAADAAALEHDKAYDQQLKAGDNPY

LKYNHADAEFQERLKEDTSFGGNLGRAVFQAKKRLLEPLGLVEEA

AKTAPGKKRPVEQSPQEPDSSAGIGKSGAQPAKKRLNFGQTGDTE

SVPDPQPIGEPPAAPSGVGSLTMASGGGAPVADNNEGADGVGSSS

GNWHCDSQWLGDRVITTSTRTWALPTYNNHLYKQISNSTSGGSSN

DNAYFGYSTPWGYFDENRFHCHFSPRDWQRLINNNWGFRPKRLNF

KLFNIQVKEVTDNNGVKTIANNLTSTVQVFTDSDYQLPYVLGSAH

EGCLPPFPADVFMIPQYGYLTLNDGSQAVGRSSFYCLEYFPSQML

RTGNNFQFSYEFENVPFHSSYAHSQSLDRLMNPLIDQYLYYLSKT

INGSGQNQQTLKFSVAGPSNMAVQGRNYIPGPSYRQQRVSTTVTQ

NNNSEFAWPGASSWALNGRNSLMNPGPAMASHKEGEDRFFPLSGS

LIFGKQGTGRDNVDADKVMITNEEEIKTTNPVATESYGQVATNHQ

SAQAQAQTGWVQNQGILPGMVWQDRDVYLQGPIWAKIPHTDGNFH

PSPLMGGFGMKHPPPQILIKNTPVPADPPTAFNKDKLNSFITQYS

TGQVSVEIEWELQKENSKRWNPEIQYTSNYYKSNNVEFAVNTEGV

YSEPRPIGTRYLTRNL
```

What is claimed is:

1. An engineered adeno-associated viral (AAV) capsid polypeptide, comprising an insertion of any of the amino acid sequences as shown in SEQ ID NOs: 1, 2, 4, 22, 23 and 33 at a position after the amino acid position 588 of the capsid polypeptide of AAV9,
wherein the amino acid sequence of the capsid polypeptide of AAV9 is shown as SEQ ID NO: 121,
wherein the engineered AAV capsid polypeptide is capable of assembling into a recombinant AAV (rAAV) virion, and the rAAV virion has an increased tropism for one or more tissues or cells of the central nervous system (CNS), and/or is capable of producing higher levels of transgene expression in tissues or cells of the central nervous system, as compared to rAAV virions having a capsid of serotype AAV9.

2. The engineered adeno-associated viral (AAV) capsid polypeptide of claim 1, the rAAV virion has an increased tropism for one or more tissues or cells of the CNS, and/or is capable of producing higher levels of transgene expression in tissues or cells of the CNS, as compared to rAAV virions having a capsid of serotype AAV9, wherein the tissues or cells are selected from parietal lobe, frontal lobe, temporal lobe, occipital lobe, insular lobe, striatum, hippocampus, midbrain, thalamus, hypothalamus, cerebellum, medulla, pons, spinal cord, cortical neurons, motor neurons, dopaminergic neurons, astrocytes, or oligodendrocytes.

3. The engineered adeno-associated viral (AAV) capsid polypeptide of claim 1, wherein the rAAV virion has an increased tropism for one or more tissues or cells of the CNS, and/or is capable of producing higher levels of transgene expression in tissues or cells of the CNS, as compared to rAAV virions having a capsid of serotype AAV-PHP.eb.

4. A recombinant adeno-associated viral (rAAV) virion comprising a capsid assembled from the AAV capsid polypeptide of claim 1, and a vector genome comprising a transgene.

5. The rAAV virion of claim 4, wherein the transgene is a therapeutic gene or a reporter gene.

6. A pharmaceutical composition, comprising the rAAV virion of claim 4, and a pharmaceutically acceptable carrier.

7. A nucleic acid molecule comprising a nucleotide sequence encoding the polypeptide of claim 1.

8. The nucleic acid molecule according to claim 7, comprising the nucleotide sequence as shown in any one of SEQ ID NOs: 61, 62, 64, 82, 83 and 93.

9. A recombinant adeno-associated viral (rAAV) helper vector, comprising the nucleotide sequence encoding the polypeptide of claim 1.

10. A method of treating a disease in a subject in need thereof, comprising administering to the subject a therapeutically effective amount of the rAAV virion of claim 4.

* * * * *

SEQUENCE LISTING

```
Sequence total quantity: 130
SEQ ID NO: 1          moltype = AA  length = 7
FEATURE               Location/Qualifiers
source                1..7
                      mol_type = protein
                      organism = synthetic construct
SEQUENCE: 1
GVFVLPN                                                              7
```

```
SEQ ID NO: 2             moltype = AA  length = 7
FEATURE                  Location/Qualifiers
source                   1..7
                         mol_type = protein
                         organism = synthetic construct
SEQUENCE: 2
GNYRGNP                                                                  7

SEQ ID NO: 3             moltype = AA  length = 7
FEATURE                  Location/Qualifiers
source                   1..7
                         mol_type = protein
                         organism = synthetic construct
SEQUENCE: 3
CSSRRSK                                                                  7

SEQ ID NO: 4             moltype = AA  length = 7
FEATURE                  Location/Qualifiers
source                   1..7
                         mol_type = protein
                         organism = synthetic construct
SEQUENCE: 4
FRHGPPS                                                                  7

SEQ ID NO: 5             moltype = AA  length = 7
FEATURE                  Location/Qualifiers
source                   1..7
                         mol_type = protein
                         organism = synthetic construct
SEQUENCE: 5
RFKTGYP                                                                  7

SEQ ID NO: 6             moltype = AA  length = 7
FEATURE                  Location/Qualifiers
source                   1..7
                         mol_type = protein
                         organism = synthetic construct
SEQUENCE: 6
GKHPAKL                                                                  7

SEQ ID NO: 7             moltype = AA  length = 7
FEATURE                  Location/Qualifiers
source                   1..7
                         mol_type = protein
                         organism = synthetic construct
SEQUENCE: 7
NRGRSGE                                                                  7

SEQ ID NO: 8             moltype = AA  length = 7
FEATURE                  Location/Qualifiers
source                   1..7
                         mol_type = protein
                         organism = synthetic construct
SEQUENCE: 8
REPRVGP                                                                  7

SEQ ID NO: 9             moltype = AA  length = 7
FEATURE                  Location/Qualifiers
source                   1..7
                         mol_type = protein
                         organism = synthetic construct
SEQUENCE: 9
VTFSHAQ                                                                  7

SEQ ID NO: 10            moltype = AA  length = 7
FEATURE                  Location/Qualifiers
source                   1..7
                         mol_type = protein
                         organism = synthetic construct
SEQUENCE: 10
DSRLTGR                                                                  7

SEQ ID NO: 11            moltype = AA  length = 7
FEATURE                  Location/Qualifiers
source                   1..7
                         mol_type = protein
                         organism = synthetic construct
SEQUENCE: 11
```

```
EPIARPL                                                                  7

SEQ ID NO: 12            moltype = AA  length = 7
FEATURE                  Location/Qualifiers
source                   1..7
                         mol_type = protein
                         organism = synthetic construct SEQUENCE: 12
SSSWRPK                                                                  7

SEQ ID NO: 13            moltype = AA  length = 7
FEATURE                  Location/Qualifiers
source                   1..7
                         mol_type = protein
                         organism = synthetic construct SEQUENCE: 13
DLRDVLG                                                                  7

SEQ ID NO: 14            moltype = AA  length = 7
FEATURE                  Location/Qualifiers
source                   1..7
                         mol_type = protein
                         organism = synthetic construct SEQUENCE: 14
PYRSALW                                                                  7

SEQ ID NO: 15            moltype = AA  length = 7
FEATURE                  Location/Qualifiers
source                   1..7
                         mol_type = protein
                         organism = synthetic construct SEQUENCE: 15
LKPYHLE                                                                  7

SEQ ID NO: 16            moltype = AA  length = 7
FEATURE                  Location/Qualifiers
source                   1..7
                         mol_type = protein
                         organism = synthetic construct SEQUENCE: 16
GNKPNVD                                                                  7

SEQ ID NO: 17            moltype = AA  length = 7
FEATURE                  Location/Qualifiers
source                   1..7
                         mol_type = protein
                         organism = synthetic construct SEQUENCE: 17
WTAVLVQ                                                                  7

SEQ ID NO: 18            moltype = AA  length = 7
FEATURE                  Location/Qualifiers
source                   1..7
                         mol_type = protein
                         organism = synthetic construct SEQUENCE: 18
HTESTYG                                                                  7

SEQ ID NO: 19            moltype = AA  length = 7
FEATURE                  Location/Qualifiers
source                   1..7
                         mol_type = protein
                         organism = synthetic construct SEQUENCE: 19
PDEKMTK                                                                  7

SEQ ID NO: 20            moltype = AA  length = 7
FEATURE                  Location/Qualifiers
source                   1..7
                         mol_type = protein
                         organism = synthetic construct SEQUENCE: 20
QPWQQWQ                                                                  7

SEQ ID NO: 21            moltype = AA  length = 7
FEATURE                  Location/Qualifiers
source                   1..7
                         mol_type = protein
                         organism = synthetic construct
```

| | | |
|---|---|---|
| SEQUENCE: 21 | | |
| LMLRPYM | | 7 |
| | | |
| SEQ ID NO: 22 | moltype = AA  length = 7 | |
| FEATURE | Location/Qualifiers | |
| source | 1..7 | |
| | mol_type = protein | |
| | organism = synthetic construct | |
| SEQUENCE: 22 | | |
| WRNQQVG | | 7 |
| | | |
| SEQ ID NO: 23 | moltype = AA  length = 7 | |
| FEATURE | Location/Qualifiers | |
| source | 1..7 | |
| | mol_type = protein | |
| | organism = synthetic construct | |
| SEQUENCE: 23 | | |
| VGRLARA | | 7 |
| | | |
| SEQ ID NO: 24 | moltype = AA  length = 7 | |
| FEATURE | Location/Qualifiers | |
| source | 1..7 | |
| | mol_type = protein | |
| | organism = synthetic construct | |
| SEQUENCE: 24 | | |
| LRRSRMS | | 7 |
| | | |
| SEQ ID NO: 25 | moltype = AA  length = 7 | |
| FEATURE | Location/Qualifiers | |
| source | 1..7 | |
| | mol_type = protein | |
| | organism = synthetic construct | |
| SEQUENCE: 25 | | |
| ILHAARA | | 7 |
| | | |
| SEQ ID NO: 26 | moltype = AA  length = 7 | |
| FEATURE | Location/Qualifiers | |
| source | 1..7 | |
| | mol_type = protein | |
| | organism = synthetic construct | |
| SEQUENCE: 26 | | |
| AGHTTKV | | 7 |
| | | |
| SEQ ID NO: 27 | moltype = AA  length = 7 | |
| FEATURE | Location/Qualifiers | |
| source | 1..7 | |
| | mol_type = protein | |
| | organism = synthetic construct | |
| SEQUENCE: 27 | | |
| AGDEWRP | | 7 |
| | | |
| SEQ ID NO: 28 | moltype = AA  length = 7 | |
| FEATURE | Location/Qualifiers | |
| source | 1..7 | |
| | mol_type = protein | |
| | organism = synthetic construct | |
| SEQUENCE: 28 | | |
| VTKKQET | | 7 |
| | | |
| SEQ ID NO: 29 | moltype = AA  length = 7 | |
| FEATURE | Location/Qualifiers | |
| source | 1..7 | |
| | mol_type = protein | |
| | organism = synthetic construct | |
| SEQUENCE: 29 | | |
| RPMSTCS | | 7 |
| | | |
| SEQ ID NO: 30 | moltype = AA  length = 7 | |
| FEATURE | Location/Qualifiers | |
| source | 1..7 | |
| | mol_type = protein | |
| | organism = synthetic construct | |
| SEQUENCE: 30 | | |
| RQRRANK | | 7 |
| | | |
| SEQ ID NO: 31 | moltype = AA  length = 7 | |
| FEATURE | Location/Qualifiers | |
| source | 1..7 | |
| | mol_type = protein | |

```
SEQUENCE: 31
HLETARQ                                                              7

SEQ ID NO: 32           moltype = AA  length = 7
FEATURE                 Location/Qualifiers
source                  1..7
                        mol_type = protein
                        organism = synthetic construct
SEQUENCE: 32
LSDAKMG                                                              7

SEQ ID NO: 33           moltype = AA  length = 7
FEATURE                 Location/Qualifiers
source                  1..7
                        mol_type = protein
                        organism = synthetic construct
SEQUENCE: 33
TRITSVY                                                              7

SEQ ID NO: 34           moltype = AA  length = 7
FEATURE                 Location/Qualifiers
source                  1..7
                        mol_type = protein
                        organism = synthetic construct
SEQUENCE: 34
LWIESRP                                                              7

SEQ ID NO: 35           moltype = AA  length = 7
FEATURE                 Location/Qualifiers
source                  1..7
                        mol_type = protein
                        organism = synthetic construct
SEQUENCE: 35
AKGDMCN                                                              7

SEQ ID NO: 36           moltype = AA  length = 7
FEATURE                 Location/Qualifiers
source                  1..7
                        mol_type = protein
                        organism = synthetic construct
SEQUENCE: 36
VPDLKDC                                                              7

SEQ ID NO: 37           moltype = AA  length = 7
FEATURE                 Location/Qualifiers
source                  1..7
                        mol_type = protein
                        organism = synthetic construct
SEQUENCE: 37
VQSESHG                                                              7

SEQ ID NO: 38           moltype = AA  length = 7
FEATURE                 Location/Qualifiers
source                  1..7
                        mol_type = protein
                        organism = synthetic construct
SEQUENCE: 38
FFLDRPR                                                              7

SEQ ID NO: 39           moltype = AA  length = 7
FEATURE                 Location/Qualifiers
source                  1..7
                        mol_type = protein
                        organism = synthetic construct
SEQUENCE: 39
VLTATID                                                              7

SEQ ID NO: 40           moltype = AA  length = 7
FEATURE                 Location/Qualifiers
source                  1..7
                        mol_type = protein
                        organism = synthetic construct
SEQUENCE: 40
KGGAMCC                                                              7

SEQ ID NO: 41           moltype = AA  length = 7
FEATURE                 Location/Qualifiers
source                  1..7
```

```
SEQUENCE: 41
IWHVRYE                                                                    7

SEQ ID NO: 42         moltype = AA   length = 7
FEATURE               Location/Qualifiers
source                1..7
                      mol_type = protein
                      organism = synthetic construct
SEQUENCE: 42
TGEHATT                                                                    7

SEQ ID NO: 43         moltype = AA   length = 7
FEATURE               Location/Qualifiers
source                1..7
                      mol_type = protein
                      organism = synthetic construct
SEQUENCE: 43
DKSTQPC                                                                    7

SEQ ID NO: 44         moltype = AA   length = 7
FEATURE               Location/Qualifiers
source                1..7
                      mol_type = protein
                      organism = synthetic construct
SEQUENCE: 44
PAVVIAN                                                                    7

SEQ ID NO: 45         moltype = AA   length = 7
FEATURE               Location/Qualifiers
source                1..7
                      mol_type = protein
                      organism = synthetic construct
SEQUENCE: 45
VTGDYGM                                                                    7

SEQ ID NO: 46         moltype = AA   length = 7
FEATURE               Location/Qualifiers
source                1..7
                      mol_type = protein
                      organism = synthetic construct
SEQUENCE: 46
EWSSKKT                                                                    7

SEQ ID NO: 47         moltype = AA   length = 7
FEATURE               Location/Qualifiers
source                1..7
                      mol_type = protein
                      organism = synthetic construct
SEQUENCE: 47
NRGVSIE                                                                    7

SEQ ID NO: 48         moltype = AA   length = 7
FEATURE               Location/Qualifiers
source                1..7
                      mol_type = protein
                      organism = synthetic construct
SEQUENCE: 48
PTDRQWP                                                                    7

SEQ ID NO: 49         moltype = AA   length = 7
FEATURE               Location/Qualifiers
source                1..7
                      mol_type = protein
                      organism = synthetic construct
SEQUENCE: 49
ISASYAR                                                                    7

SEQ ID NO: 50         moltype = AA   length = 7
FEATURE               Location/Qualifiers
source                1..7
                      mol_type = protein
                      organism = synthetic construct
SEQUENCE: 50
GPCSLPG                                                                    7

SEQ ID NO: 51         moltype = AA   length = 7
FEATURE               Location/Qualifiers
```

-continued

```
source                   1..7
                         mol_type = protein
                         organism = synthetic construct
SEQUENCE: 51
DYAAPCQ                                                                          7

SEQ ID NO: 52            moltype = AA  length = 7
FEATURE                  Location/Qualifiers
source                   1..7
                         mol_type = protein
                         organism = synthetic construct
SEQUENCE: 52
GTREVEW                                                                          7

SEQ ID NO: 53            moltype = AA  length = 7
FEATURE                  Location/Qualifiers
source                   1..7
                         mol_type = protein
                         organism = synthetic construct
SEQUENCE: 53
RNVSPAR                                                                          7

SEQ ID NO: 54            moltype = AA  length = 7
FEATURE                  Location/Qualifiers
source                   1..7
                         mol_type = protein
                         organism = synthetic construct
SEQUENCE: 54
TGLGWTG                                                                          7

SEQ ID NO: 55            moltype = AA  length = 7
FEATURE                  Location/Qualifiers
source                   1..7
                         mol_type = protein
                         organism = synthetic construct
SEQUENCE: 55
SFERTDK                                                                          7

SEQ ID NO: 56            moltype = AA  length = 7
FEATURE                  Location/Qualifiers
source                   1..7
                         mol_type = protein
                         organism = synthetic construct
SEQUENCE: 56
QLDGDRS                                                                          7

SEQ ID NO: 57            moltype = AA  length = 7
FEATURE                  Location/Qualifiers
source                   1..7
                         mol_type = protein
                         organism = synthetic construct
SEQUENCE: 57
WWEPTTT                                                                          7

SEQ ID NO: 58            moltype = AA  length = 7
FEATURE                  Location/Qualifiers
source                   1..7
                         mol_type = protein
                         organism = synthetic construct
SEQUENCE: 58
DILTNYR                                                                          7

SEQ ID NO: 59            moltype = AA  length = 7
FEATURE                  Location/Qualifiers
source                   1..7
                         mol_type = protein
                         organism = synthetic construct
SEQUENCE: 59
HSYDRTS                                                                          7

SEQ ID NO: 60            moltype = AA  length = 7
FEATURE                  Location/Qualifiers
source                   1..7
                         mol_type = protein
                         organism = synthetic construct
SEQUENCE: 60
LPSAQLM                                                                          7

SEQ ID NO: 61            moltype = DNA  length = 21
```

```
FEATURE                 Location/Qualifiers
source                  1..21
                        mol_type = other DNA
                        organism = synthetic construct
SEQUENCE: 61
ggggtctttg tgcttccgaa t                                              21

SEQ ID NO: 62           moltype = DNA   length = 21
FEATURE                 Location/Qualifiers
source                  1..21
                        mol_type = other DNA
                        organism = synthetic construct
SEQUENCE: 62
gggaattata gggtaatcc g                                               21

SEQ ID NO: 63           moltype = DNA   length = 21
FEATURE                 Location/Qualifiers
source                  1..21
                        mol_type = other DNA
                        organism = synthetic construct
SEQUENCE: 63
tgttcttctc gtaggtctaa g                                              21

SEQ ID NO: 64           moltype = DNA   length = 21
FEATURE                 Location/Qualifiers
source                  1..21
                        mol_type = other DNA
                        organism = synthetic construct
SEQUENCE: 64
tttcgtcatg ggccgccgtc g                                              21

SEQ ID NO: 65           moltype = DNA   length = 21
FEATURE                 Location/Qualifiers
source                  1..21
                        mol_type = other DNA
                        organism = synthetic construct
SEQUENCE: 65
cgttttaaga ctggttatcc g                                              21

SEQ ID NO: 66           moltype = DNA   length = 21
FEATURE                 Location/Qualifiers
source                  1..21
                        mol_type = other DNA
                        organism = synthetic construct
SEQUENCE: 66
gggaagcatc cggcgaagct g                                              21

SEQ ID NO: 67           moltype = DNA   length = 21
FEATURE                 Location/Qualifiers
source                  1..21
                        mol_type = other DNA
                        organism = synthetic construct
SEQUENCE: 67
aatcggggc gttcgggtga g                                               21

SEQ ID NO: 68           moltype = DNA   length = 21
FEATURE                 Location/Qualifiers
source                  1..21
                        mol_type = other DNA
                        organism = synthetic construct
SEQUENCE: 68
agggagccga gggttggtcc g                                              21

SEQ ID NO: 69           moltype = DNA   length = 21
FEATURE                 Location/Qualifiers
source                  1..21
                        mol_type = other DNA
                        organism = synthetic construct
SEQUENCE: 69
gtgactttt cgcatgcgca g                                               21

SEQ ID NO: 70           moltype = DNA   length = 21
FEATURE                 Location/Qualifiers
source                  1..21
                        mol_type = other DNA
                        organism = synthetic construct
SEQUENCE: 70
gattcgaggc ttactggtag g                                              21
```

```
SEQ ID NO: 71          moltype = DNA  length = 21
FEATURE                Location/Qualifiers
source                 1..21
                       mol_type = other DNA
                       organism = synthetic construct
SEQUENCE: 71
gagccgattg cgcgtcctct g                                                   21

SEQ ID NO: 72          moltype = DNA  length = 21
FEATURE                Location/Qualifiers
source                 1..21
                       mol_type = other DNA
                       organism = synthetic construct
SEQUENCE: 72
agtagttcgt ggaggccgaa g                                                   21

SEQ ID NO: 73          moltype = DNA  length = 21
FEATURE                Location/Qualifiers
source                 1..21
                       mol_type = other DNA
                       organism = synthetic construct
SEQUENCE: 73
gatctgcggg atgtgctggg g                                                   21

SEQ ID NO: 74          moltype = DNA  length = 21
FEATURE                Location/Qualifiers
source                 1..21
                       mol_type = other DNA
                       organism = synthetic construct
SEQUENCE: 74
ccgtataggt cggcgttgtg g                                                   21

SEQ ID NO: 75          moltype = DNA  length = 21
FEATURE                Location/Qualifiers
source                 1..21
                       mol_type = other DNA
                       organism = synthetic construct
SEQUENCE: 75
cttaagccgt atcatttgga g                                                   21

SEQ ID NO: 76          moltype = DNA  length = 21
FEATURE                Location/Qualifiers
source                 1..21
                       mol_type = other DNA
                       organism = synthetic construct
SEQUENCE: 76
gggaataagc cgaatgttga t                                                   21

SEQ ID NO: 77          moltype = DNA  length = 21
FEATURE                Location/Qualifiers
source                 1..21
                       mol_type = other DNA
                       organism = synthetic construct
SEQUENCE: 77
tggacggcgg tgctggtgca g                                                   21

SEQ ID NO: 78          moltype = DNA  length = 21
FEATURE                Location/Qualifiers
source                 1..21
                       mol_type = other DNA
                       organism = synthetic construct
SEQUENCE: 78
catacggaga gtacgtatgg g                                                   21

SEQ ID NO: 79          moltype = DNA  length = 21
FEATURE                Location/Qualifiers
source                 1..21
                       mol_type = other DNA
                       organism = synthetic construct
SEQUENCE: 79
ccagatgaga agatgactaa g                                                   21

SEQ ID NO: 80          moltype = DNA  length = 21
FEATURE                Location/Qualifiers
source                 1..21
                       mol_type = other DNA
                       organism = synthetic construct
SEQUENCE: 80
cagccttggc agcagtggca g                                                   21
```

| SEQ ID NO: 81 | moltype = DNA   length = 21 |
| --- | --- |
| FEATURE | Location/Qualifiers |
| source | 1..21 |
| | mol_type = other DNA |
| | organism = synthetic construct |

SEQUENCE: 81
ttgatgttga ggccgtatat g                                              21

| SEQ ID NO: 82 | moltype = DNA   length = 21 |
| --- | --- |
| FEATURE | Location/Qualifiers |
| source | 1..21 |
| | mol_type = other DNA |
| | organism = synthetic construct |

SEQUENCE: 82
tggcgtaatc agcaggtggg t                                              21

| SEQ ID NO: 83 | moltype = DNA   length = 21 |
| --- | --- |
| FEATURE | Location/Qualifiers |
| source | 1..21 |
| | mol_type = other DNA |
| | organism = synthetic construct |

SEQUENCE: 83
gtggggaggt tggctagggc g                                              21

| SEQ ID NO: 84 | moltype = DNA   length = 21 |
| --- | --- |
| FEATURE | Location/Qualifiers |
| source | 1..21 |
| | mol_type = other DNA |
| | organism = synthetic construct |

SEQUENCE: 84
ttgaggcggt cgcggatgtc t                                              21

| SEQ ID NO: 85 | moltype = DNA   length = 21 |
| --- | --- |
| FEATURE | Location/Qualifiers |
| source | 1..21 |
| | mol_type = other DNA |
| | organism = synthetic construct |

SEQUENCE: 85
attctgcatg cggctcgtgc t                                              21

| SEQ ID NO: 86 | moltype = DNA   length = 21 |
| --- | --- |
| FEATURE | Location/Qualifiers |
| source | 1..21 |
| | mol_type = other DNA |
| | organism = synthetic construct |

SEQUENCE: 86
gcgggtcata cgacgaaggt t                                              21

| SEQ ID NO: 87 | moltype = DNA   length = 21 |
| --- | --- |
| FEATURE | Location/Qualifiers |
| source | 1..21 |
| | mol_type = other DNA |
| | organism = synthetic construct |

SEQUENCE: 87
gcggggatg aatggaggcc g                                               21

| SEQ ID NO: 88 | moltype = DNA   length = 21 |
| --- | --- |
| FEATURE | Location/Qualifiers |
| source | 1..21 |
| | mol_type = other DNA |
| | organism = synthetic construct |

SEQUENCE: 88
gtaacgaaga agcaggagac t                                              21

| SEQ ID NO: 89 | moltype = DNA   length = 21 |
| --- | --- |
| FEATURE | Location/Qualifiers |
| source | 1..21 |
| | mol_type = other DNA |
| | organism = synthetic construct |

SEQUENCE: 89
aggccaatgt cgacgtgttc g                                              21

| SEQ ID NO: 90 | moltype = DNA   length = 21 |
| --- | --- |
| FEATURE | Location/Qualifiers |
| source | 1..21 |
| | mol_type = other DNA |
| | organism = synthetic construct |

SEQUENCE: 90

```
cggcagcggc gggctaataa g                                             21

SEQ ID NO: 91           moltype = DNA   length = 21
FEATURE                 Location/Qualifiers
source                  1..21
                        mol_type = other DNA
                        organism = synthetic construct
SEQUENCE: 91
catctggaga cggcgaggca g                                             21

SEQ ID NO: 92           moltype = DNA   length = 21
FEATURE                 Location/Qualifiers
source                  1..21
                        mol_type = other DNA
                        organism = synthetic construct
SEQUENCE: 92
ttgtcggatg cgaagatggg g                                             21

SEQ ID NO: 93           moltype = DNA   length = 21
FEATURE                 Location/Qualifiers
source                  1..21
                        mol_type = other DNA
                        organism = synthetic construct
SEQUENCE: 93
actcgtatta cgtctgtgta t                                             21

SEQ ID NO: 94           moltype = DNA   length = 21
FEATURE                 Location/Qualifiers
source                  1..21
                        mol_type = other DNA
                        organism = synthetic construct
SEQUENCE: 94
ctttggattg agagtcgtcc g                                             21

SEQ ID NO: 95           moltype = DNA   length = 21
FEATURE                 Location/Qualifiers
source                  1..21
                        mol_type = other DNA
                        organism = synthetic construct
SEQUENCE: 95
gcgaagggtg atatgtgtaa t                                             21

SEQ ID NO: 96           moltype = DNA   length = 21
FEATURE                 Location/Qualifiers
source                  1..21
                        mol_type = other DNA
                        organism = synthetic construct
SEQUENCE: 96
gttcctgatc taaaggattg t                                             21

SEQ ID NO: 97           moltype = DNA   length = 21
FEATURE                 Location/Qualifiers
source                  1..21
                        mol_type = other DNA
                        organism = synthetic construct
SEQUENCE: 97
gtgcagtctg agagtcatgg t                                             21

SEQ ID NO: 98           moltype = DNA   length = 21
FEATURE                 Location/Qualifiers
source                  1..21
                        mol_type = other DNA
                        organism = synthetic construct
SEQUENCE: 98
tttttctgg ataggccgcg t                                              21

SEQ ID NO: 99           moltype = DNA   length = 21
FEATURE                 Location/Qualifiers
source                  1..21
                        mol_type = other DNA
                        organism = synthetic construct
SEQUENCE: 99
gttctgactg cgacgattga t                                             21

SEQ ID NO: 100          moltype = DNA   length = 21
FEATURE                 Location/Qualifiers
source                  1..21
                        mol_type = other DNA
                        organism = synthetic construct
```

```
SEQUENCE: 100
aaggggggggg cgatgtgttg t                                                  21

SEQ ID NO: 101          moltype = DNA   length = 21
FEATURE                 Location/Qualifiers
source                  1..21
                        mol_type = other DNA
                        organism = synthetic construct
SEQUENCE: 101
atttggcatg ttcggtatga g                                                   21

SEQ ID NO: 102          moltype = DNA   length = 21
FEATURE                 Location/Qualifiers
source                  1..21
                        mol_type = other DNA
                        organism = synthetic construct
SEQUENCE: 102
acgggtgagc atgcgactac t                                                   21

SEQ ID NO: 103          moltype = DNA   length = 21
FEATURE                 Location/Qualifiers
source                  1..21
                        mol_type = other DNA
                        organism = synthetic construct
SEQUENCE: 103
gataagagta cgcagccgtg t                                                   21

SEQ ID NO: 104          moltype = DNA   length = 21
FEATURE                 Location/Qualifiers
source                  1..21
                        mol_type = other DNA
                        organism = synthetic construct
SEQUENCE: 104
cctgcggtgg ttattgctaa t                                                   21

SEQ ID NO: 105          moltype = DNA   length = 21
FEATURE                 Location/Qualifiers
source                  1..21
                        mol_type = other DNA
                        organism = synthetic construct
SEQUENCE: 105
gttacggggg attatgggat g                                                   21

SEQ ID NO: 106          moltype = DNA   length = 21
FEATURE                 Location/Qualifiers
source                  1..21
                        mol_type = other DNA
                        organism = synthetic construct
SEQUENCE: 106
gagtggtcga gtaagaagac c                                                   21

SEQ ID NO: 107          moltype = DNA   length = 21
FEATURE                 Location/Qualifiers
source                  1..21
                        mol_type = other DNA
                        organism = synthetic construct
SEQUENCE: 107
aatagggggg ttagtattga g                                                   21

SEQ ID NO: 108          moltype = DNA   length = 21
FEATURE                 Location/Qualifiers
source                  1..21
                        mol_type = other DNA
                        organism = synthetic construct
SEQUENCE: 108
ccgacggatc gtcagtggcc g                                                   21

SEQ ID NO: 109          moltype = DNA   length = 21
FEATURE                 Location/Qualifiers
source                  1..21
                        mol_type = other DNA
                        organism = synthetic construct
SEQUENCE: 109
atttctgcgt cgtatgcgag g                                                   21

SEQ ID NO: 110          moltype = DNA   length = 21
FEATURE                 Location/Qualifiers
source                  1..21
                        mol_type = other DNA
```

-continued

```
                    organism = synthetic construct
SEQUENCE: 110
gggccgtgta gtctgccggg g                                              21

SEQ ID NO: 111          moltype = DNA   length = 21
FEATURE                 Location/Qualifiers
source                  1..21
                        mol_type = other DNA
                        organism = synthetic construct
SEQUENCE: 111
gattatgcgg ctccgtgtca g                                              21

SEQ ID NO: 112          moltype = DNA   length = 21
FEATURE                 Location/Qualifiers
source                  1..21
                        mol_type = other DNA
                        organism = synthetic construct
SEQUENCE: 112
ggtactaggg aggtggagtg g                                              21

SEQ ID NO: 113          moltype = DNA   length = 21
FEATURE                 Location/Qualifiers
source                  1..21
                        mol_type = other DNA
                        organism = synthetic construct
SEQUENCE: 113
aggaatgttt ctccggcgcg g                                              21

SEQ ID NO: 114          moltype = DNA   length = 21
FEATURE                 Location/Qualifiers
source                  1..21
                        mol_type = other DNA
                        organism = synthetic construct
SEQUENCE: 114
acggggcttg gttggactgg g                                              21

SEQ ID NO: 115          moltype = DNA   length = 21
FEATURE                 Location/Qualifiers
source                  1..21
                        mol_type = other DNA
                        organism = synthetic construct
SEQUENCE: 115
agttttgaga ggacggataa g                                              21

SEQ ID NO: 116          moltype = DNA   length = 21
FEATURE                 Location/Qualifiers
source                  1..21
                        mol_type = other DNA
                        organism = synthetic construct
SEQUENCE: 116
cagttggatg gggatcgttc g                                              21

SEQ ID NO: 117          moltype = DNA   length = 21
FEATURE                 Location/Qualifiers
source                  1..21
                        mol_type = other DNA
                        organism = synthetic construct
SEQUENCE: 117
tggtgggagc cgactacgac g                                              21

SEQ ID NO: 118          moltype = DNA   length = 21
FEATURE                 Location/Qualifiers
source                  1..21
                        mol_type = other DNA
                        organism = synthetic construct
SEQUENCE: 118
gatatttga ctaattatcg g                                               21

SEQ ID NO: 119          moltype = DNA   length = 21
FEATURE                 Location/Qualifiers
source                  1..21
                        mol_type = other DNA
                        organism = synthetic construct
SEQUENCE: 119
cattcttatg atcggacgtc g                                              21

SEQ ID NO: 120          moltype = DNA   length = 21
FEATURE                 Location/Qualifiers
source                  1..21
```

-continued

```
                          mol_type = other DNA
                          organism = synthetic construct
SEQUENCE: 120
ttgccgagtg ctcagctgat g                                         21

SEQ ID NO: 121            moltype = AA   length = 736
FEATURE                   Location/Qualifiers
source                    1..736
                          mol_type = protein
                          organism = unidentified
SEQUENCE: 121
MAADGYLPDW LEDNLSEGIR EWWALKPGAP QPKANQQHQD NARGLVLPGY KYLGPGNGLD   60
KGEPVNAADA AALEHDKAYD QQLKAGDNPY LKYNHADAEF QERLKEDTSF GGNLGRAVFQ  120
AKKRLLEPLG LVEEAAKTAP GKKRPVEQSP QEPDSSAGIG KSGAQPAKKR LNFGQTGDTE  180
SVPDPQPIGE PPAAPSGVGS LTMASGGGAP VADNNEGADG VGSSSGNWHC DSQWLGDRVI  240
TTSTRTWALP TYNNHLYKQI SNSTSGGSSN DNAYFGYSTP WGYFDFNRFH CHFSPRDWQR  300
LINNNWGFRP KRLNFKLFNI QVKEVTDNNG VKTIANNLTS TVQVFTDSDY QLPYVLGSAH  360
EGCLPPFPAD VFMIPQYGYL TLNDGSQAVG RSSFYCLEYF PSQMLRTGNN FQFSYEFENV  420
PFHSSYAHSQ SLDRLMNPLI DQYLYYLSKT INGSGQNQQT LKFSVAGPSN MAVQGRNYIP  480
GPSYRQQRVS TTVTQNNNSE FAWPGASSWA LNGRNSLMNP GPAMASHKEG EDRFFPLSGS  540
LIFGKQGTGR DNVDADKVMI TNEEEIKTTN PVATESYGQV ATNHQSAQAQ AQTGWVQNQG  600
ILPGMVWQDR DVYLQGPIWA KIPHTDGNFH PSPLMGGFGM KHPPPQILIK NTPVPADPPT  660
AFNKDKLNSF ITQYSTGQVS VEIEWELQKE NSKRWNPEIQ YTSNYYKSNN VEFAVNTEGV  720
YSEPRPIGTR YLTRNL                                                 736

SEQ ID NO: 122            moltype = DNA   length = 2211
FEATURE                   Location/Qualifiers
source                    1..2211
                          mol_type = other DNA
                          organism = unidentified
SEQUENCE: 122
atggctgccg atggttatct tccagattgg ctcgaggaca accttagtga aggaattcgc   60
gagtggtggg ctttgaaacc tggagcccct caacccaagg caaatcaaca acatcaagac  120
aacgctcgag gtcttgtgct tccgggttac aaataccttg gacccggcaa cggactcgac  180
aaggggagc cggtcaacgc agcagcgcg ggcgccctac agcacgacaa ggcctacgac  240
cagcagctca aggccggaga caacccgtac ctcaagtaca ccacgccga cgccgagttc  300
caggagcggc tcaaagaaga tacgtctttt gggggcaacc tcgggcgagc agtcttccag  360
gccaaaaaga ggcttcttga acctcttggt ctggttgagg aagcggctaa gacggctcct  420
ggaaagaaga ggcctgtaga gcagtctcct caggaaccga actcctccgc tgggattggc  480
aaatcgggtg cacagcccgc taaaaagaga ctcaatttcg gtcagactgg cgacacagag  540
tcagtcccag accctcaacc aatcggagaa cctcccgcag cccccctcagg tgtgggatct  600
cttacaatgg cttcaggtgg tggcgcacca gtggcagaca taacgaagg tgccgatgga  660
gtgggtagtt cctcgggaaa ttggcattgc gattcccaat ggctgggga cagagtcatc  720
accaccagca cccgaacctg ggccctgccc acctacaaca atcacctcta caagcaaatc  780
tccaacagca catctggagg atcttcaaat gacaacgcct acttcggcta cagcacccccc  840
tggggggtatt ttgacttcaa cagattccac tgccacttct caccacgtga ctggcagcga  900
ctcatcaaca caactgggg attccggcct aagcgactca acttcaagct cttcaacatt  960
caggtcaaaag aggttacgga caacaatgga gtcaagacca tcgccaataa ccttaccagc 1020
acggtccagg tcttcacgga ctcagactat cagctcccgt acgtgctcgg gtcggctcac 1080
gagggctgcc tcccgccgtt cccagcggac gttttcatga ttcctcagta cgggtatctg 1140
acgcttaatg atgggagcca ggccgtgggt cgttcgtcct tttactgcct ggaatattcc 1200
ccgtcgcaaa tgctaagaac gggtaacaac ttccagttca gctacgagtt tgagaacgta 1260
ccttttccata gcagctacgc tcacagccaa agcctggacc gactaatgaa tccactcatc 1320
gaccaatact tgtactatct ctcaaagact attaacggtt ctggacagaa tcaacaaacg 1380
ctaaaattca gtgtggccgg acccagcaac atggctgtcc agggaagaaa ctacatacct 1440
ggacccagct accgacaaca acgtgtctca accactgtga ctcaaaacaa caacagcgaa 1500
tttgcttggc ctggagcttc ttcttgggct ctcaatggac gtaatagctt gatgaatcct 1560
ggacctgcta tggccagcca caagaagga gaggaccgtt tcttccttt gtctggatct 1620
ttaattttg gcaaacaagg aactggaaga gacaacgtgg atgcggacaa agtcatgata 1680
accaacgaag aagaaattaa aactactaac ccggtagcaa cggagtccta tggacaagtg 1740
gccacaaacc accagagtgc ccaagcacag gcgcagaccg gctgggttca aaaccaagga 1800
atacttccgg gtatggtttg gcaggacaga gatgtgtacc tgcaaggacc catttgggcc 1860
aaaattcctc acacgacgg caactttcac ccttctccgc tgatgggagg gtttggaatg 1920
aagcaccgc ctcctcagat cctcatcaaa aacacacctg tacctgcgga tcctccaaca 1980
gccttcaaca aggacaagct gaactctttc atcacccagt attctactgg ccaagtcagc 2040
gtggagatcg agtgggagct gcagaaggaa aacagcaagc gctggaaccc ggagatccag 2100
tacacttcca actattacaa gtctaataat gttgaatttg ctgttaatac tgaaggtgta 2160
tatagtgaac ccgcccccat tggcaccaga tacctgactc gtaatctgta a           2211

SEQ ID NO: 123            moltype = AA   length = 599
FEATURE                   Location/Qualifiers
source                    1..599
                          mol_type = protein
                          organism = unidentified
SEQUENCE: 123
TAPGKKRPVE QSPQEPDSSA GIGKSGAQPA KKRLNFGQTG DTESVPDPQP IGEPPAAPSG   60
VGSLTMASGG GAPVADNNEG ADGVGSSSGN WHCDSQWLGD RVITTSTRTW ALPTYNNHLY  120
KQISNSTSGG SSNDNAYFGY STPWGYFDFN RFHCHFSPRD WQRLINNNWG FRPKRLNFKL  180
FNIQVKEVTD NNGVKTIANN LTSTVQVFTD SDYQLPYVLG SAHEGCLPPF PADVFMIPQY  240
```

```
GYLTLNDGSQ AVGRSSFYCL EYFPSQMLRT GNNFQFSYEF ENVPFHSSYA HSQSLDRLMN  300
PLIDQYLYYL SKTINGSGQN QQTLKFSVAG PSNMAVQGRN YIPGPSYRQQ RVSTTVTQNN  360
NSEFAWPGAS SWALNGRNSL MNPGPAMASH KEGEDRFFPL SGSLIFGKQG TGRDNVDADK  420
VMITNEEEIK TTNPVATESY GQVATNHQSA QAQAQTGWVQ NQGILPGMVW QDRDVYLQGP  480
IWAKIPHTDG NFHPSPLMGG FGMKHPPPQI LIKNTPVPAD PPTAFNKDKL NSFITQYSTG  540
QVSVEIEWEL QKENSKRWNP EIQYTSNYYK SNNVEFAVNT EGVYSEPRPI GTRYLTRNL   599

SEQ ID NO: 124         moltype = AA    length = 534
FEATURE                Location/Qualifiers
source                 1..534
                       mol_type = protein
                       organism = unidentified
SEQUENCE: 124
MASGGGAPVA DNNEGADGVG SSSGNWHCDS QWLGDRVITT STRTWALPTY NNHLYKQISN  60
STSGGSSNDN AYFGYSTPWG YFDFNRFHCH FSPRDWQRLI NNNWGFRPKR LNFKLFNIQV  120
KEVTDNNGVK TIANNLTSTV QVFTDSDYQL PYVLGSAHEG CLPPFPADVF MIPQYGYLTL  180
NDGSQAVGRS SFYCLEYFPS QMLRTGNNFQ FSYEFENVPF HSSYAHSQSL DRLMNPLIDQ  240
YLYYLSKTIN GSGQNQQTLK FSVAGPSNMA VQGRNYIPGP SYRQQRVSTT VTQNNSEFA   300
WPGASSWALN GRNSLMNPGP AMASHKEGED RFFPLSGSLI FGKQGTGRDN VDADKVMITN  360
EEEIKTTNPV ATESYGQVAT NHQSAQAQAQ TGWVQNQGIL PGMVWQDRDV YLQGPIWAKI  420
PHTDGNFHPS PLMGGFGMKH PPPQILIKNT PVPADPPTAF NKDKLNSFIT QYSTGQVSVE  480
IEWELQKENS KRWNPEIQYT SNYYKSNNVE FAVNTEGVYS EPRPIGTRYL TRNL        534

SEQ ID NO: 125         moltype = DNA   length = 20
FEATURE                Location/Qualifiers
source                 1..20
                       mol_type = other DNA
                       organism = synthetic construct
SEQUENCE: 125
tccgccacaa catcgaggac                                              20

SEQ ID NO: 126         moltype = DNA   length = 20
FEATURE                Location/Qualifiers
source                 1..20
                       mol_type = other DNA
                       organism = synthetic construct
SEQUENCE: 126
gtagtggttg tcgggcagca                                              20

SEQ ID NO: 127         moltype = DNA   length = 20
FEATURE                Location/Qualifiers
source                 1..20
                       mol_type = other DNA
                       organism = synthetic construct
SEQUENCE: 127
cagcgtgcag ctcgccgacc                                              20

SEQ ID NO: 128         moltype = DNA   length = 1800
FEATURE                Location/Qualifiers
source                 1..1800
                       mol_type = other DNA
                       organism = unidentified
SEQUENCE: 128
acggctcctg gaaagaagag gcctgtagag cagtctcctc aggaaccgga ctcctccgcg  60
ggtattggca aatcgggtgc acagcccgct aaaaagacga tcaatttcgg tcagactggc  120
gacacagagt cagtcccaga ccctcaacca atcggagaac ctcccgcagc ccctcaggt   180
gtgggatctc ttacaatggc ttcaggtggt ggcgcaccag tggcagacaa taacgaaggt  240
gccgatggag tgggtagttc ctcgggaaat tggcattgcg attcccaatg ctgggggac   300
agagtcatca ccaccagcac ccgaacctgg gccctgccca cctacaacaa tcacctctac  360
aagcaaatct ccaacagcac atctggagga tcttcaaatg acaacgccta cttcggctac  420
agcacccct gggggtattt tgacttcaac agattccact gccacttctc accacgtgac  480
tggcagcgac tcatcaacaa caactgggga ttccggccta gcgactcaa cttcaagctc  540
ttcaacattc aggtcaaaga ggttacggac aacaatggag tcaagaccat cgccaataac  600
cttaccagca cggtccaggt cttcacggac tcagactatc agctcccgta cgtgctcggg  660
tcggctcacg agggctgcct cccgccgttc ccagcggacg ttttcatgat tcctcagtac  720
gggtatctga cgcttaatga tggaagccag gccgtgggtc gttcgtcctt tactgcctg   780
gaatatttcc cgtcgcaaat gctaagaacg ggtaacaact tccagttcag ctacgagttt  840
gagaacgtac ctttccatag cagctacgct cacagccaaa gcctggaccg actaatgaat  900
ccactcatcg accaatactt gtactatctc tcaaagacta ttaacggttc tggacagaat  960
caacaaacgc taaaattcag tgtggccgga cccagcaaca tggctgtcca gggaagaaac  1020
tacatacctg gacccagcta ccgacaacaa cgtgtctcaa ccactgtgac tcaaaacaac  1080
aacagcgaat tgcttggcc tggagcttct cttgggctc tcaatggacg taatagcttg  1140
atgaatcctg gacctgctat ggccagccac aagaaggag aggaccgttt cttcctttg   1200
tctggatctt taatttttgg caaacaagga actggaagga caaacgtgga tgcggacaaa  1260
gtcatgataa ccaacgaaga agaaattaaa actactaacc cggtagcaac ggagtcctat  1320
ggacaagtgg ccacaaacca ccagagtgcc caagcacagg cgcagaccgg ctgggttcaa  1380
aaccaaggaa tacttccggg tatggtttgg caggacagag atgtgtacct gcaaggaccc  1440
atttgggcca aaattcctca cacggacggc aactttcacc cttctccgct gatgggaggg  1500
tttggaatga agcacccgcc tcctcagatc ctcatcaaaa acacacctgt acctgcggat  1560
```

```
cctccaacgg ccttcaacaa ggacaagctg aactctttca tcacccagta ttctactggc  1620
caagtcagcg tggagatcga gtgggagctg cagaaggaaa acagcaagcg ctggaacccg  1680
gagatccagt acacttccaa ctattacaag tctaataatg ttgaatttgc tgttaatact  1740
gaaggtgtat atagtgaacc ccgccccatt ggcaccagat acctgactcg taatctgtaa  1800

SEQ ID NO: 129          moltype = DNA  length = 1605
FEATURE                 Location/Qualifiers
source                  1..1605
                        mol_type = other DNA
                        organism = unidentified
SEQUENCE: 129
atggcttcag gtggtggcgc accagtggca gacaataacg aaggtgccga tggagtgggt    60
agttcctcgg gaaattggca ttgcgattcc caatggctgg gggacagagt catcaccacc   120
agcacccgaa cctgggccct gcccacctac aacaatcacc tctacaagca aatctccaac   180
agcacatctg gaggatcttc aaatgacaac gcctacttcg gctacagcac ccctggggg   240
tattttgact tcaacagatt ccactgccac ttctcaccac gtgactggca gcgactcatc   300
aacaacaact ggggattccg gcctaagcga ctcaacttca agctcttcaa cattcaggtc   360
aaagaggtta cggacaacaa tggagtcaag accatcgcca ataaccttac cagcacggtc   420
caggtcttca cggactcaga ctatcagctc ccgtacgtgc tcgggtcggc tcacgagggc   480
tgcctcccgc cgttcccagc ggacgttttc atgattcctc agtacgggta tctgacgctt   540
aatgatggaa gccaggccgt gggtcgttcg tccttttact gcctggaata tttcccgtcg   600
caaatgctaa gaacgggtaa caacttccag ttcagctacg agtttgagaa cgtaccttc    660
catagcagct acgctcacag ccaaagcctg gaccgactaa tgaatccact catcgaccaa   720
tacttgtact atctctcaaa gactattaac ggttctggac agaatcaaca aacgctaaaa   780
ttcagtgtgg ccgacccag caacatggct gtccagggaa gaaactacat acctggaccc   840
agctaccgac aacaacgtgt ctcaaccact gtgactcaaa acaacaacag cgaatttgct   900
tggcctggag cttcttcttg ggctctcaat ggacgtaata gcttgatgaa tcctggacct   960
gctatggcca gccacaaaga aggagaggac cgtttctttc ctttgtctgg atctttaatt  1020
tttggcaaac aaggaactgg aagagacaac gtggatgcgg acaaagtcat gataaccaac  1080
gaagaagaaa ttaaaactac taaccccggta gcaacggaat cctatggaca agtggccaca  1140
aaccaccaga gtgcccaagc acaggcgcag accggctggg ttcaaaacca aggaatactt  1200
ccgggtatgg tttggcagga cagagatgtg tacctgcaag gacccatttg ggccaaaatt  1260
cctcacacgg acggcaactt tcacccttct ccgctgatgg gagggtttgg aatgaagcac  1320
ccgcctcctc agatcctcat caaaaacaca cctgtacctg cggatcctcc aacggccttc  1380
aacaaggaca agctgaactc tttcatcacc cagtattcta ctggccaagt cagcgtggag  1440
atcgagtggg agctgcagaa ggaaaacagc aagcgctgga acccggagat ccagtacact  1500
tccaactatt acaagtctaa taatgttgaa tttgctgtta atactgaagg tgtatatagt  1560
gaaccccgcc ccattggcac cagatacctg actcgtaatc tgtaa                   1605

SEQ ID NO: 130          moltype =   length =
SEQUENCE: 130
000
```